(12) United States Patent
Murakami et al.

(10) Patent No.: US 8,462,615 B2
(45) Date of Patent: Jun. 11, 2013

(54) TRANSMISSION DEVICE, RECEPTION DEVICE, AND RADIO COMMUNICATION METHOD

(75) Inventors: Yutaka Murakami, Kanagawa (JP); Shinichiro Takabayashi, Kanagawa (JP); Masayuki Orihashi, Chiba (JP); Akihiko Matsuoka, Kanagawa (JP)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/606,327

(22) Filed: Sep. 7, 2012

(65) Prior Publication Data

US 2012/0328047 A1    Dec. 27, 2012

Related U.S. Application Data

(63) Continuation of application No. 12/767,117, filed on Apr. 26, 2010, now Pat. No. 8,284,650, which is a continuation of application No. 10/485,115, filed as application No. PCT/JP02/07407 on Jul. 23, 2002, now Pat. No. 7,724,638.

(30) Foreign Application Priority Data

| Aug. 10, 2001 | (JP) | 2001-244929 |
| Oct. 5, 2001 | (JP) | 2001-310777 |
| Jul. 15, 2002 | (JP) | 2002-206150 |

(51) Int. Cl.
*H04J 11/00* (2006.01)

(52) U.S. Cl.
USPC ............ 370/208; 370/215; 375/260

(58) Field of Classification Search
USPC .................. 370/204–209, 215; 375/146–148, 375/260
See application file for complete search history.

(56) References Cited

U.S. PATENT DOCUMENTS

| 6,041,124 | A | 3/2000 | Sugita |
| 6,256,508 | B1 | 7/2001 | Nakagawa et al. |
| 6,282,185 | B1 | 8/2001 | Hakkinen et al. |
| 6,301,237 | B1 | 10/2001 | Miya |
| 6,370,131 | B1 | 4/2002 | Miya |
| 6,529,492 | B1 | 3/2003 | Miya |
| 6,549,526 | B2 | 4/2003 | Miya |
| 6,584,088 | B2 | 6/2003 | Miya |
| 6,683,863 | B2 | 1/2004 | Miya et al. |
| 7,420,915 | B2 | 9/2008 | Murakami et al. |
| 7,724,638 | B2 | 5/2010 | Murakami et al. |
| 8,284,650 | B2 | 10/2012 | Murakami et al. |
| 2001/0028637 | A1 | 10/2001 | Abeta et al. |
| 2003/0147358 | A1 | 8/2003 | Hiramatsu et al. |

FOREIGN PATENT DOCUMENTS

| EP | 1107631 | 6/2000 |
| JP | 7-245574 | 9/1995 |
| JP | 9-172685 | 6/1997 |
| JP | 11-145933 | 5/1999 |
| JP | 2000-78116 | 3/2000 |
| JP | 2000-286823 | 10/2000 |
| JP | 2001-166026 | 6/2001 |
| JP | 2001-189769 | 7/2001 |
| JP | 2001-203664 | 7/2001 |

*Primary Examiner* — Gary Mui
(74) *Attorney, Agent, or Firm* — Allen, Dyer, Doppelt, Milbrath & Gilchrist, P.A.

(57) ABSTRACT

A transmitting apparatus includes an OFDM modulator that generates a first modulation symbol by modulating a first information signal using a first modulation scheme, a signal point of the first modulated information signal being at a first position in an in-phase quadrature-phase plane. A second modulation symbol by modulating a second information signal using the first modulation scheme, and by changing a second position at which a signal point of the modulated second information signal is arranged to a third position in the in-phase quadrature-phase plane, and an OFDM modulation signal including the first modulation symbol and the second modulation symbol, wherein the OFDM modulation signal comprises a plurality of subcarriers.

8 Claims, 71 Drawing Sheets

: OFDM, OFDM-SPREADING MODULATION MULTIPLEX SYMBOL (1 SYMBOL)

: OFDM OR OFDM-SPREADING MODULATION SYMBOL (1 SYMBOL)

: OFDM, OFDM-SPREADING MODULATION MULTIPLEX SYMBOL (1 SYMBOL)

: OFDM OR OFDM-SPREADING MODULATION SYMBOL (1 SYMBOL)

TRANSMISSION DEVICE, RECEPTION DEVICE, AND RADIO COMMUNICATION METHOD

CROSS-REFERENCE PARAGRAPH

The present application is a continuing application of pending U.S. patent application Ser. No. 12/767,117, filed on Apr. 26, 2010, which is a continuation of U.S. patent application Ser. No. 10/485,115, filed on Feb. 4, 2004, now U.S. Pat. No. 7,724,638, which is a National Stage Application of PCT/JP02/07407, filed Jul. 23, 2002, which claims the benefit of Japanese Application Nos. 2001-244929, filed Aug. 10, 2001; 2001-310777, filed Oct. 5, 2001; and 2002-206150, filed Jul. 15, 2002, the contents of which are expressly incorporated herein by reference in their entireties.

TECHNICAL FIELD

The present invention relates to a transmitting apparatus, receiving apparatus, and radio communication method used in a communication system in which a greater amount of data is transmitted in a limited frequency band.

BACKGROUND ART

An example of frame configuration along the time axis in a conventional radio communication system is shown in FIG. 1. In FIG. 1, reference code 1 indicates data symbols, reference code 2 pilot symbols, and reference code 3 a unique word. In order to demodulate a signal transmitted from a transmitting apparatus, a receiving apparatus must acquire time synchronization with the transmitting apparatus. For this purpose, the receiving apparatus acquires time synchronization by detecting unique word 3, for example. Also, when demodulating data symbols 1, the receiving apparatus compensates for channel fluctuations using pilot symbols 2.

However, in a conventional radio communication system, since a unique word and pilot symbols that carry no information are inserted on the time axis of the frame configuration, the data transmission speed falls proportionally.

Thus, the idea has been considered of using a different frequency band for unique words and pilot symbols from that used for data, and transmitting these at the same time as data. However, a drawback in this case is that the frequency band used becomes wider. There is also a drawback in that, since a different frequency band from that for data is used, unique words and pilot symbols undergo different propagation path fluctuations than data, and precision when compensating for channel fluctuations degrades.

DISCLOSURE OF INVENTION

It is an object of the present invention to provide a transmitting apparatus, receiving apparatus, and radio communication method whereby a greater amount of data is transmitted without degrading reception quality using a limited frequency band.

This object is achieved by transmitting a plurality of modulated signals multiplexed in the same frequency band. However, a plurality of modulated signals are not simply multiplexed, but modulated signals such that each signal can be separated on the receiving side are combined and multiplexed in the same frequency band.

It is proposed that, as this combination, modulated signals in which a preset signal sequence has been digitally modulated, modulated signals digitally modulated by means of a spread spectrum system, OFDM-spread modulated signals, modulated signals digitally modulated by means of a spread spectrum system using spreading codes with different spreading ratios, OFDM-spread modulated signals formed using spreading codes with different spreading ratios, and so forth, be included in a multiplex signal and transmitted.

Then, on the receiving side, from within the multiplex signal containing the above-described modulated signals, the above-described modulated signals first undergo correlation processing with a preset signal sequence, despreading processing, despreading processing using spreading codes with different spreading ratios, and so forth, and are demodulated. Next, replica signals of the provisionally demodulated signals are formed, and by eliminating the replica signals from the multiplex signal, the other signals contained in the multiplex signal are extracted.

By this means, even when a plurality of modulated signals are transmitted multiplexed in the same frequency band, it is possible to separate and demodulate these signals on the receiving side.

BEST MODE FOR CARRYING OUT THE INVENTION

With reference now to the accompanying drawings, embodiments of the present invention will be explained in detail below.

Embodiment 1

In Embodiment 1, a case is described in which a modulated signal in which information is digitally modulated (hereinafter referred to as "information modulated signal") and a modulated signal in which a specific signal sequence is digitally modulated (hereinafter referred to as "specific information signal") are multiplexed in the same frequency band on the transmitting side, and on the receiving side the multiplexed signals are separated and the information modulated signal is demodulated.

Figure 1:
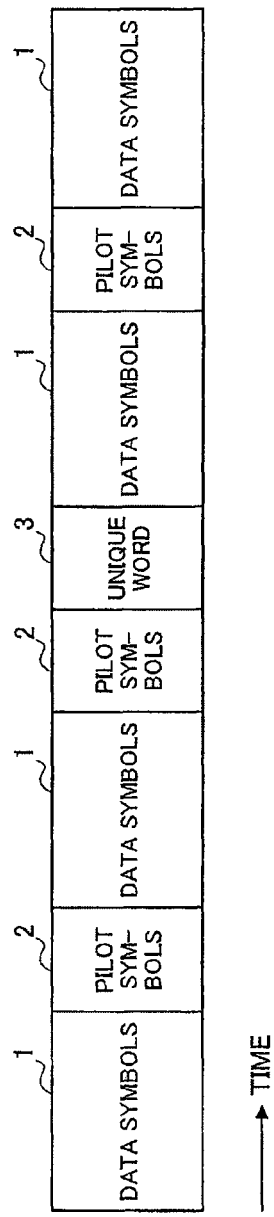
FIG. 1 is a drawing showing a sample frame configuration in a conventional radio communication system.
Figure 2:
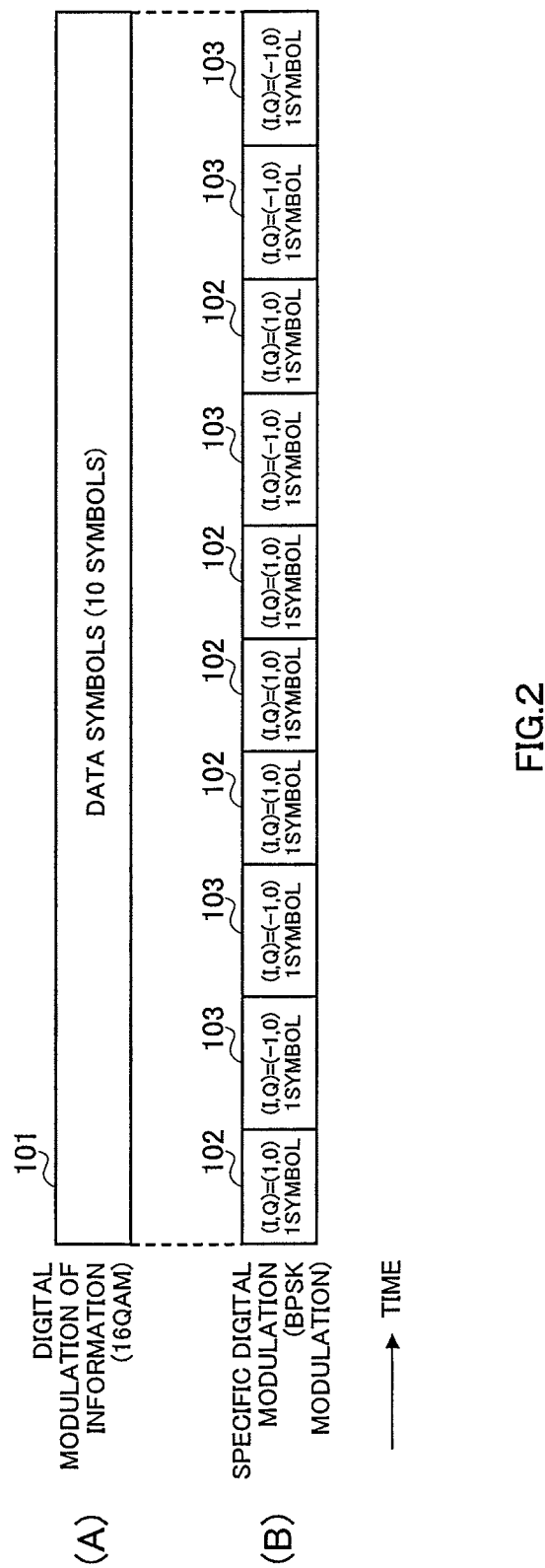
FIG. 2 is a drawing showing an example of frame configurations of a multiplex transmit signal according to Embodiment 1 of the present invention.

FIG. 2 is a drawing showing an example of frame configurations according to Embodiment 1. FIG. 2 (A) shows the information modulated signal frame configuration when 16QAM is used as the modulation method, with data symbols 101 comprising 10 symbols. FIG. 2 (B) shows the specific modulated signal frame configuration, with BPSK modulation used as the modulation method by way of example.

Figure 3:
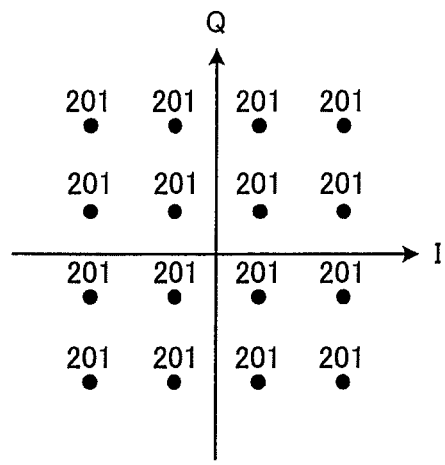
FIG. 3 is a drawing showing 16QAM signal point arrangement in the I-Q plane.

FIG. 3 is a drawing shows 16QAM signal point mapping in the in-phase-quadrature plane (I-Q plane), with reference codes 201 indicating 16QAM signal points. Data symbols 101 in FIG. 2 (A) are arranged at signal points 201 in FIG. 3.

Figure 4:
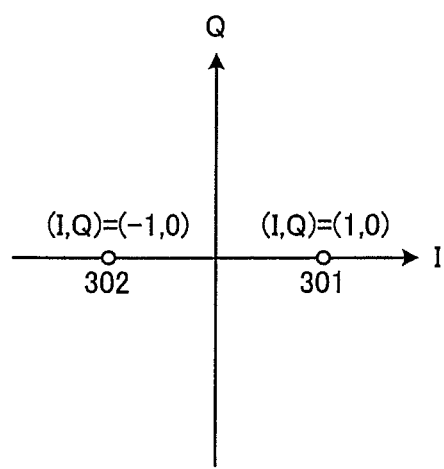
FIG. 4 is a drawing showing BPSK modulation signal point arrangement in the I-Q plane.

FIG. 4 is a drawing showing BPSK modulation signal point mapping in the I-Q plane. Reference code 301 and reference code 302 indicate BPSK modulation signal points, with BPSK modulation signal point 301 coordinates of (I,Q)=(1, 0), and BPSK modulation signal point 302 coordinates of (I,Q)=(−1,0). Reference code 102 in FIG. 2 indicates a symbol at BPSK modulation signal point 301 in FIG. 4, and reference code 103 indicates a symbol at BPSK modulation signal point 302 in FIG. 4. At this time, a specific modulated signal frame with which an information modulated signal is modulated is composed of five reference code 102 symbols and five reference code 103 symbols, as shown in FIG. 2 (B).

FIG. 2 is an example of frame configurations of a radio communication system according to this embodiment, and has, for example, a signal with a cycle on the time axis as a specific modulated signal, with a known signal such as shown in FIG. 2 (B) or information, as with spread spectrum communication, transmitted, but a signal with systematicness may also be used within the spreading code cycle. In this embodiment, a specific modulated signal is used as a pilot symbol.

Figure 5:
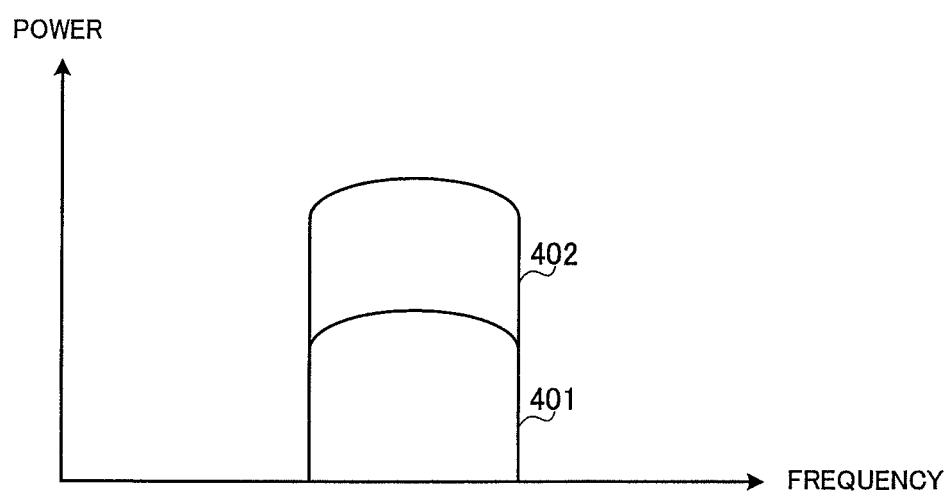
FIG. 5 is a conceptual diagram showing frequency arrangement in Embodiment 1.

The way in which the information modulated signal in FIG. 2 (A) and specific modulated signal in terminal 2B are multiplexed is shown in FIG. 5. FIG. 5 shows the arrangement of an information modulated signal and specific modulated signal, with the vertical axis indicating signal power and the horizontal axis indicating frequency. Reference code 401 indicates the information modulated signal spectrum, and reference code 402 the specific modulated signal spectrum. At this time, as shown in FIG. 5, information modulated signal spectrum 401 and specific modulated signal spectrum 402 are multiplexed, by which means frequency is utilized effectively.

These signals can be multiplexed in the same frequency band in this way by making the band occupied by information modulated signal spectrum 401 and the band occupied by specific modulated signal spectrum 402 equal. This can be done by making the information modulated signal symbol transmission speed and specific modulated signal symbol transmission speed equal.

Figure 6:
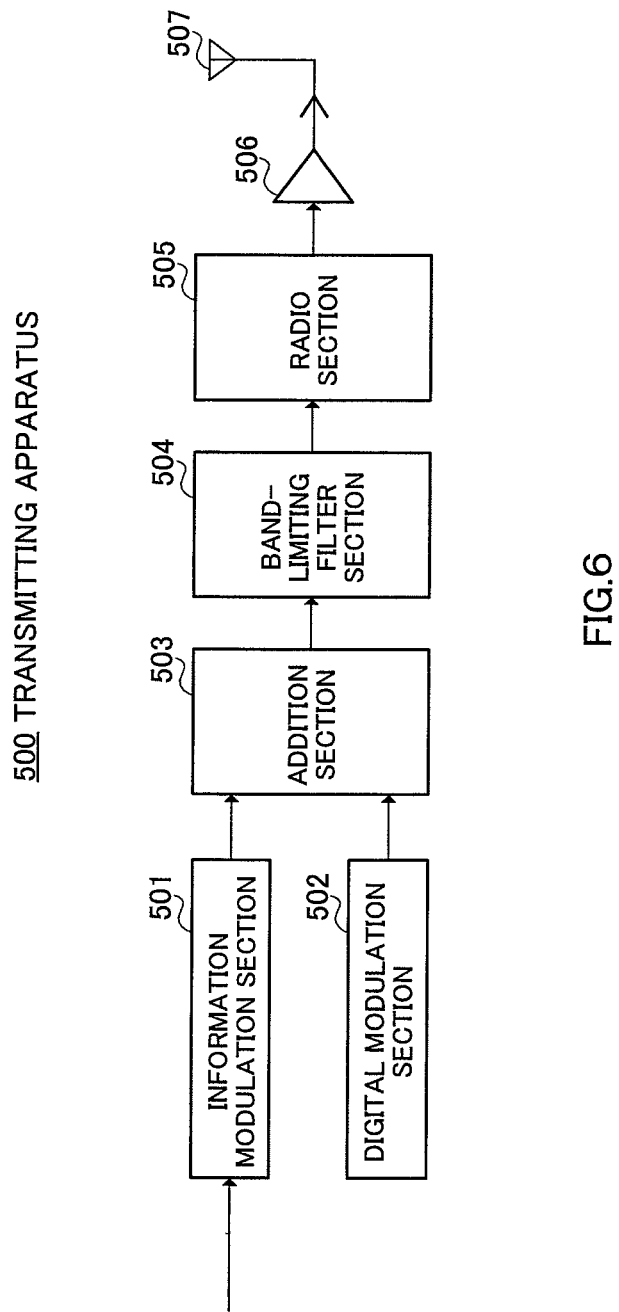
FIG. 6 is a block diagram showing the configuration of a transmitting apparatus of Embodiment 1.

FIG. 6 shows the configuration of a transmitting apparatus according to this embodiment. Here, FIG. 6 will be described taking the frame configuration in FIG. 2 as an example. In FIG. 6, an information modulation section 501 performs 16QAM modulation of an input information signal, and outputs an information modulated signal to an addition section 503. A digital modulation section 502 outputs to addition section 503 a specific modulated signal that has undergone 10-symbol cycle BPSK modulation on the time axis in accordance with the frame configuration in FIG. 2 (B).

Addition section 503 multiplexes the information modulated signal output from 501 and the BPSK modulated specific modulated signal output from digital modulation section 502, and outputs the multiplexed signal (hereinafter referred to as "multiplex signal") to a band-limiting filter section 504.

Band-limiting filter section 504 performs band-limiting of the multiplex signal output from addition section 503 by means of a Nyquist filter, for example, and outputs the resulting signal to a radio section 505. Radio section 505 performs predetermined radio processing on the band-limited signal output from band-limiting filter section 504, and outputs a transmit signal to a transmission power amplification section 506. Transmission power amplification section 506 performs power amplification on the signal that has undergone radio processing output from radio section 505, and transmits the resulting signal via an antenna 507.

Figure 7:
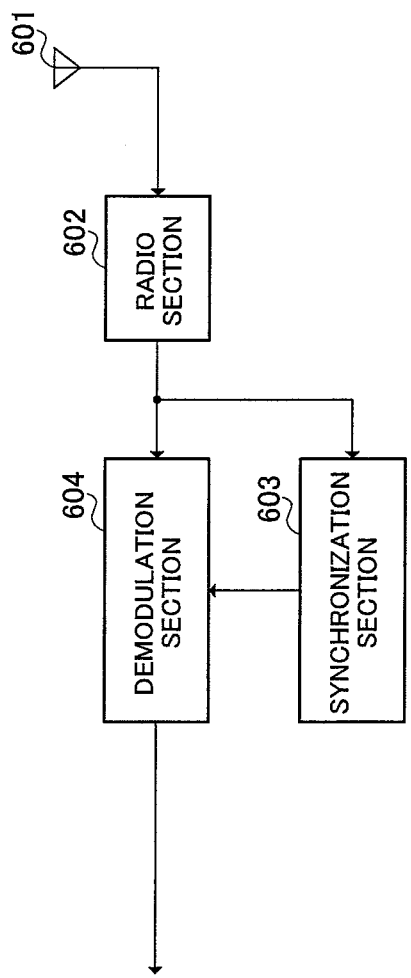
FIG. 7 is a block diagram showing the configuration of a receiving apparatus of Embodiment 1.

FIG. 7 shows the configuration of a receiving apparatus according to this embodiment. In FIG. 7, a radio section 602 performs predetermined radio processing on a signal received via an antenna 601 (received signal), and outputs the resulting signal to a synchronization section 603 and demodulation section 604.

Synchronization section 603 acquires synchronization with the transmitting apparatus based on the signal that has undergone radio processing output from radio section 602, and outputs a timing signal to demodulation section 604. Demodulation section 604 demodulates the signal that has undergone radio processing output from radio section 602 based on the timing signal output from synchronization section 603, and outputs an information signal.

The operation of a transmitting apparatus and receiving apparatus with the above configurations will now be described. In FIG. 6, an information signal undergoes 16QAM modulation by information modulation section 501, and is output to addition section 503. A signal that has a 10-symbol cycle in accordance with the frame configuration in FIG. 2 (B) undergoes BPSK modulation by digital modulation section 502, and the resulting signal is output to addition section 503.

The information modulated signal output from information modulation section 501 and the BPSK modulated specific modulated signal output from digital modulation section 502 are multiplexed by addition section 503, and the resulting signal is output to band-limiting filter section 504. The multiplex signal output from addition section 503 is band-limited by band-limiting filter section 504 and output to radio section 505. The band-limited signal output from band-limiting filter section 504 undergoes predetermined radio processing by radio section 505, and the resulting signal is output to transmission power amplification section 506. The signal that has undergone radio processing output from radio section 505 undergoes power amplification by transmission power amplification section 506, and the resulting signal is transmitted via antenna 507.

A signal transmitted from the transmitting apparatus is received by radio section 602 via antenna 601 in FIG. 7. The signal received via antenna 601 (received signal) undergoes predetermined radio processing by radio section 602, and the resulting signal is output to synchronization section 603 and demodulation section 604. The signal output from radio section 602 undergoes time synchronization with the transmitting apparatus by synchronization section 603, and a timing signal is output to demodulation section 604. The signal output from radio section 602 is demodulated by demodulation section 604 based on the timing signal output from synchronization section 603.

Figure 8:
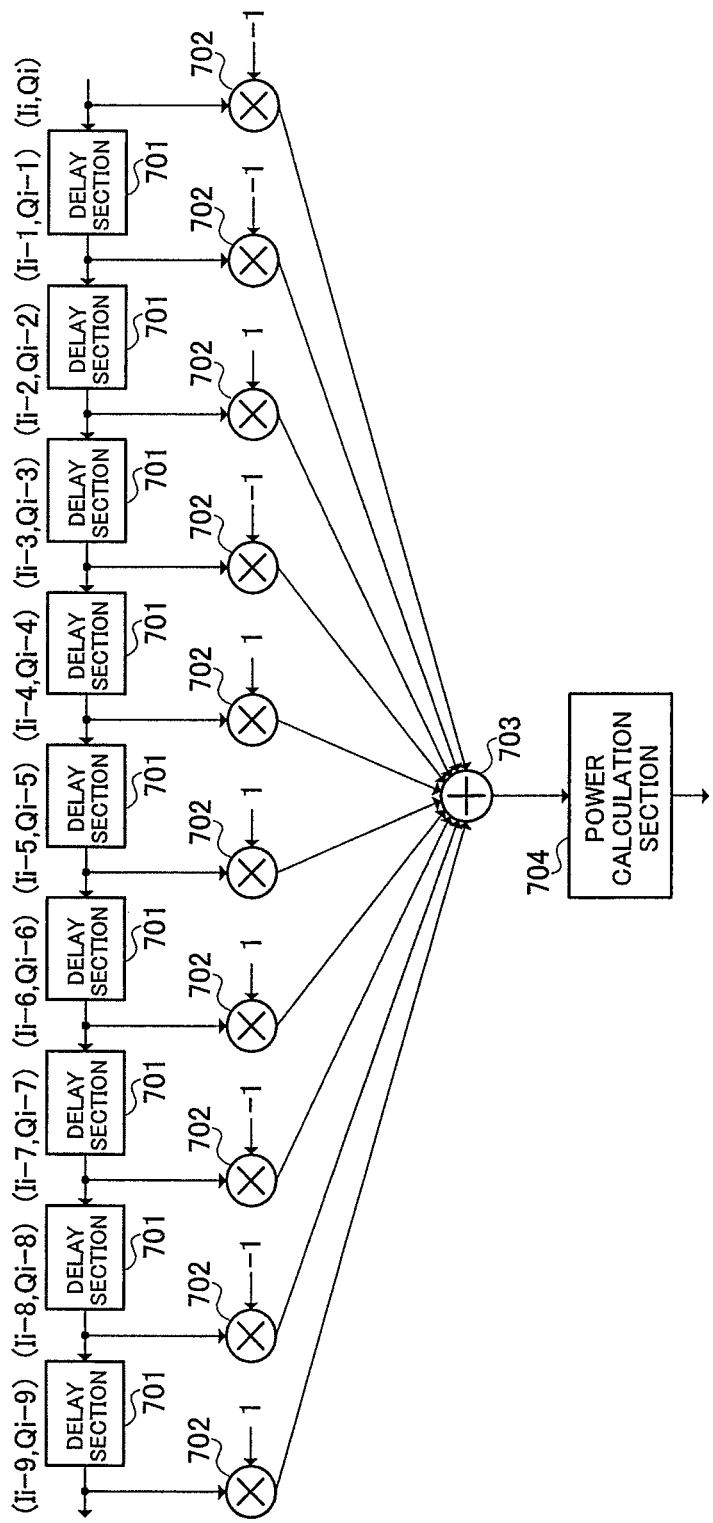
FIG. 8 is a drawing provided for explanation of correlation computation by a synchronization section.

The internal configuration of synchronization section 603 in FIG. 7 will now be described using FIG. 8. FIG. 8 shows the configuration whereby correlation computation is performed in this embodiment. In the description here, a signal transmitted using the frame configuration in FIG. 2 is taken as an example. A delay section 701 outputs the input signal delayed by one symbol. Here, a received quadrature baseband signal is designated (Ii,Qi), a received quadrature baseband signal delayed by one symbol is designated (Ii−1,Qi−1), a received quadrature baseband signal delayed by two symbols is designated (Ii−2,Qi−2), and a received quadrature baseband signal delayed by n symbols is designated (Ii−n,Qi−n) (where $1 \leq n \leq 9$).

Signals delayed by n symbols by delay section 701 and the received quadrature baseband signal are multiplied by a predetermined constant (1 or −1 derived from the symbol arrangement shown in FIG. 2 (B)) in a multiplication section 702, and correlation is established with the transmitted 10-symbol cycle BPSK modulated signal. The multiplied signals are output to an addition section 703.

The multiplied signals output by multiplication section 702 are added by addition section 703, and the added signals (Iadd, Qadd) are output to a power calculation section 704. The added signals (Iadd, Qadd) output by addition section 703 undergo processing in power calculation section 704 to obtain a correlation signal ($Iadd^2 + Qadd^2$), which is output.

Figure 9:
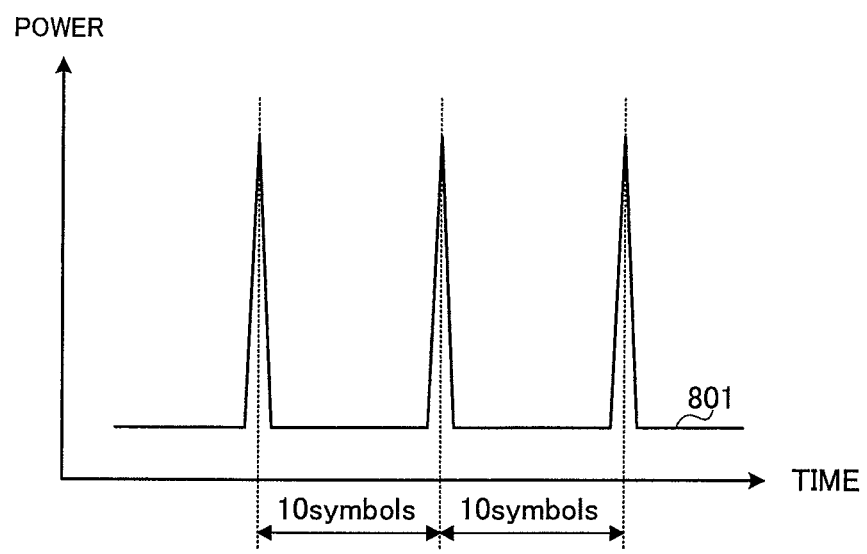
FIG. 9 is a drawing showing correlated signal time fluctuations.

The nature of time fluctuations of the correlated signal obtained by power calculation section 704 is shown in FIG. 9. The horizontal axis indicates time and the vertical axis power, and reference code 801 shows the fluctuations. As shown by reference code 801, the specific modulated signal cycle has a correlation peak every 10 symbols. The receiving apparatus can acquire time synchronization with the transmitting apparatus by detecting this peak position. Therefore, time synchronization between transmission and reception can be acquired without inserting a unique word for that purpose. Consequently, since unique words need not be inserted into the information modulated signal, data transmission efficiency can be improved correspondingly.

Figure 10:
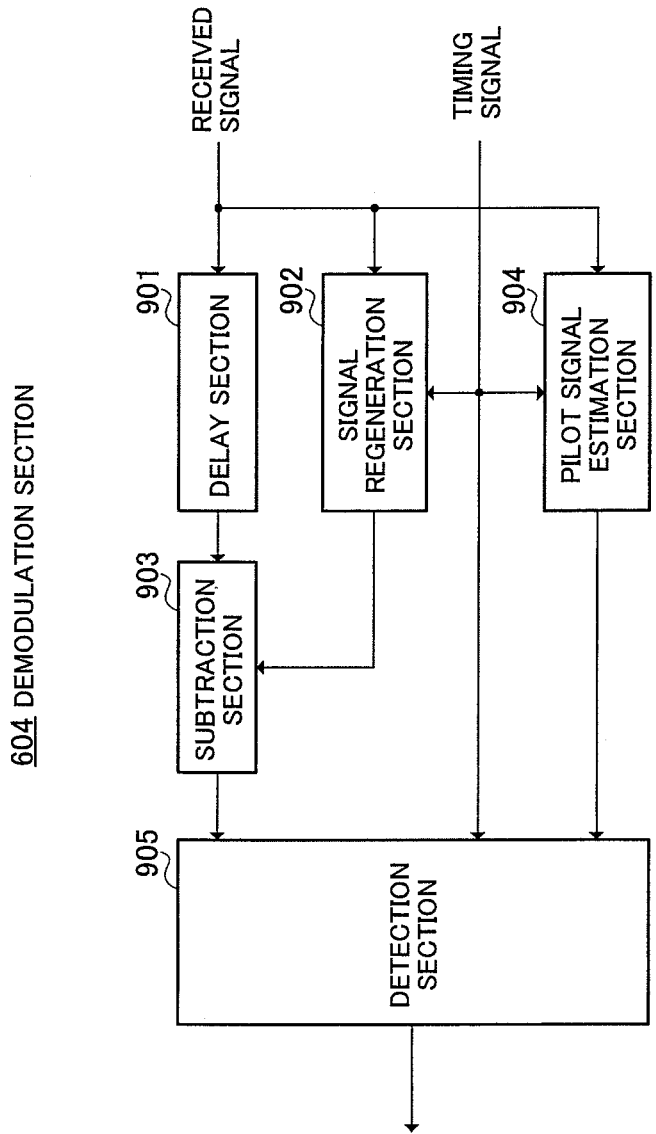
FIG. 10 is a block diagram showing the internal configuration of the demodulation section of FIG. 7.

FIG. 10 shows the internal configuration of demodulation section 604 in FIG. 7. A delay section 901 delays an input received signal by the amount of time taken to regenerate a signal in a signal regeneration section 902, and outputs the delayed received signal to a subtraction section 903. Signal regeneration section 902 regenerates a specific modulated signal from the input received signal based on an input timing signal, and outputs the regenerated signal to subtraction section 903. The operation of signal regeneration section 902 will be described in detail later herein.

Subtraction section 903 subtracts the specific modulated signal output from signal regeneration section 902 from the delayed received signal output from delay section 901. By this means, the specific modulated signal is eliminated from the received signal, and the information modulated signal only is extracted. The information modulated signal is then output to a detection section 905.

Based on an input timing signal, a pilot signal estimation section 904 extracts the specific modulated signal resulting from elimination of the information modulated signal from the input received signal, and outputs this extracted signal to detection section 905 as a known pilot signal between transmission and reception. The operation of pilot signal estimation section 904 will be described in detail later herein. Based on the specific modulated signal output from pilot signal estimation section 904 and the timing signal, detection section 905 performs detection processing on the information modulated signal output from subtraction section 903, and outputs the signal after detection.

By using a specific modulated signal as a pilot signal in this way, an information modulated signal can be detected without inserting pilot symbols in the information modulated signal. As a result, data symbols can be assigned instead of pilot symbols, enabling data transmission efficiency to be improved.

Figure 11:
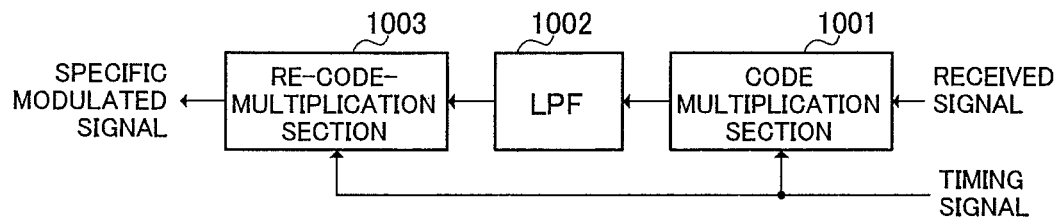
FIG. 11 is a block diagram showing the internal configuration of the signal regeneration section of FIG. 10.

FIG. 11 shows the internal configuration of signal regeneration section 902 in FIG. 10. In FIG. 11, a code multiplication section 1001 multiplies the input received signal by a code corresponding to the specific modulated signal based on the timing signal; and outputs the received signal that has undergone code multiplication to an LPF (Low Pass Filter) 1002. LPF 1002 eliminates the information modulated signal component from the post-code-multiplication multiplex signal output from code multiplication section 1001 (the information modulated signal component in the post-code-multiplication multiplex signal is a high-frequency component), and outputs the specific modulated signal component to a re-code-multiplication section 1003. Re-code-multiplication section 1003 regenerates a specific modulated signal by performing code multiplication again on the specific modulated signal component that has passed through LPF 1002, based on the timing signal. In this way, a specific modulated signal replica signal is formed.

Figure 12:
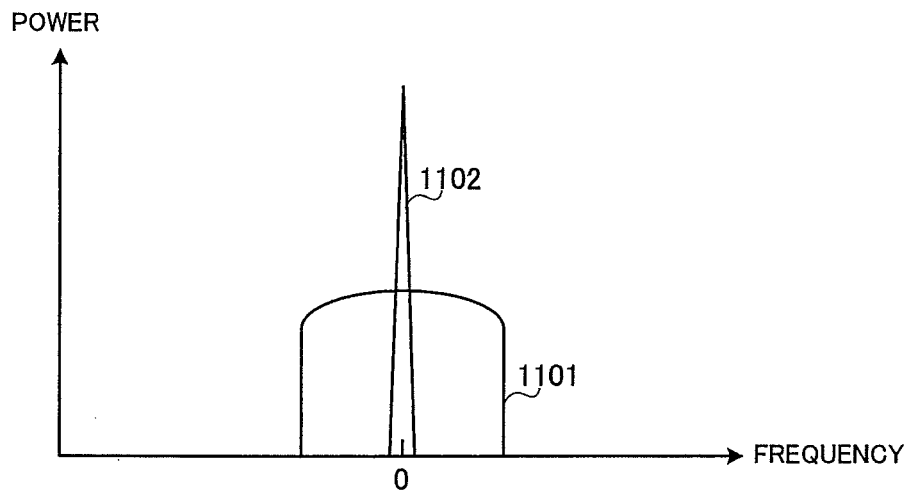
FIG. 12 is a drawing showing the spectral distribution of a signal after code multiplication.

A received signal that has undergone code multiplication by code multiplication section 1001 will now be described in detail using FIG. 12. A received quadrature baseband signal following code multiplication is composed of a post-code-multiplication information modulated signal and specific modulated signal. At this time, as shown in FIG. 12, the frequency axis spectrum of the post-code-multiplication information modulated signal is as indicated by reference code 1101, and the specific modulated signal frequency axis spectrum is as indicated by reference code 1102. Thus, since the frequency of specific modulated signal spectrum 1102 is lower than that of information modulated signal spectrum 1101, the information modulated signal component can be eliminated from the post-code-multiplication signal by LPF 1002, and the signal that has passed through LPF 1002 comprises only the specific modulated signal component.

Figure 13:
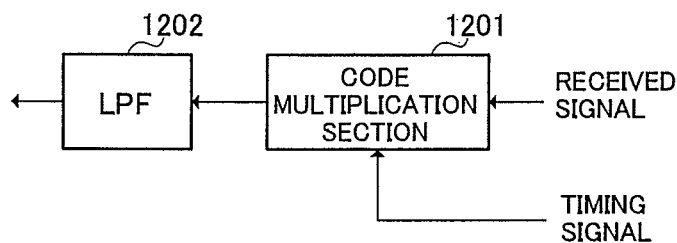
FIG. 13 is a block diagram showing the internal configuration of the pilot signal estimation section of FIG. 10.

FIG. 13 shows the internal configuration of pilot signal estimation section 904 in FIG. 10. A code multiplication section 1201 performs code multiplication on the input received signal based on the timing signal, and outputs the post-code-multiplication received signal to an LPF 1202. LPF 1202 outputs only the specific modulated signal component from the post-code-multiplication received signal output from code multiplication section 1201, and uses this signal as a pilot signal.

In FIG. 2, a case is illustrated in which BPSK modulation is used for the specific modulated signal, but this is not a limitation. For example, when a multiplexed specific modulated signal is used as a pilot signal, use of PSK modulation in which there is no information in the amplitude component in the I-Q plane is an effective means, and the configurations of the transmitting apparatus and receiving apparatus are particularly simple when BPSK modulation or QPSK modulation is used.

In a receiving apparatus of a radio communication system according to this embodiment, an information modulated signal cannot be demodulated if the signal sequence of a specific modulated signal to be multiplexed is not known. Therefore, secure radio communication can be carried out by using a multiplexed specific modulated signal as an encryption key.

The specific modulated signal to be multiplexed here has a 10 symbol cycle as shown for instance in FIG. 2 (B), and can be generated in a variety of types. By changing the type of the specific modulated signal to be multiplexed at the transmission apparatus and identifying the specific modulated signal to be multiplexed at the receiving apparatus, information is in effect transmitted to the receiving apparatus and can be used as simplified control information for the receiving apparatus.

As described above, according to this embodiment, it is possible to increase the amount of information that can be sent dependably in a limited frequency band by having the transmitting apparatus transmit an information modulated signal and specific modulated signal multiplexed in the same frequency band. Also, it is possible to separate the information modulated signal and specific modulated signal from the multiplex signal, and demodulate the information modulated signal compensating for propagation path fluctuations based on the specific modulated signal, thereby eliminating the necessity of inserting unique words or pilot symbols in an information modulated signal by time division, and so enabling the data transmission speed to be improved correspondingly.

Embodiment 2

In Embodiment 2 a radio communication method is described whereby a transmit signal multiplexed according to Embodiment 1 is transmitted simultaneously by a plurality of stations.

Figure 14:
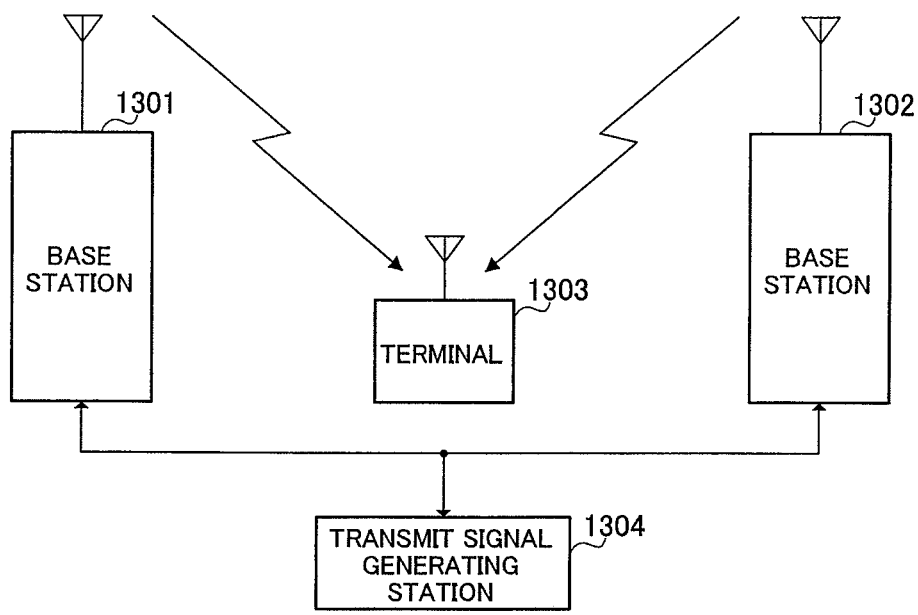
FIG. 14 is a drawing showing the configuration of a radio communication system of Embodiment 2 of the present invention.

FIG. 14 shows the configuration of a radio communication system according to this embodiment. In FIG. 14, a transmit signal generating station 1304 generates, and transmits to a base station 1301 and base station 1302, a modulated signal with the frame configuration in FIG. 2, for example, and base station 1301 and base station 1302 perform radio transmission of an information modulated signal and specific modulated signal multiplexed in the same frequency band. It is assumed that a terminal 1303 is equipped with a receiving apparatus as shown in FIG. 7, and synchronization section 603 is equipped with a correlation calculation section as shown in FIG. 8.

Figure 15:
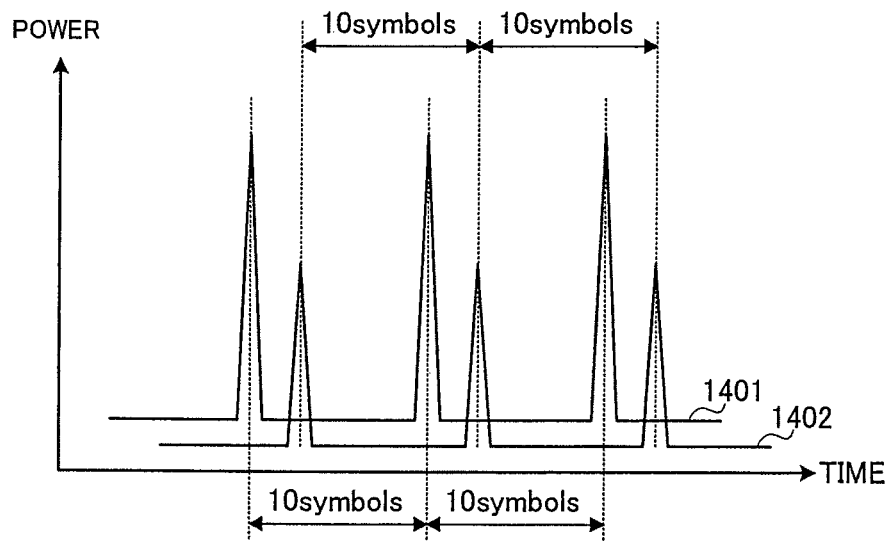
FIG. 15 is a drawing showing an example of correlation characteristics in Embodiment 2.

As shown in FIG. 14, terminal 1303 receives a radio wave from base station 1301 and a radio wave from base station 1302. At this time, terminal 1303 can improve reception error rate characteristics by separating and equalizing the radio wave from base station 1301 and the radio wave from base station 1302. This will be explained using FIG. 15. FIG. 15 shows an example of correlation characteristics when terminal 1303 receives a radio wave from base station 1301 and a radio wave from base station 1302, and performs the correlation computation shown in FIG. 8. In FIG. 15, reference code 1401 indicates the correlation characteristic of a radio wave from base station 1301, and reference code 1402 indicates the correlation characteristic of a radio wave from base station 1302. As shown in FIG. 15, there are propagation delays until the radio wave from base station 1301 and the radio wave from base station 1302 arrive at terminal 1303. Reception error rate characteristics in terminal 1303 can be improved by equalizing the received signals based on the difference in these delays.

As described above, according to this embodiment, when a transmit signal multiplexed according to Embodiment 1 is transmitted simultaneously by a plurality of stations, reception error rate characteristics can be improved by having a receiving apparatus that receives multiplexed transmit signals equalize the received signals.

Embodiment 3

In Embodiment 3 a case is described in which an information modulated signal and a modulated signal modulated by means of a spread spectrum communication system modulation method (hereinafter referred to as "spread modulated signal") are multiplexed in the same frequency band, and on the receiving side the multiplexed signal is separated into an information modulated signal and spread modulated signal and demodulated.

Figure 16:
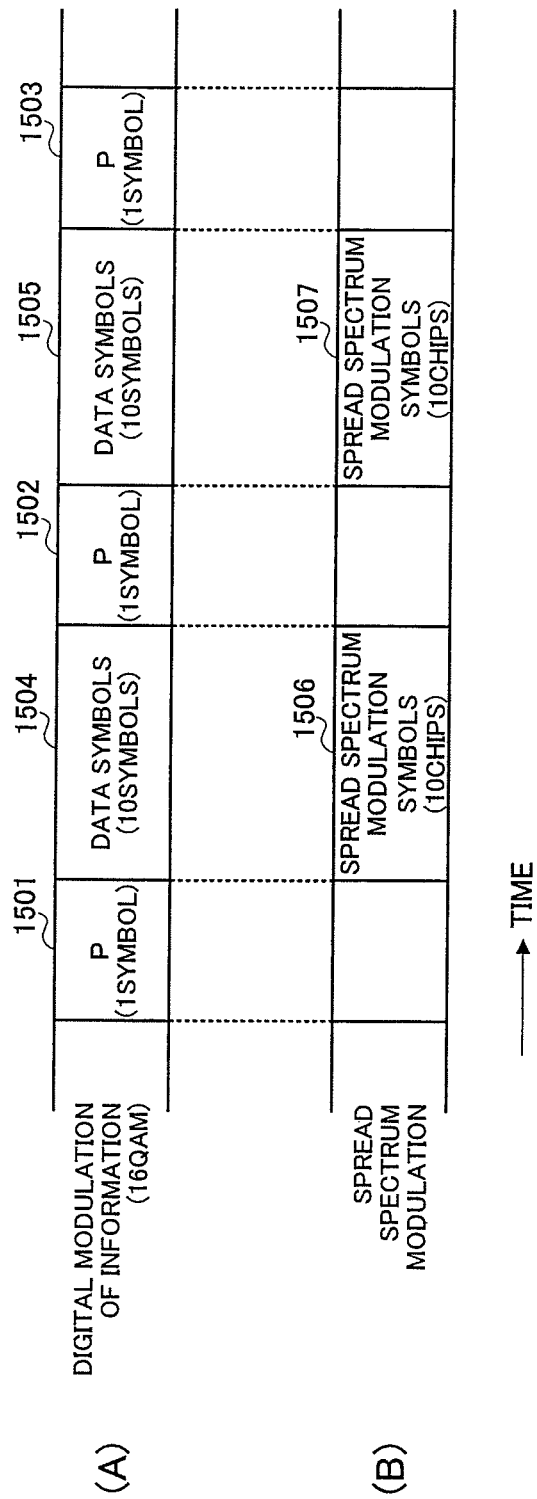
FIG. 16 is a drawing showing sample frame configurations of a multiplex transmit signal according to Embodiment 3.

FIG. 16 shows an example of frame configurations on the time axis of a radio communication system according to this embodiment. FIG. 16 (A) shows the information modulated signal frame configuration, and assumes the use of 16QAM modulation as the modulation method. Reference codes 1501, 1502, and 1503 indicate pilot symbol fields, each comprising one symbol. Reference codes 1504 and 1505 indicate data symbol fields, each comprising 10 symbols. FIG. 16 (B), on the other hand, shows the information spread modulated signal frame configuration. Reference codes 1506 and 1507 indicate spread spectrum modulation symbol fields. When spread spectrum processing is performed, each field comprises 10 chips corresponding to 10 symbols. Data symbols and spread spectrum modulation symbols are assumed to be multiplexed on the time axis.

Figure 17:
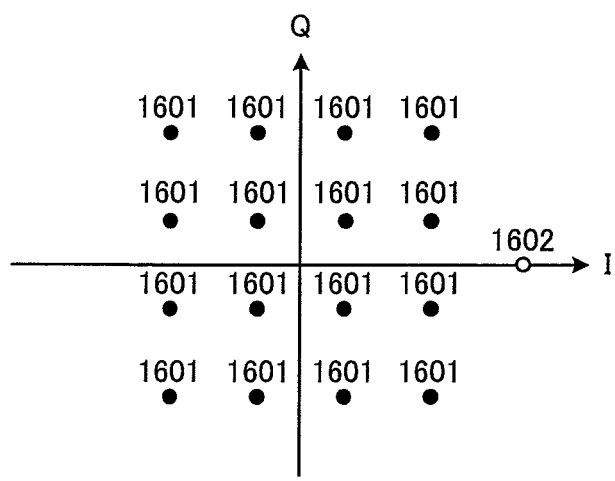
FIG. 17 is a drawing showing 16QAM and pilot symbol signal point arrangement in the I-Q plane.

FIG. 17 shows 16QAM and pilot symbol signal point mapping in the I-Q plane. In FIG. 17, reference code 1601 indicates signal points of the data symbols indicated by reference codes 1504 and 1505 in FIG. 16, and reference code 1602 indicates the signal point of the pilot symbols indicated by reference codes 1501, 1502, and 1503 in FIG. 16.

Figure 18:
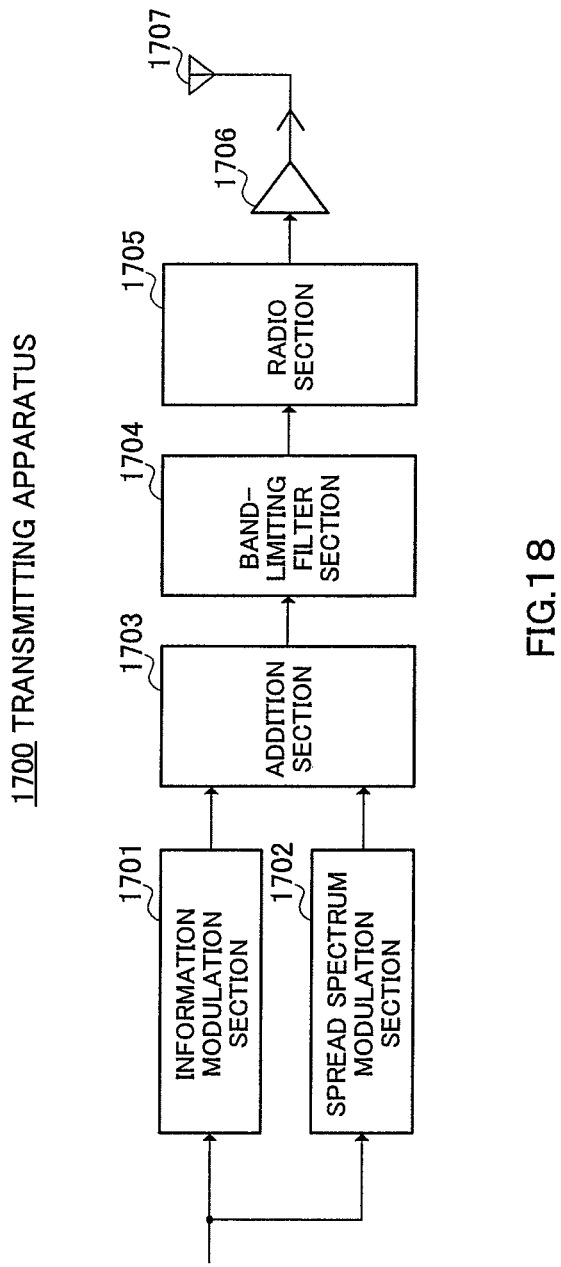
FIG. 18 is a block diagram showing the configuration of a transmitting apparatus of Embodiment 3.

FIG. 18 shows the configuration a transmitting apparatus 1700 according to this embodiment. In FIG. 18, an information modulation section 1701 performs digital modulation in accordance with the frame configuration in FIG. 2 (A) on an input information signal, and outputs an information modulated signal to an addition section 1703. A spread spectrum modulation section 1702 performs spread spectrum modulation on the input information signal, and outputs a spread modulated signal in accordance with the frame configuration in FIG. 2 (B) to addition section 1703.

Addition section 1703 adds the information modulated signal output from information modulation section 1701 and the spread modulated signal output from spread spectrum modulation section 1702, and outputs the signal resulting from the addition (multiplex signal) to a band-limiting filter section 1704. Band-limiting filter section 1704 performs band-limiting on the multiplex signal output by addition section 1703, and outputs the resulting signal to a radio section 1705.

Radio section 1705 performs predetermined radio processing on the band-limited signal output from band-limiting filter section 1704, and outputs a transmit signal to a transmission power amplification section 1706. Transmission power amplification section 1706 performs power amplification on the transmit signal output from radio section 1705, and transmits the amplified transmit signal via an antenna 1707.

By this means it is possible to transmit a modulated signal in which an information modulated signal and spread modulated signal are multiplexed.

Figure 19:
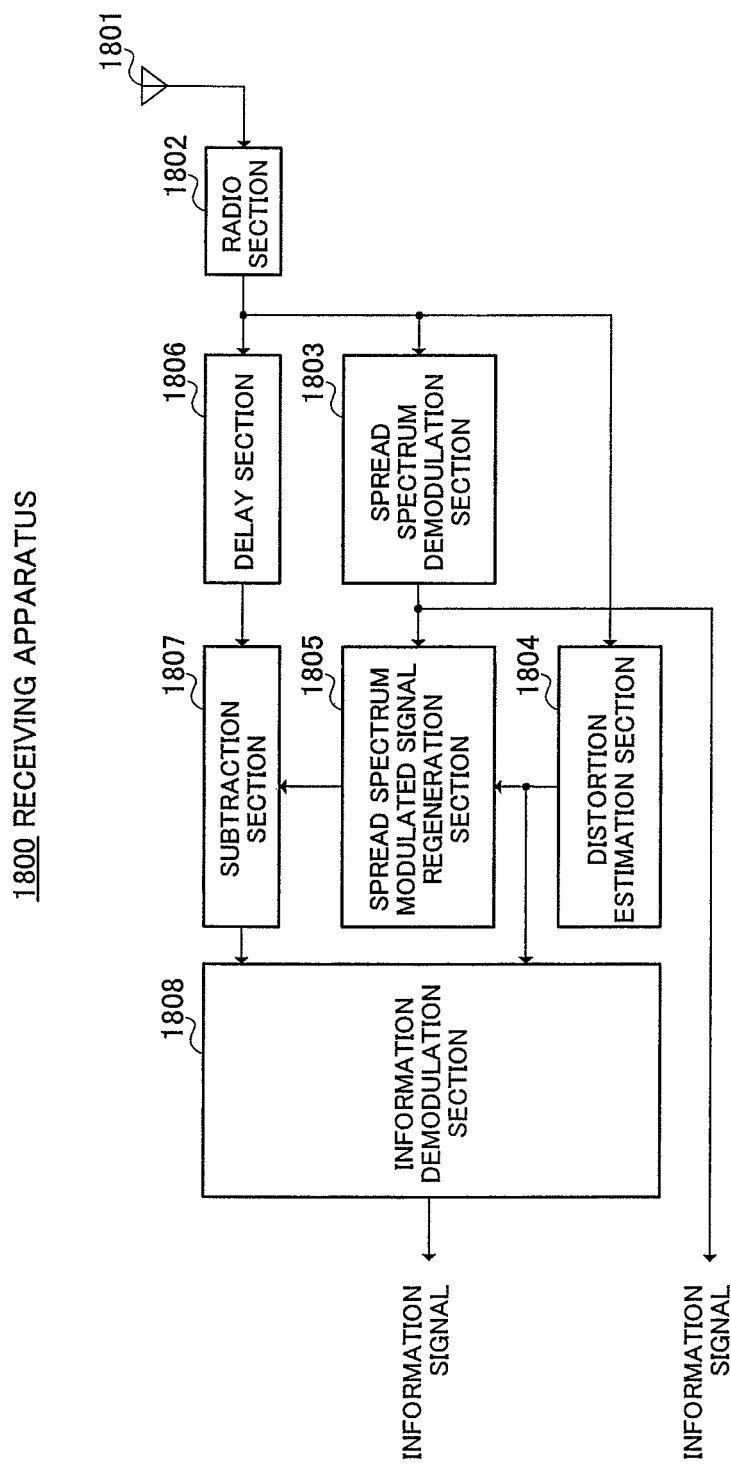
FIG. 19 is a block diagram showing the configuration of a receiving apparatus of Embodiment 3.

FIG. 19 shows the configuration of a receiving apparatus 1800 according to this embodiment. Demodulation of 16QAM modulated data symbols 1504 and spread spectrum modulation symbols 1506 in the frame configurations shown in FIG. 16 is described below. In FIG. 19, a radio section 1802 performs predetermined radio processing on a signal received via an antenna 1801 (received signal), and outputs the received signal that has undergone radio processing to a spread spectrum demodulation section 1803 and delay section 1806.

Spread spectrum demodulation section 1803 performs spread spectrum demodulation of the signal output by radio section 1802, and outputs the obtained received digital signal to a spread spectrum modulated signal regeneration section 1805. A distortion estimation section 1804 detects, for example, pilot symbols 1501 and 1502 in FIG. 16 from the input received signal, estimates received signal distortion in data symbols 1504 and spread spectrum modulation symbols 1506, and outputs a signal indicating this distortion (hereinafter referred to as "distortion signal") to spread spectrum modulated signal regeneration section 1805 and an information demodulation section 1808. The operation of distortion estimation section 1804 will be described in detail later herein.

Spread spectrum modulated signal regeneration section 1805 forms a replica signal of the spread spectrum modulated signal by executing the reverse of the processing of spread spectrum modulation section 1702 on the received digital signal output by spread spectrum demodulation section 1803. At this time, spread spectrum modulated signal regeneration section 1805 forms a replica signal that includes the amount of distortion in transmission by forming a replica signal using distortion information estimated by distortion estimation section 1804. The formed replica signal is then output to a subtraction section 1807.

Delay section 1806 delays the input signal by the amount of time necessary to generate an estimated spread spectrum modulated signal, and outputs the delayed signal to subtraction section 1807. Subtraction section 1807 subtracts the spread modulated signal component contained in the received signal output from spread spectrum modulated signal regeneration section 1805 from the delayed signal output from delay section 1806, and outputs a received signal from which the multiplexed spread modulated signal component has been removed—that is to say, an information modulated signal only—to information demodulation section 1808.

Based on the received signal distortion signal output from distortion estimation section 1804, information demodulation section 1808 demodulates the information modulated signal output from subtraction section 1807, extracts information, and outputs an information signal.

Figure 20:
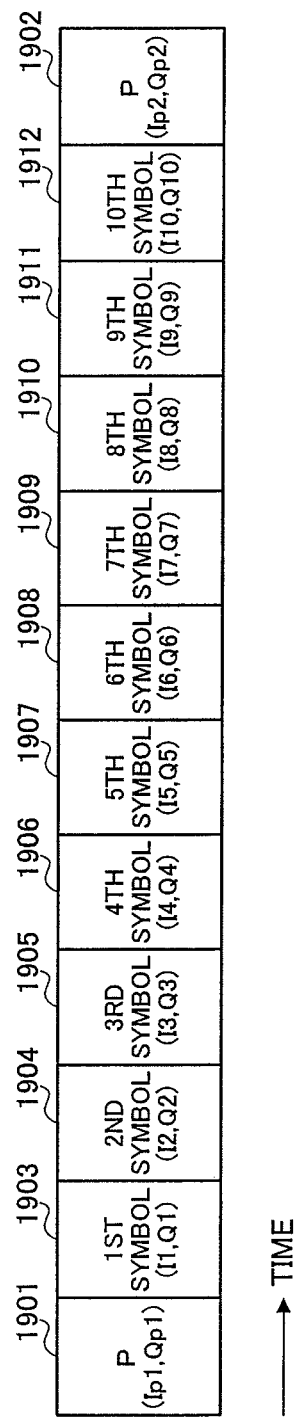
FIG. 20 is a drawing showing the configuration of pilot symbols and symbols between pilot symbols according to Embodiment 3.

The operation of distortion estimation section 1804 will now be described in detail using FIG. 20. FIG. 20 shows the configuration of pilot symbols and symbols between pilot symbols. In FIG. 20, reference codes 1901 and 1902 indicate pilot symbols, with pilot symbol 1901 taken as corresponding to pilot symbol 1501 in FIG. 16, the in-phase component of the received signal (quadrature baseband signal) at this time designated Ip1, and the quadrature phase component designated Qp1.

Also, pilot symbol 1902 indicates pilot symbol 1502 in FIG. 16, with the in-phase component of the received signal (quadrature baseband signal) at this time designated Ip2, and the quadrature phase component designated Qp2. If the in-phase component and quadrature phase component of the distortion signal of first pilot symbol 1901 are designated I1 and Q1, respectively, I1=10Ip1/11+Ip2/11 is obtained using Ip1 and Ip2, and Q1=10Qp1/11+Qp2/11 is obtained from Qp1 and Qp2.

Similarly, if the in-phase component and quadrature phase component of the distortion signal of the nth symbol (where 1≦n≦10) are designated In and Qn respectively, In=(11−n)Ip1/11+nIp2/ and Qn=(11−n)Qp1/11+nQp2/11 can be obtained. The distortion signal obtained in this way is output as the received signal (quadrature baseband signal) distortion signal.

By means of a receiving apparatus with the above-described configuration, an information modulated signal and spread modulated signal can be separated from a signal in which the information modulated signal and spread modulated signal are multiplexed in the same frequency band. Thus, the data transmission speed can be improved to the extent that an information modulated signal and spread modulated signal are transmitted multiplexed compared with the case where these signals are transmitted independently.

In the case shown in FIG. 18, the pilot signal generation function has been described as being assigned to information modulation section 1701, but this function may also be assigned to spread spectrum modulation section 1702. Also, as a different method, an apparatus configuration is possible in which a pilot signal generation section is provided, and the pilot signal generation function is not assigned to information modulation section 1701 or spread spectrum modulation section 1702.

The frame configurations are not limited to those shown in FIG. 16, and, for example, pilot symbols need not be inserted. In this case, a pilot generation function is not necessary. Also, a unique word, preamble, or other control symbols may be inserted.

In the receiving apparatus in FIG. 19, time synchronization with the transmitting apparatus is possible by computing the correlation between a multiplex signal and spread signal, for example, and detecting power peaks. This is the same as detecting a spread signal component of a multiplex signal.

The configurations of a transmitting apparatus and receiving apparatus are not limited to the configurations shown in FIG. 18 and FIG. 19.

In FIG. 16, use of a single-carrier method is described for an information modulated signal, but the method is not limited to a single-carrier method, and a multicarrier method such as an Orthogonal Frequency Division Multiplex (OFDM) method may be used. In this case, the horizontal axis in FIG. 16 showing frame configurations may be considered to be the frequency axis. Also, a case has been described in which 16QAM modulation is used as the modulation method, but BPSK modulation, QPSK modulation, or the like may also be used.

A case has been described in which the spread spectrum modulation code multiplexing number is one, but a multiplicity may also be used. Thus, in the transmitting apparatus in FIG. 18, the spread spectrum modulation section is not limited to performing spread spectrum modulation with one code, and a Code Division Multiple Access (CDMA) method may also be used. Also, the spread spectrum demodulation section and spread spectrum modulated signal regeneration section in FIG. 19 are not limited to performing demodulation and regeneration of a signal spread spectrum modulated with one code, and if code division multiple access is used, spread spectrum modulation and regeneration will be performed for multiplexed codes.

A specific position in the I-Q plane has been assumed for pilot symbols, as shown in FIG. 17, but this is not a limitation.

If the spreading code of a multiplexed spread spectrum signal is not known, a receiving apparatus of a radio communication system according to this embodiment cannot demodulate an information modulated signal. Thus, secure radio communication can be performed by making a spreading code an encryption key. Information on a spreading code changed by a transmitting apparatus is a receiving apparatus encryption key.

A spread spectrum communication method is more error resistant than a modulation method in which an information signal is digitally modulated. Thus, if data of a high level of importance is transmitted using a spread spectrum system, highly reliable radio communication can be performed. Taking this point into consideration, control information such as channel information and information signal modulation method information should be transmitted using a spread spectrum system.

As described above, according to this embodiment, by multiplexing an information modulated signal and spread modulated signal in the same frequency band on the transmitting side, on the receiving side the multiplexed signal can be separated into an information modulated signal and spread modulated signal and demodulated, enabling the data transmission speed to be improved by transmitting information in a multiplexed signal.

Embodiment 4

In Embodiment 4 a case is described in which an information modulated signal and specific modulated signal are multiplexed in the same frequency band, and information is transmitted by the type of a particular multiplexed specific digitally modulated signal (hereinafter referred to as "specific signal"), and on the receiving side the multiplexed signal is separated into an information modulated signal and specific signal.

Figure 21:
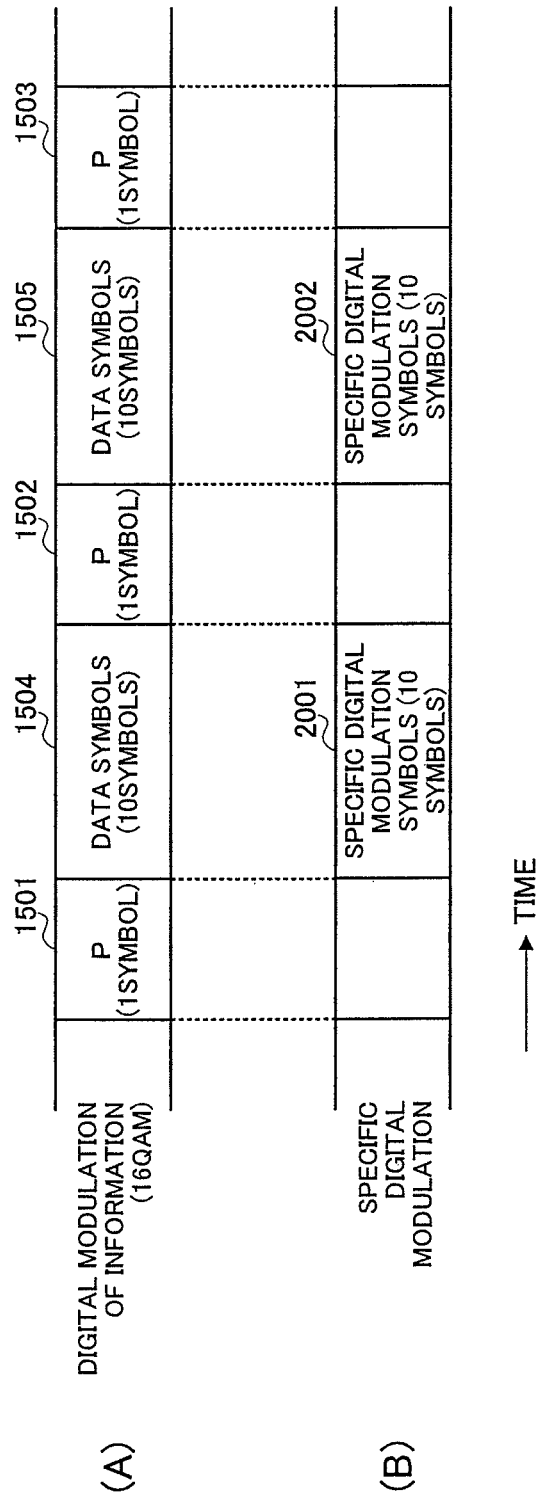
FIG. 21 is a drawing showing sample frame configurations of a multiplex transmit signal according to Embodiment 4.

FIG. 21 shows sample frame configurations on the time axis of a radio communication system according to this embodiment. FIG. 21 (A) is identical to FIG. 16 (A), and therefore a detailed description thereof is omitted here. FIG. 21 (B) shows the frame configuration of a specific modulated signal. Reference code 2001 and reference code 2002 indicate 10-symbol specific digitally modulated symbol fields, and data symbols and specific digitally modulated symbols are multiplexed on the time axis. A multiplexed specific information signal may be, for example, any of four types—specific signal A, specific signal B, specific signal C, or specific signal D—with predetermined information contained in the respective signals. On the receiving side, information is obtained by differentiating between these four types of signal.

Figure 22:
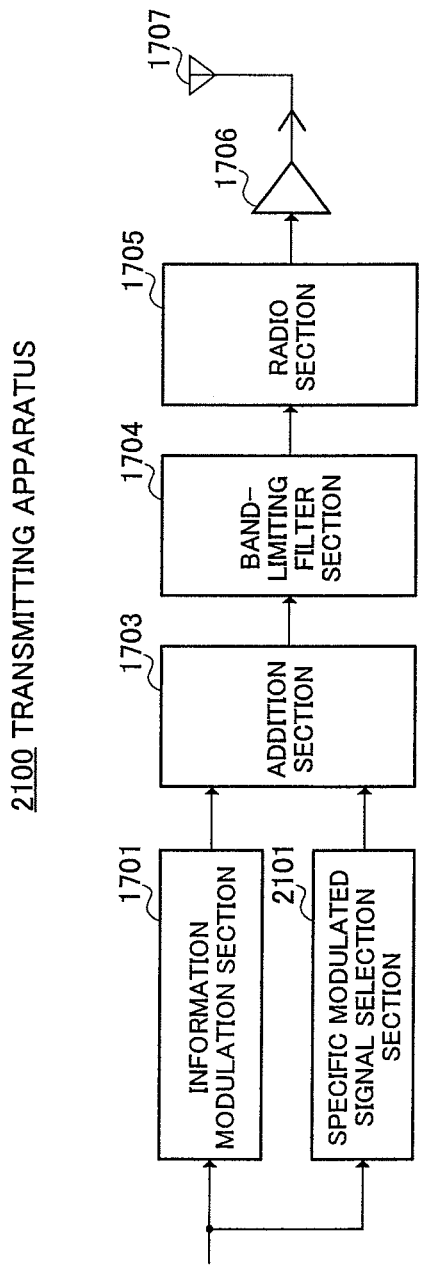
FIG. 22 is a block diagram showing the configuration of a transmitting apparatus of Embodiment 4.

FIG. 22 shows the configuration of a transmitting apparatus 2100 according to this embodiment. Parts in FIG. 22 common to those in FIG. 18 are assigned the same codes as in FIG. 18, and detailed descriptions thereof are omitted.

In FIG. 22, a specific modulated signal selection section 2101 selects a specific signal from specific signal A, specific signal B, specific signal C, or specific signal D corresponding to input information signal information, and outputs a specific signal to addition section 1703 in accordance with the frame configuration shown in FIG. 21 (B).

Addition section 1703 adds the information modulated signal output by information modulation section 1701 and the specific signal output by specific modulated signal selection section 2101, and outputs the signal resulting from the addition (multiplex signal) to band-limiting filter section 1704.

Figure 23:
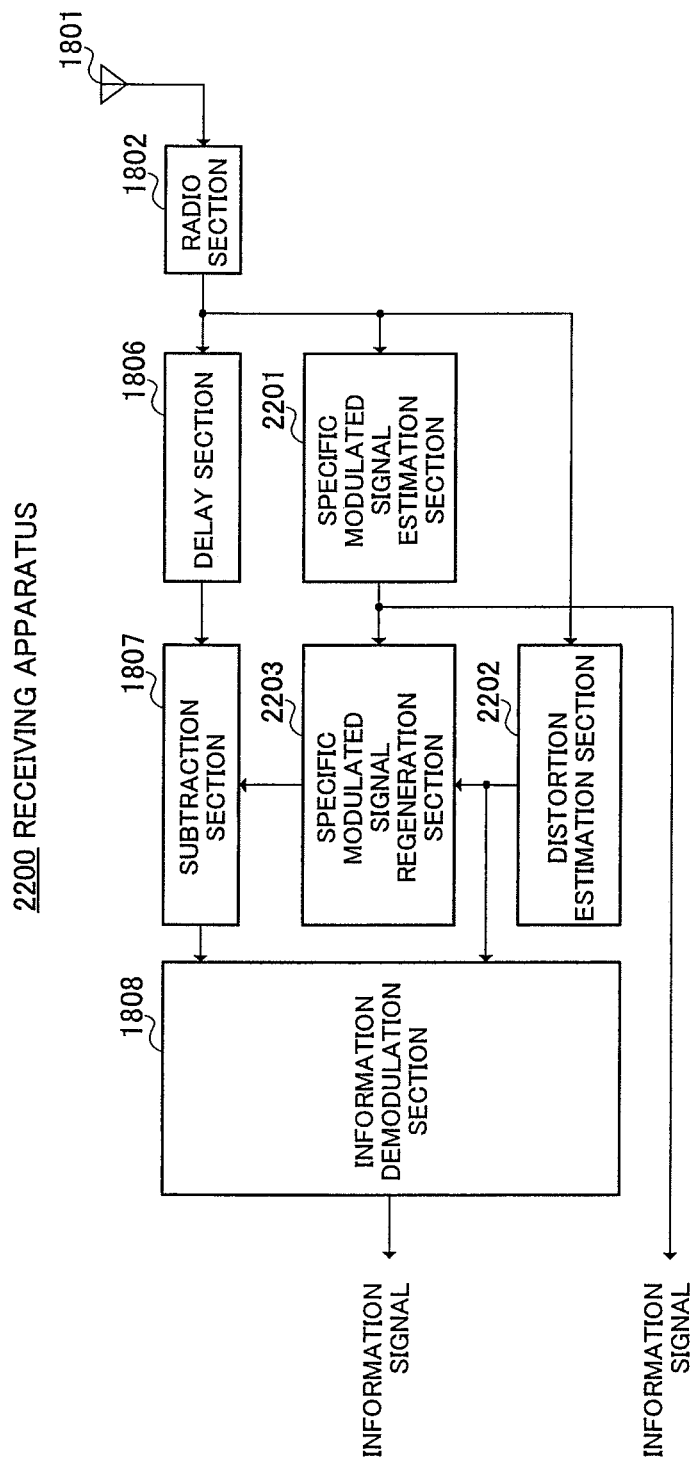
FIG. 23 is a block diagram showing the configuration of a receiving apparatus of Embodiment 4.

FIG. 23 shows the configuration of a receiving apparatus 2200 according to this embodiment. Parts in FIG. 23 common to those in FIG. 19 are assigned the same codes as in FIG. 19, and detailed descriptions thereof are omitted. Demodulation of 16QAM modulated data symbols 1504 and specific digitally modulated symbols 2001 in the frame configurations shown in FIG. 21 is described below.

In FIG. 23, a specific modulated signal estimation section 2201 identifies a digital signal contained in specific digitally modulated symbols in FIG. 21 based on an input received signal. That is to say, specific modulated signal estimation section 2201 identifies which of four signal types—specific signal A, specific signal B, specific signal C, or specific signal D—has been multiplexed. By this means, the multiplex signal is estimated and the obtained received digital signal is output to a specific modulated signal regeneration section 2203. A distortion estimation section 2202 detects pilot symbol 1501 and pilot symbol 1502 in FIG. 21, for example, from the received signal, and outputs a distortion estimation signal for data symbols 1504 and specific digitally modulated symbols 2001 to information demodulation section 1808 and specific modulated signal regeneration section 2203.

Specific modulated signal regeneration section 2203 has as input the received digital signal obtained by multiplex signal estimation output from specific modulated signal estimation section 2201 and a transmission path distortion signal output from distortion estimation section 2202, estimates the multiplex signal component contained in the received signal, and outputs an estimated multiplex signal to subtraction section 1807.

Delay section 1806 delays the received signal by the amount of time necessary to generate an estimated multiplex signal, and outputs the delayed received signal to subtraction section 1807. Subtraction section 1807 subtracts the estimated multiplex signal output from specific modulated signal regeneration section 2203 from the delayed received signal output from delay section 1806, and outputs a received signal from which the multiplex signal component has been removed to information demodulation section 1808.

By means of a receiving apparatus with the above-described configuration, a specific signal multiplexed with an information modulated signal can be identified, and the data transmission speed is improved in proportion to the information transmitted by the multiplexed specific signal.

In the case shown in FIG. 22, the pilot signal generation function has been described as being assigned to information modulation section 1701, but this function may also be assigned to specific modulated signal selection section 2101. Also, as a different method, an apparatus configuration is possible in which a pilot signal generation section is provided, and the pilot signal generation function is not assigned to information modulation section 1701 or specific modulated signal selection section 2101.

The frame configurations are not limited to those shown in FIG. 21, and, for example, pilot symbols need not be inserted. In this case, a pilot signal generation function is not necessary. Also, a unique word, preamble, or other control symbols may be inserted.

In the receiving apparatus in FIG. 23, time synchronization with the transmitting apparatus is possible by computing the correlation between a multiplex signal and specific signal, for example, and detecting power peaks. This is the same as detecting a specific signal component of a multiplex signal.

The configurations of a transmitting apparatus and receiving apparatus are not limited to the configurations shown in FIG. 22 and FIG. 23.

In FIG. 22, use of a single-carrier method is described for an information modulated signal, but the method is not limited to a single-carrier method, and a multicarrier method such as an Orthogonal Frequency Division Multiplex (OFDM) method may be used. In this case, the horizontal axis in FIG. 21 showing frame configurations may be considered to be the frequency axis. Also, a case has been described in which 16QAM modulation is used as the modulation method, but BPSK modulation, QPSK modulation, or the like may also be used.

If a specific signal is not known, a receiving apparatus of a radio communication system according to this embodiment cannot demodulate an information modulated signal. Thus, secure radio communication can be performed by making the specific signal correspondence method an encryption key. In a transmitting apparatus, information that changes the correspondence method in a selection section that selects a specific signal corresponding to an information signal from among a plurality of specific signals is a receiving apparatus encryption key.

Information transmitted by selecting a specific signal is more error resistant than a modulation method in which an information signal is digitally modulated. Thus, if data given correspondence to a specific signal is data of a high level of importance, highly reliable radio communication can be performed. Taking this point into consideration, control information such as channel information and information signal modulation method information should be transmitted given correspondence to a specific signal.

As described above, according to this embodiment, the data transmission speed can be improved by multiplexing an information modulated signal and a particular specific signal in the same frequency band and transmitting information with a type of particular specific signal that is multiplexed, and separating the multiplexed signal into an information modulated signal and specific signal on the receiving side.

Embodiment 5

In Embodiment 5, a radio communication method, base station apparatus, and communication terminal apparatus are described in which a modulation method whereby information is digitally modulated is used for short-range communications.

Figure 24:
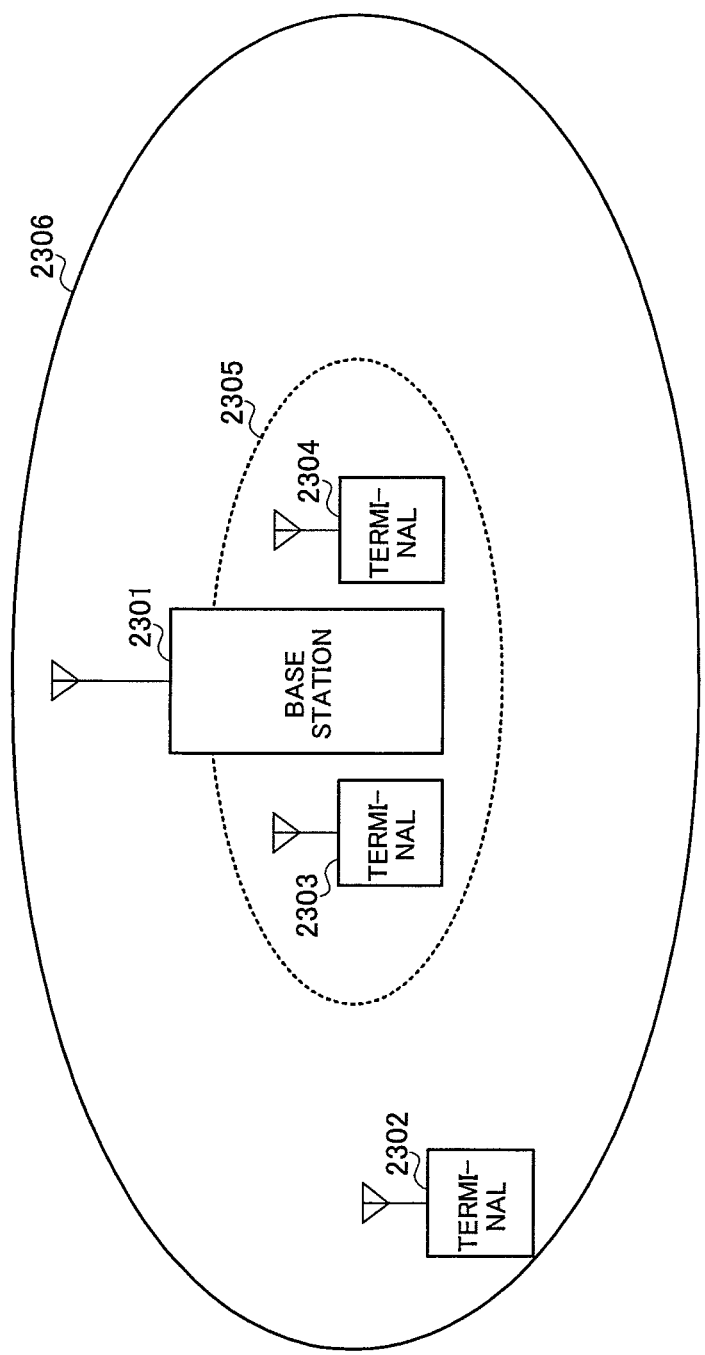
FIG. 24 is a drawing showing the arrangement of a base station and communication terminals in a radio communication system of Embodiment 5.

FIG. 24 shows the locations of a base station apparatus and communication terminal apparatuses according to this embodiment. A system is here assumed to comprise a base station apparatus 2301, communication terminal apparatus 2302, communication terminal apparatus 2303, and communication terminal apparatus 2304. It is here assumed that base station apparatus 2301 transmits the multiplex signals described in Embodiment 3 and Embodiment 4.

In a radio communication system according to Embodiment 3 or Embodiment 4, a feature of the modulation method for digital modulating information is that the data transmission speed is high but the area in which reception is possible is small. Also, a feature of spread spectrum communication and particular specific digitally modulated signals is that the data transmission speed is low but the area in which reception is possible is large.

At this time, for example, the limit of the area in which a signal in which information is modulated by a modulation method whereby information is digitally modulated according to Embodiment 3 or Embodiment 4 can be received is indicated by reference code 2305, and the limit of the area in which a modulated signal modulated by a spread spectrum communication method of a radio communication system according to Embodiment 3 or a specific digital modulation method of a radio communication system according to Embodiment 4 can be received is indicated by reference code 2306.

With the modulation method whereby information is digitally modulated in a radio communication system according to Embodiment 3 or Embodiment 4, information A for high-speed data transmission is provided, and with the spread spectrum communication method of a radio communication system according to Embodiment 3 or a specific digital modulation method of a radio communication system according to Embodiment 4, information B for low-speed data transmission is provided. Thus, different kinds of information—such as information A for high-speed data transmission and information B for low-speed data transmission—can be provided at the same frequency, and the reception ranges of different kinds of information differ.

In this case, it is assumed that, for example, communication terminal apparatus 2302 is a dedicated communication terminal apparatus that can receive information B for low-speed transmission from a spread spectrum communication method of a radio communication system according to Embodiment 3 and a specific digital modulation method of a radio communication system according to Embodiment 4. It is assumed that communication terminal apparatus 2303 is a dedicated communication terminal apparatus that can receive information A for high-speed transmission from a modulation method whereby information is digitally modulated in a radio communication system according to Embodiment 3 or Embodiment 4.

It is assumed that communication terminal apparatus 2304 is a communication terminal apparatus that can receive information B for low-speed transmission from a spread spectrum communication method of a radio communication system according to Embodiment 3 and a specific digital modulation method of a radio communication system according to Embodiment 4, and can receive information A for high-speed transmission from a modulation method whereby information is digitally modulated in a radio communication system according to Embodiment 3 or Embodiment 4. Then, when communication terminal apparatus 2304 is within area 2305, both information A and information B can be received, and communication terminal apparatus 2304 receives either or both of information A and/or information B, and when communication terminal apparatus 2304 is outside area 2305 and within area 2306, communication terminal apparatus 2304 receives information B.

Thus, according to this embodiment, by using a radio communication system characterized by the use of a modulation method whereby information is digitally modulated for short-range communications, it is possible to perform transmission and reception of different kinds of information in the same frequency band.

Embodiment 6

In this embodiment, a description is given of a transmitting apparatus that multiplexes and transmits a digitally modulated first modulated signal and spread spectrum modulated second modulated signal in the same frequency band of the same time, and places signal points of the first modulated signal and second modulated signal at different positions in the in-phase-quadrature plane, and a receiving apparatus that receives and demodulates this multiplex signal.

A transmitting apparatus and receiving apparatus of this embodiment have almost the same configurations as transmitting apparatus 1700 and receiving apparatus 1800 of above-described Embodiment 3. Therefore, in this embodiment, the configuration of the transmitting apparatus and receiving apparatus will be described using FIG. 18 and FIG. 19 once again. The only parts that differ between a transmitting apparatus of this embodiment and transmitting apparatus 1700 of Embodiment 3 are information modulation section 1701 and spread spectrum modulation section 1702, and therefore information modulation section 1701 and spread spectrum modulation section 1702 will be described below.

A transmitting apparatus of this embodiment performs modulation processing so that signal points are arranged at different positions in the in-phase-quadrature plane (I-Q plane) by information modulation section 1701 and spread spectrum modulation section 1702 in FIG. 18. That is to say, modulation processing is performed by information modulation section 1701 and spread spectrum modulation section 1702 so that the I-Q plane signal points of an information modulated signal obtained by information modulation section 1701 and the I-Q plane signal points of a spread modulated signal obtained by spread spectrum modulation section 1702 are different.

By this means, the correlation between a transmitted information modulated signal and spread spectrum modulated signal can be lowered in a transmitting apparatus of this embodiment, enabling the error rate to be reduced when the respective modulated signals are demodulated on the receiving side.

Figure 25:
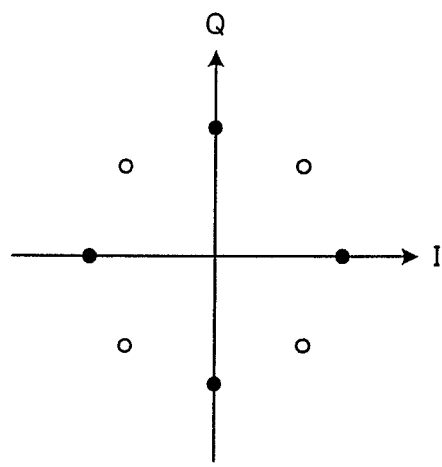
FIG. 25 is a drawing showing signal point arrangement in the I-Q plane of a QPSK modulation signal and π/4 shift QPSK modulation signal.
Figure 26:
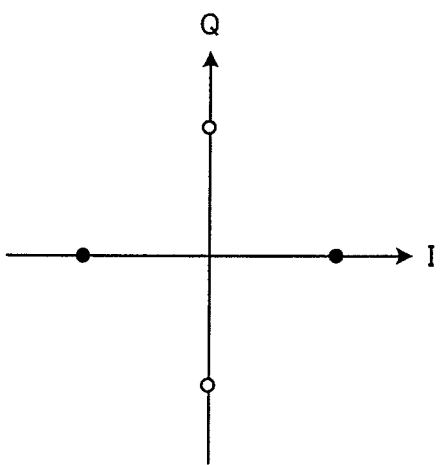
FIG. 26 is a drawing showing signal point arrangement in the I-Q plane of a BPSK modulation signal and π/2 shift BPSK modulation signal.

Examples of signal point arrangements are shown in FIG. 25 and FIG. 26. FIG. 25 shows an example of the signal point arrangement when QPSK modulation processing is performed by information signal modulation section 1701 and spread spectrum modulation section 1702. By performing π/4 shift QPSK modulation processing, information signal modulation section 1701 forms an information modulated signal with the signal point arrangement shown by the black and white circles in the figure. On the other hand, spread spectrum modulation section 1702 forms a spread spectrum modulated signal with the signal point arrangement shown by the white circles in the figure.

A case has been described here in which the signal point arrangement is switched alternately between the black circles and white circles in the figure by having information signal modulation section 1701 perform π/4 shift QPSK modulation processing, but the signal point arrangement may also be fixed at the positions shown by the black circles in the figure by performing QPSK modulation and shifting the signal point phase by π/4.

FIG. 26 shows an example of the signal point arrangement when BPSK modulation processing is performed by information signal modulation section 1701 and spread spectrum modulation section 1702. By performing π/2 shift BPSK modulation processing, information signal modulation section 1701 forms an information modulated signal with the signal point arrangement shown by the white and black circles in the figure. On the other hand, spread spectrum modulation section 1702 forms a spread spectrum modulated signal with the signal point arrangement shown by the black circles in the figure.

A case has been described here in which the signal point arrangement is switched alternately between the white circles and black circles in the figure by having information signal modulation section 1701 perform π/2 shift BPSK modulation processing, but the signal point arrangement may also be fixed at the positions shown by the white circles in the figure by performing BPSK modulation and shifting the signal point phase by π/4.

The difference between receiving apparatus 1800 in FIG. 19 described in Embodiment 3 and a receiving apparatus of this embodiment is that spread spectrum demodulation section 1803 and information demodulation section 1808 demodulate signals arranged at different signal points.

Figure 27:
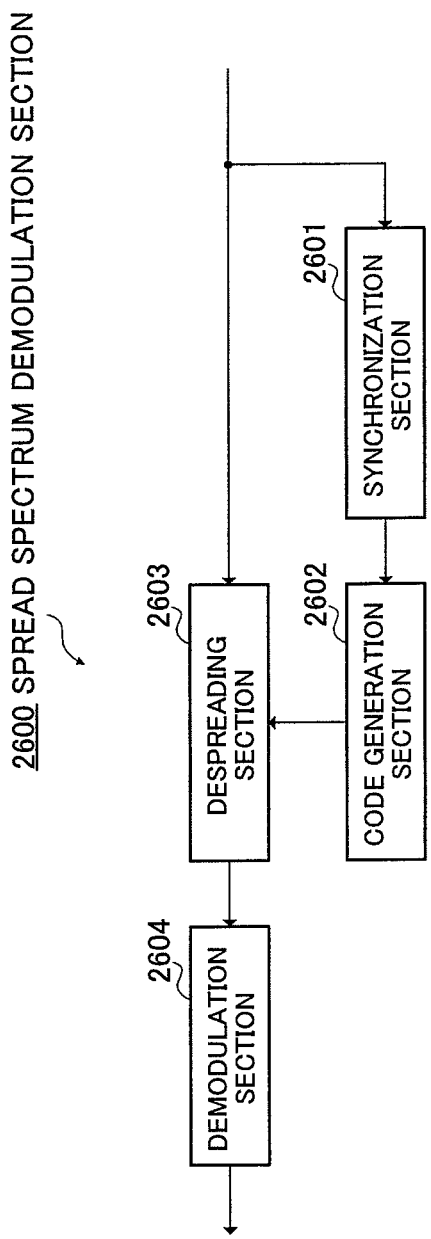
FIG. 27 is a block diagram showing the configuration of the spread spectrum demodulation section used in a receiving apparatus of Embodiment 6.

The configuration of the spread spectrum demodulation section is shown in FIG. 27. In spread spectrum demodulation section 2600, a received signal in which an information modulated signal and spread spectrum modulated signal are multiplexed is input to a despreading section 2603 and synchronization section 2601. Synchronization section 2601, which comprises matched filters, forms a synchronous timing signal based on a correlation value between the spread spectrum part in the received signal and a spreading code, and sends this synchronous timing signal to a code generation section 2602. Code generation section 2602 generates a spreading code at timing in accordance with the synchronous timing signal, and sends this spreading code to despreading section 2603.

Despreading section 2603 performs despreading processing by multiplying the input received multiplex signal by the spreading code. By this means, only the signal prior to spread spectrum processing is restored by despreading from within the received multiplex signal. That is to say, there is only a noise component with a very low signal level due to despreading processing, and as a result, this is eliminated by despreading section 2603.

At this time, signal points of an information modulated signal and spread spectrum modulated signal are arranged differently in the I-Q plane, and the correlation value is kept low, so that no noise component due to the information modulated signal is output from despreading section 2603, and only the signal prior to spread spectrum processing is output. The despread signal is demodulated by a demodulation section 2604, whereby the signal prior to spreading modulation is restored.

The restored signal is sent to spread spectrum modulated signal regeneration section 1805 in FIG. 19. Spread spectrum modulated signal regeneration section 1805 again executes the same kind of modulation processing as in transmitting-side spread spectrum modulation section 1702 (FIG. 18) on the input signal. At this time, spread spectrum modulated signal regeneration section 1805 executes spread spectrum modulation processing taking account of the distortion estimation signal output from distortion estimation section 1804. By this means, a spread spectrum modulated signal containing transmission path distortion is regenerated, and this signal is sent to subtraction section 1807.

Subtraction section 1807 subtracts the signal regenerated by spread spectrum modulated signal regeneration section 1805 from the received multiplex signal, and consequently outputs only an information modulated signal. Information demodulation section 1808 demodulates the information signal taking account of transmission path distortion of the information modulated signal input from subtraction section 1807 based on the distortion estimation signal input from distortion estimation section 1804.

As a result, an information signal on which digital modulation processing was executed and an information signal on which spread spectrum modulation processing was executed are both restored.

Thus, according to the above configuration, when a first transmit signal is digitally modulated, a second transmit signal is spread spectrum modulated, and these signals are multiplexed and transmitted in the same frequency band, by arranging the signal points of the respective modulated signals at different positions in the I-Q plane, in addition to obtaining an improvement in transmission speed it is also possible to lower the correlation between the spread spectrum modulated signal and first digitally modulated signal, thereby enabling communication quality to be improved.

The present invention is not limited to a case where a signal in which information is digitally modulated and a spread spectrum modulated signal are transmitted by a single carrier, and multicarrier transmission, as exemplified by OFDM, may also be used. An example of transmission using both OFDM and OFDM-spreading modulation is described in an embodiment later herein.

In this embodiment, a case has been described in which the spread spectrum modulation communication system code multiplexing number is one, but a multiplicity—that is to say, CDMA as the spread spectrum communication method—may also be used. In this way, the number of multiplexed data can be greatly increased, enabling the data transmission speed to be significantly improved.

Embodiment 7

In this embodiment, a description is given of a transmitting apparatus that multiplexes in the same frequency band of the same time and transmits a digitally modulated first modulated signal, a plurality of spread spectrum modulated signals that have undergone spread spectrum processing using different spreading codes, and spreading code information, and a receiving apparatus that receives and demodulates this multiplex signal.

Figure 28:
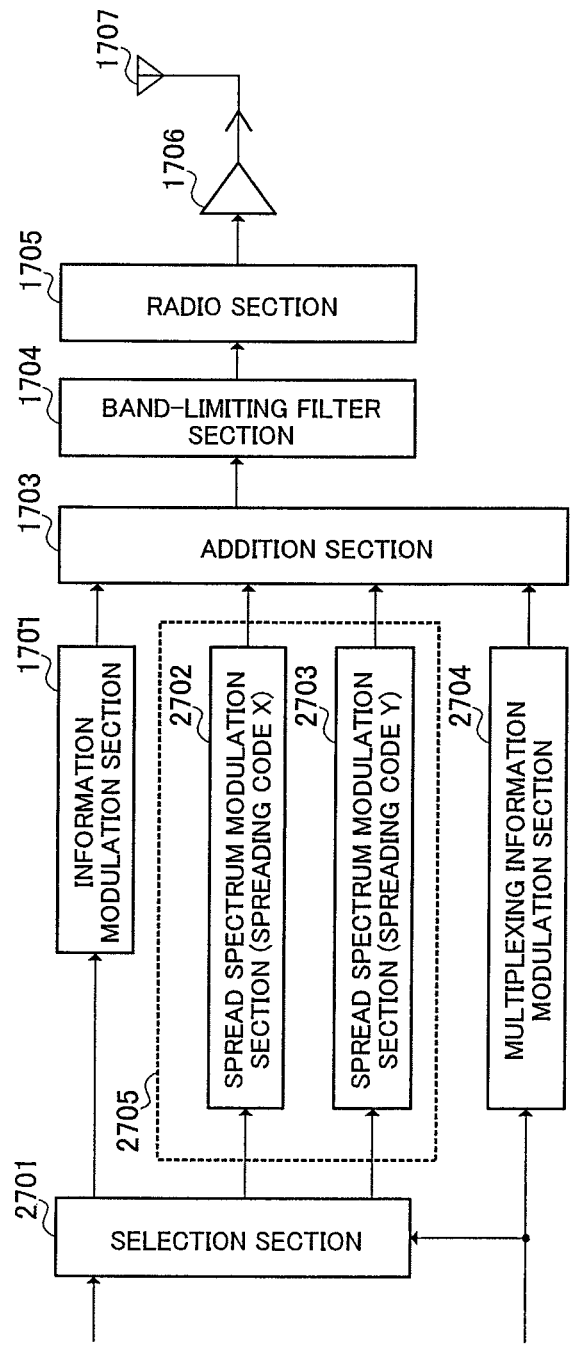
FIG. 28 is a block diagram showing the configuration of a transmitting apparatus of Embodiment 7.

In FIG. 28, in which parts corresponding to those in FIG. 18 are assigned the same codes as in FIG. 18, reference code 2700 indicates the overall configuration of a transmitting apparatus according to Embodiment 7. In transmitting apparatus 2700, an information signal is input to a selection section 2701. Selection section 2701 has as input a selection control signal from a system control unit (not shown), and selectively outputs an information signal to information modulation section 1701, or a spread spectrum modulation section 2702 that uses spreading code X or a spread spectrum modulation section 2703 that uses spreading code Y in a spread spectrum modulation section 2705, in accordance with that selection control signal.

Information modulation section 1701 executes QPSK modulation processing, for example, on the input signal, and sends the processed signal to addition section 1703. Spread spectrum modulation sections 2702 and 2703 external spread spectrum processing on the input signal using spreading codes X and Y respectively, and send the processed signal to addition section 1703.

The selection control signal is also input to a multiplexing information modulation section 2704. Multiplexing information modulation section 2704 modulates selection control signal information—that is, multiplex frame information—and sends the modulated signal to addition section 1703.

That is to say, in multiplexing information modulation section 2704, information is modulated that indicates which part of the information signal is modulated by information modulation section 1701, which part is modulated by spread spectrum modulation section 2702, and which part is processed by spread spectrum modulation section 2703.

Figure 29:
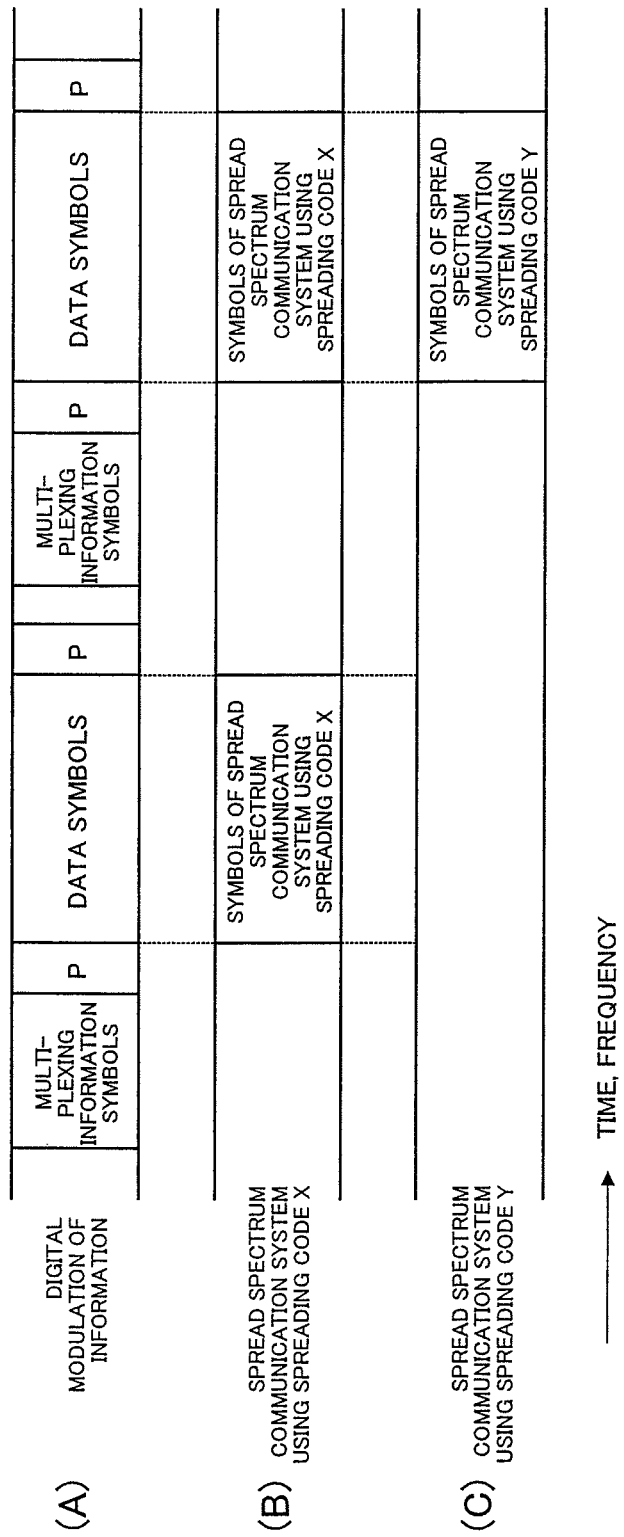
FIG. 29 is a drawing showing sample frame configurations of a multiplex transmit signal according to Embodiment 7.

Addition section 1703 adds the modulated signals input from modulation sections 1701 and 2702 through 2704, thereby multiplexing these signals. FIG. 29 shows an example of a multiplex signal output from addition section 1703. In this embodiment, as shown in FIG. 29 (A), pilot symbols (P) are placed before and after data symbols modulated by information modulation section 1701, and multiplexing information symbols modulated by multiplexing information modulation section 2704 are placed in locations bounded by the pilot symbols.

Also, as shown in FIG. 29 (B), symbols that have been spread spectrum modulated by spread spectrum modulation section 2702 using spreading code X are multiplexed in the same frequency band as particular data symbols. Furthermore, as shown in FIG. 29 (C), symbols that have been spread spectrum modulated by spread spectrum modulation section 2703 using spreading code Y are multiplexed in the same frequency band as particular data symbols.

As a result, in transmitting apparatus 2700, three or more signals can be multiplexed and transmitted in the same frequency band of the same time, as shown in FIG. 29, thereby enabling significantly faster data transmission to be performed than in the case of above-described Embodiments 1 through 6.

Figure 30:
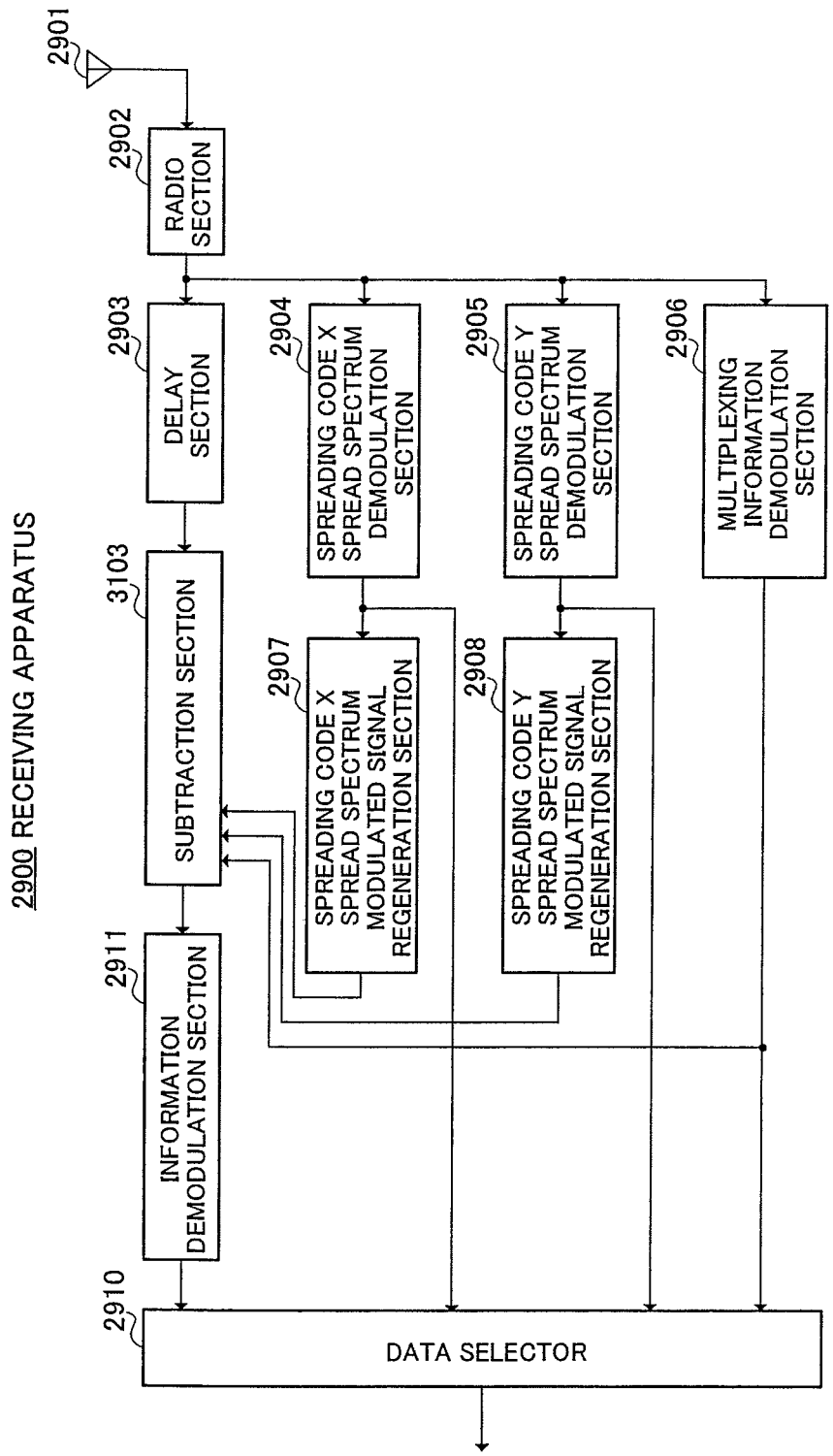
FIG. 30 is a block diagram showing the configuration of a receiving apparatus of Embodiment 7.

FIG. 30 shows the configuration of a receiving apparatus 2900 that receives and demodulates a multiplex transmit signal transmitted by transmitting apparatus 2700. A multiplex transmit signal received by an antenna 2901 undergoes predetermined radio reception processing by a radio section 2902, and is then sent to a delay section 2903, spreading code X spread spectrum demodulation section 2904, spreading code Y spread spectrum demodulation section 2905, and multiplexing information demodulation section 2906.

Spread spectrum demodulation section 2904 performs despreading processing on the input multiplex signal using spreading code X. By this means, only the original signal spread on the transmitting side using spreading code X is output. This signal is output as an information signal, and is also sent to a spread spectrum modulated signal regeneration section 2907.

Spread spectrum modulated signal regeneration section 2907 performs spreading processing on the input signal using spreading code X. By this means, the same kind of spread spectrum modulated signal as the spread spectrum modulated signal output from spread spectrum modulation section 2702 (FIG. 28) is regenerated from spread spectrum modulated signal regeneration section 2907, and this is sent to a subtraction section 2909.

Similarly, spread spectrum demodulation section 2905 performs despreading processing on the input multiplex signal using spreading code Y. By this means, only the original signal spread on the transmitting side using spreading code Y is output. This signal is output as an information signal, and is also sent to a spread spectrum modulated signal regeneration section 2908.

Spread spectrum modulated signal regeneration section 2908 performs spreading processing on the input signal using spreading code Y. By this means, the same kind of spread spectrum modulated signal as the spread spectrum modulated signal output from spread spectrum modulation section 2703 (FIG. 28) is regenerated from spread spectrum modulated signal regeneration section 2908, and this is sent to subtraction section 2909.

Multiplexing information demodulation section 2906 demodulates the multiplexing information symbols contained in the received multiplex signal. Here, as can be seen from FIG. 29, multiplexing information symbols are not multiplexed with other signals, and are positioned in a regular fashion close to pilot symbols, making it possible for multiplexing information symbols to be demodulated easily and accurately by multiplexing information demodulation section 2906. The demodulated multiplexing information is then sent to subtraction section 2909 and a data selector 2910.

Subtraction section 2909 subtracts the regenerated signal that has undergone spread spectrum processing with spreading code X and the regenerated signal that has undergone spread spectrum processing with spreading code Y from the received multiplex signal input with timing adjusted by delay section 2903. At this time, subtraction section 2909 performs subtraction processing while controlling as appropriate the type and timing of the regenerated spread spectrum modulated signal to be subtracted from the received multiplex signal based on the multiplexing information.

That is to say, as shown in FIG. 29, there are cases where only a signal spread spectrum modulated by means of spreading code X is multiplexed with respect to data symbols to be extracted by subtraction section 2909 in the received multiplex signal, and cases where a signal spread spectrum modulated by means of spreading code X and two signals spread spectrum modulated by means of spreading code Y are multiplexed, and therefore subtraction section 2909 reads these different kinds of information from the multiplexing information, and extracts only the data symbols in FIG. 29 (A).

An information demodulation section 2911 demodulates a pre-modulation information signal by executing demodulation processing (in the case of this embodiment, QPSK demodulation processing) corresponding to information modulation section 1701 of transmitting apparatus 2700 on data symbols input from subtraction section 2909.

Demodulated data demodulated by information demodulation section 2911, spread spectrum demodulation section 2904, and spread spectrum demodulation section 2905, is input to data selector 2910. Multiplexing information demodulated by multiplexing information demodulation section 2906 is also input to data selector 2910. Data selector 2910 selectively outputs the respective demodulated data based on the multiplexing information. By this means, the original signal prior to division by selection section 2701 of transmitting apparatus 2700 is output from data selector 2910.

Thus, according to the above configuration, by performing spreading processing using a plurality of spreading codes on signals multiplexed in the same frequency band, the number of signals that can be multiplexed can be increased, enabling significantly, faster data transmission to be performed.

Figure 31:
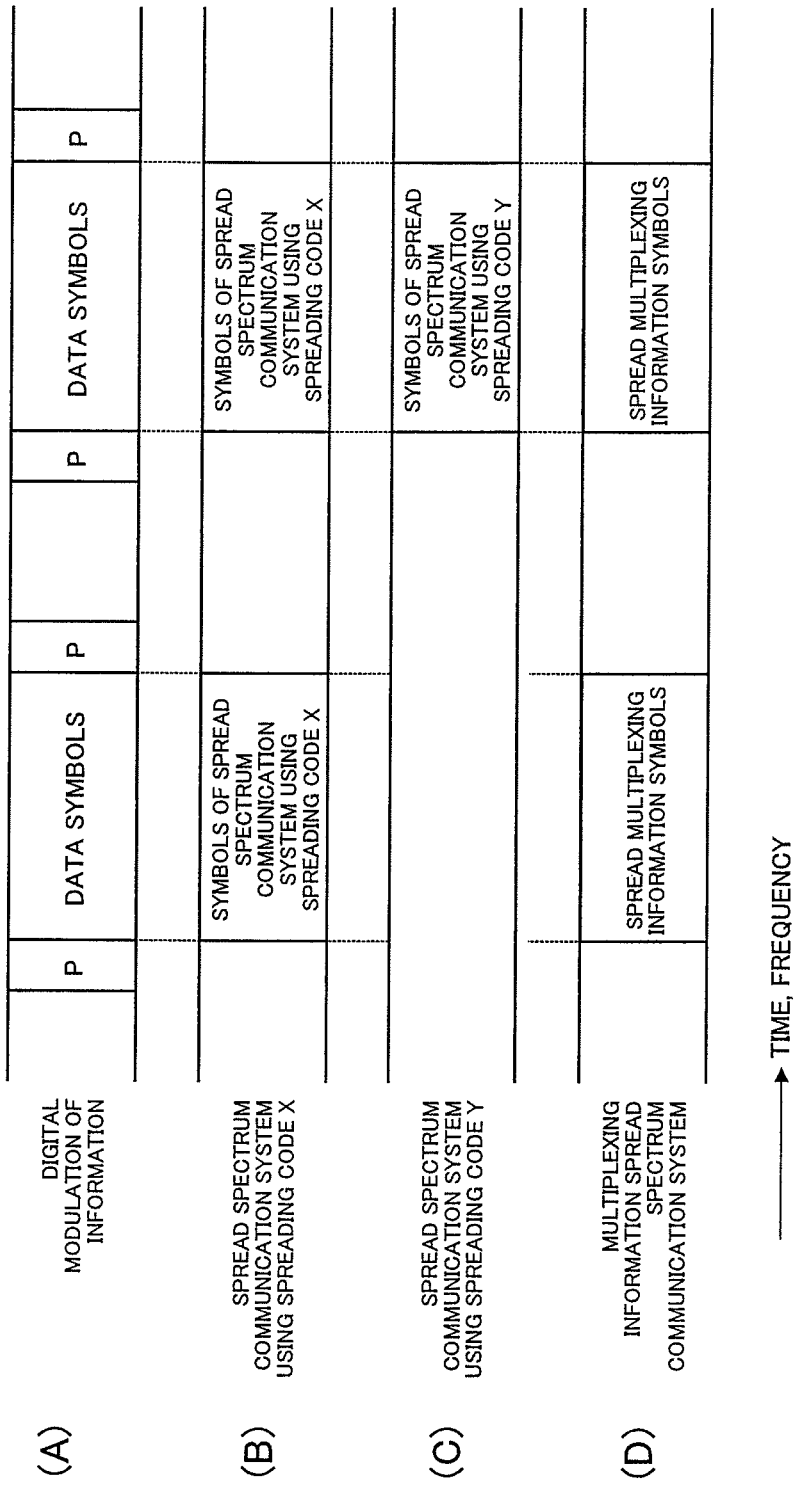
FIG. 31 is a drawing showing another example of frame configurations of a multiplex transmit signal according to Embodiment 7.

In the above-described embodiment, a case has been described in which multiplexing information symbols are transmitted in the same frame as data symbols, as shown in FIG. 29, but the present invention is not limited to this, and multiplexing information symbols may also be transmitted multiplexed with data symbols as shown in FIG. 31. By so doing it is possible to greatly increase the amount of data that can be transmitted in the same frequency band, enabling significantly faster data transmission to be performed.

The configuration of a transmitting apparatus in this case will now be described, using FIG. 28 once again. Multiplexing information modulation section 2704 in FIG. 28 executes spread spectrum modulation processing on multiplexing information, using a different spreading code (Z) from spreading codes X and Y. Then it is only necessary for addition to be performed by addition section 1703 so that spread multiplexing information symbols are multiplexed in the same frequency band together with data symbols obtained by information modulation section 1701, spread symbols obtained by spread spectrum modulation section 2702, and spread symbols obtained by spread spectrum modulation section 2703, as shown in FIG. 31. By this means, multiplexing information can be separated on the receiving side easily and with very little degradation due to multiplexing.

Figure 32:
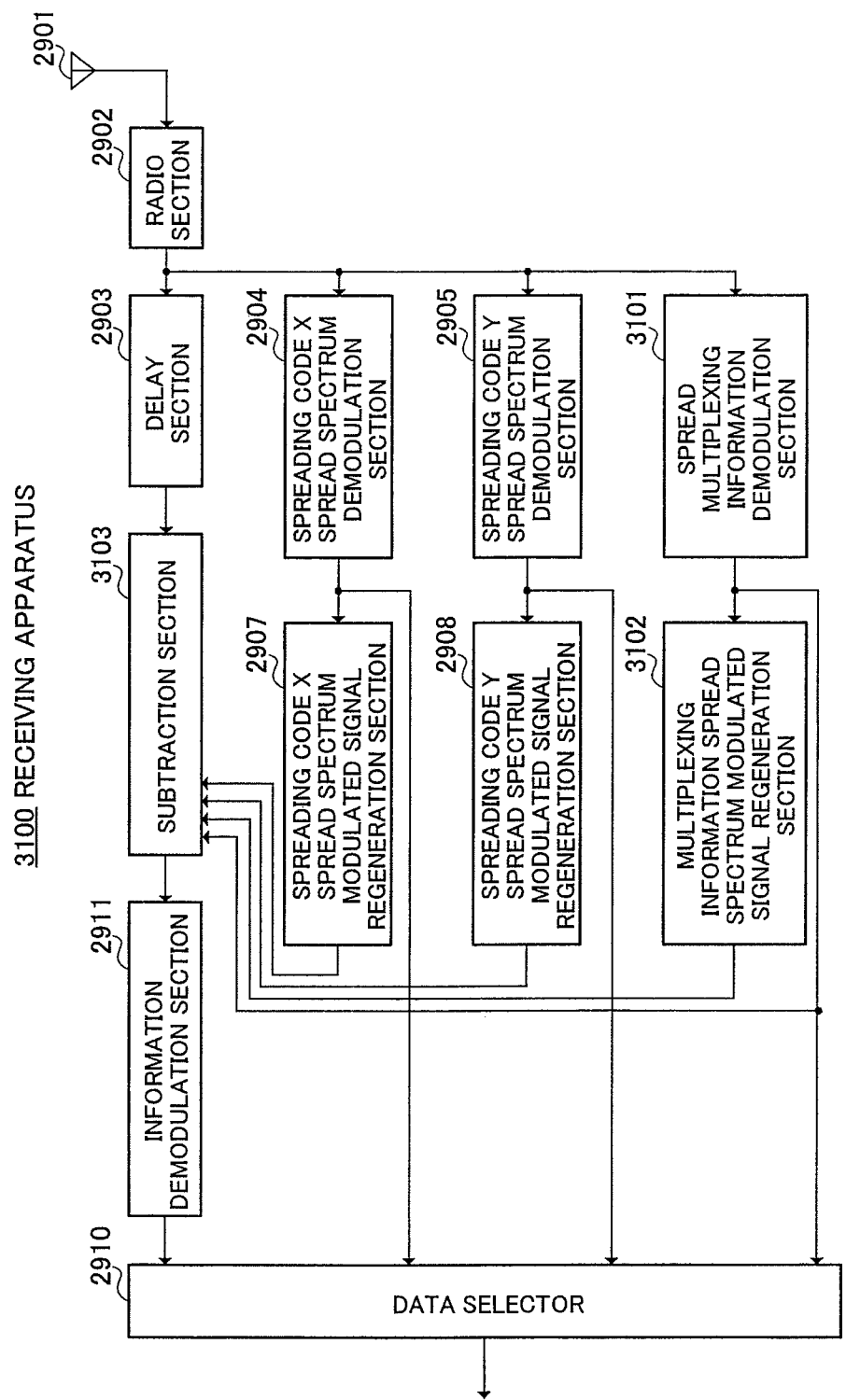
FIG. 32 is a block diagram showing the configuration of a receiving apparatus that receives and demodulates the multiplex transmit signal of FIG. 31.

FIG. 32 shows the configuration of a receiving apparatus that receives and demodulates a multiplex transmit signal in which spreading code information symbols have undergone spread spectrum modulation processing and multiplexing.

In FIG. 32, in which parts corresponding to those in FIG. 30 are assigned the same codes as in FIG. 30, receiving apparatus 3100 sends a received multiplex signal output from radio section 2902 to a spread multiplexing information demodulation section 3101.

Spread multiplexing information demodulation section 3101 executes despreading processing on the received multiplex signal using spreading code Z. By this means, only multiplexing information is output from spread multiplexing information demodulation section 3101, and that multiplexing information is sent to a spread spectrum modulated signal regeneration section 3102, subtraction section 3103, and data selector 2910.

Spread spectrum modulated signal regeneration section 3102 again spreads the multiplexing information by spreading the multiplexing information using spreading code Z, and sends the signal resulting from spreading processing to subtraction section 3103.

Subtraction section 3103 extracts only an information signal by subtracting the signals regenerated by spread spectrum modulated signal regeneration section 2907, spread spectrum modulated signal regeneration section 2908, and spread spectrum modulated signal regeneration section 3102 from the received multiplex signal input from delay section 2903 based on timing indicated by the multiplexing information, and sends this information signal to information demodulation section 2911.

Data selector 2910 selectively outputs the input demodulated signals sequentially, with multiplexing information as a select signal. Thus, the original signal prior to separation and multiplexing on the transmitting side is output from data selector 2910.

In this embodiment a case has been described in which multiplexing information is transmitted together with a plurality of spread spectrum modulated signals, but the present invention is not limited to this, and it is also possible for spreading code information (spreading codes X and Y) to by transmitted together with a plurality of spread spectrum information instead of multiplexing information or in addition to multiplexing information.

The present invention is not limited to a case where a signal in which information is digitally modulated and a spread spectrum modulated signal are transmitted by a single carrier, and multicarrier transmission, as exemplified by OFDM, may also be used.

In this embodiment, a case has been described in which the spread spectrum modulation communication system code multiplexing number is two or three, but the number may be four or more. In this way, the number of multiplexed data can be greatly increased, enabling the data transmission speed to be significantly improved.

Embodiment 8

In this embodiment, a description is given of a transmitting apparatus that comprises a first modulation section that performs digital modulation of an information signal and obtains a first modulated signal, a second modulation section that forms a plurality of specific modulated signals modulated in a specific known arrangement decided beforehand together with the receiving side, a selection section that selects a specific modulated signal corresponding to the information signal from among the plurality of specific modulated signals, a multiplexing section that multiplexes the first modulated signal and the specific modulated signal selected by the selection section in the same frequency band and obtains a multiplex signal, and a transmission section that transmits the multiplex signal, wherein the first and second modulation sections perform modulation processing so that the signal points of the first modulated signal and specific modulated signal are arranged at different positions in the in-phase-quadrature plane; and a description is given of a corresponding receiving apparatus.

A transmitting apparatus and receiving apparatus of this embodiment have almost the same configurations as transmitting apparatus 2100 and receiving apparatus 2200 of above-described Embodiment 4. Therefore, FIG. 22 and FIG. 23 will be used again in the description of this embodiment.

The difference between a transmitting apparatus of this embodiment and transmitting apparatus 2100 of Embodiment 4 is that, in a transmitting apparatus of this embodiment, information modulation section 1701 and specific modulated signal selection section 2101 perform modulation processing so that the respective signal points are arranged in different positions in the I-Q plane.

That is to say, modulation processing is performed by information modulation section 1701 and specific modulated signal selection section 2101 so that the I-Q plane signal points of an information modulated signal obtained by information modulation section 1701 and the I-Q plane signal points of a specific modulated signal obtained by specific modulated signal selection section 2101 are different.

By this means, the correlation between a transmitted information modulated signal and specific modulated signal can be lowered in a transmitting apparatus of this embodiment, enabling the error rate to be reduced when the respective modulated signals are demodulated on the receiving, side.

Figure 33:
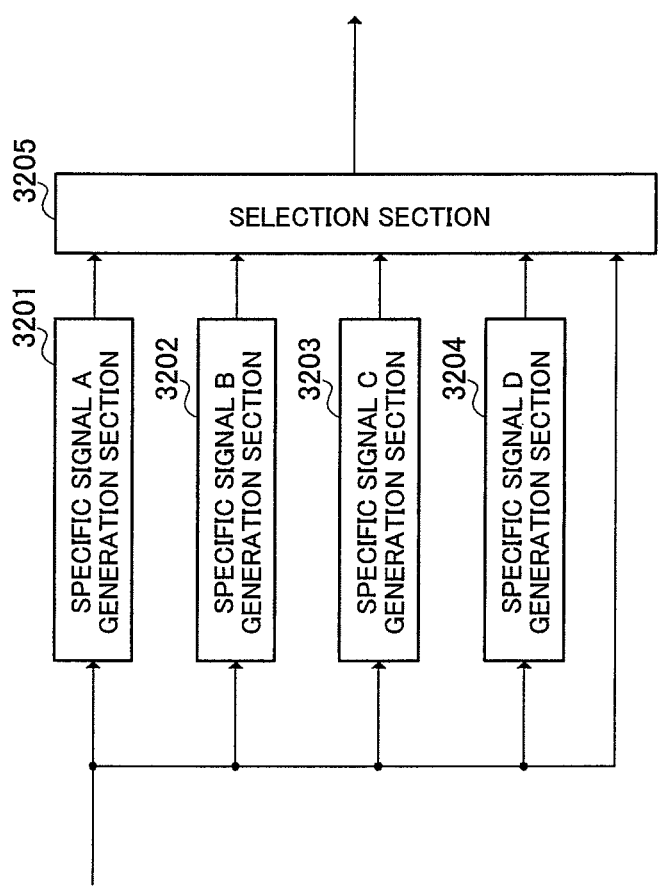
FIG. 33 is a drawing showing the configuration of the multiplex signal selection section used in a transmitting apparatus of Embodiment 8.

Specific modulated signal selection section 2101 is actually configured as shown in FIG. 33. In specific modulated signal selection section 3200 of this embodiment, an information signal is input to a plurality of specific signal generation sections 3201 through 3204 and a selection section 3205. Specific signal generation sections 3201 through 3204 generate modulated signals with different signal arrangements according to the input information signal.

For example, when a "00" information signal is input, specific signal A generation section 3201 generates a first specific modulated signal with a first signal arrangement, and when a "01" information signal is input, specific signal B generation section 3202 generates a second specific modulated signal with a second signal arrangement different from the first signal arrangement. Similarly, when a "10" information signal is input, specific signal C generation section 3203 generates a third specific modulated signal with a third signal arrangement different from the first and second signal arrangements, and when a "11" information signal is input, specific signal D generation section 3204 generates a fourth specific modulated signal with a fourth signal arrangement different from the first through third signal arrangements.

One of these specific modulated signals is then selected and output by selection section 3205. That is to say, selection section 3205 outputs a first specific modulated signal when "00" is input as an information signal, outputs a second specific modulated signal when "01" is input, outputs a third specific modulated signal when "10" is input, and outputs a fourth specific modulated signal when "11" is input.

Then, as described above, data symbols and specific modulation symbols are multiplexed and transmitted from transmitting apparatus 2100 (FIG. 22) as shown in FIG. 21. This specific modulated signal can easily by separated from an information signal by the receiving apparatus that is the communicating party, but cannot be separated by a receiving apparatus other than the communicating party, and constitutes an interference signal, enabling an information signal to be given security.

That is to say, by providing specific modulated signal estimation section 2201 of receiving apparatus 2200 shown in FIG. 23 with a correlator corresponding to each signal arrangement generated by specific signal generation sections 3201 through 3204 (FIG. 33), it is made possible for specific modulated signal estimation section 2201 to output only the specific signal generated by each of specific signal generation sections 3201 through 3204 from within a received multiplex signal.

Then by outputting this specific signal directly as an information signal, it is possible to use this information signal as significant information. Also, if the specific signal estimated by specific modulated signal estimation section 2201 is regenerated as the same specific modulated signal as at the time of transmission by specific modulated signal regeneration section 2203, and then sent to subtraction section 1807, it is possible for the specific modulated signal to be eliminated from the received multiplex signal by subtraction section 1807, and for only the information modulated signal to be extracted.

In contrast to this, a receiving apparatus other than communicating party receiving apparatus 2200 does not know the signal arrangement of the specific signal, and therefore cannot separate the specific signal from the received multiplex signal, and cannot extract the information signal.

In addition, in a transmitting apparatus of this embodiment, information modulated signal I-Q plane signal points and specific modulated signal I-Q plane signal points are made to differ, and therefore the correlation between an information modulated signal and specific modulated signal is lowered, and the error rate can be reduced when modulated signals are demodulated on the receiving side. In fact, the precision of correlation computation by specific modulated signal estimation section 2201 shown in FIG. 23 improves, and each specific signal can be faithfully restored.

A description will be given here using FIG. 25 and FIG. 26. FIG. 25 shows an example of a case in which QPSK modulation processing is performed by information signal modulation section 1701 (FIG. 22) and specific signal generation sections 3201 through 3204 in specific modulated signal selection section 2101 (FIG. 33). By performing π/4 shift QPSK modulation processing, information signal modulation section 1701 forms an information modulated signal with the signal point arrangement shown by the black and white circles. On the other hand, specific signal generation sections 3201 through 3204 form specific modulated signals with the signal point arrangement shown by the white circles.

FIG. 26 shows an example of a case in which BPSK modulation processing is performed by information signal modulation section 1701 and specific signal generation sections 3201 through 3204. By performing π/2 shift BPSK modulation processing, information signal modulation section 1701 forms an information modulated signal with the signal point arrangement shown by the white and black circles. On the other hand, specific signal generation sections 3201 through 3204 form specific modulated signals with the signal point arrangement shown by the black circles.

Thus, according to the above configuration, when a digitally modulated information signal and a specific modulated signal modulated using a specific arrangement also known beforehand by the receiving side are multiplexed and transmitted in the same frequency band, by performing modulation processing so that signal point positions in the I-Q plane differ between the information modulated signal and specific modulated signal, it is possible to perform high-speed transmission of data that has security, and also to suppress degradation of communication quality due to multiplexing.

This embodiment, also, is not limited to a case where a signal in which information is digitally modulated and a spread spectrum modulated signal are transmitted by a single carrier, and multicarrier transmission, as exemplified by OFDM, may also be used.

The transmitting apparatus and receiving apparatus configurations are not limited to the configurations in FIG. 22 and FIG. 23, and can be implemented with modifications as appropriate.

Embodiment 9

In this embodiment there are proposed a transmitting apparatus that multiplexes in the same frequency band and transmits an OFDM modulated signal and an OFDM-spreading modulation modulated signal, and a receiving apparatus that receives and demodulates that multiplex transmit signal.

Figure 34:
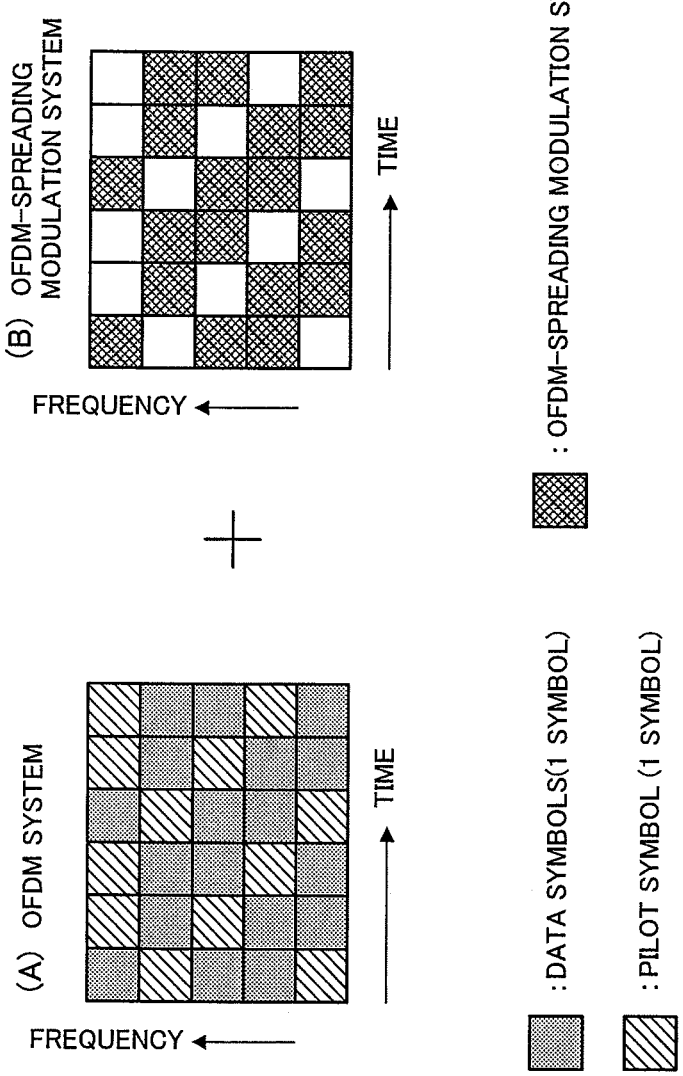
FIG. 34 is a drawing showing sample frame configurations of a multiplex transmit signal whose constituent signals are multiplexed in the same frequency band according to Embodiment 9.

FIG. 34 shows sample frame configurations on the frequency-time axes according to this embodiment. In FIG. 34, one block indicated by fine shading represents one OFDM modulated symbol, one block indicated by coarse shading represents one OFDM-spreading modulation modulated chip, and one block indicated by diagonal hatching represents one pilot signal symbol.

As can be seen from FIG. 34, a transmitting apparatus of this embodiment multiplexes and transmits an OFDM modulated signal and OFDM-spreading modulation modulated signal in the same frequency band of the same time. By this means, extremely high-speed data transmission is possible by multiplexing an OFDM-spreading modulation modulated signal in addition to an OFDM modulated signal for which high-speed data transmission is possible by itself.

In this embodiment, OFDM modulation processing is performed for a pilot signal, but unlike data symbols, multiplexing is not performed at the same frequency of the same time with OFDM-spreading modulation. As a result, pilot symbols can be extracted easily during reception and demodulation.

That is to say, with OFDM modulation, subcarriers are modulated so as to have a mutually orthogonal relationship, and therefore, when the pilot symbols shown in FIG. 34 are viewed at the same time, pilot symbols of different frequencies can easily be restored without degradation by demodulating each subcarrier. Then, if the same kind of processing is performed at a different point in time, another pilot symbol can also be restored.

Figure 35:
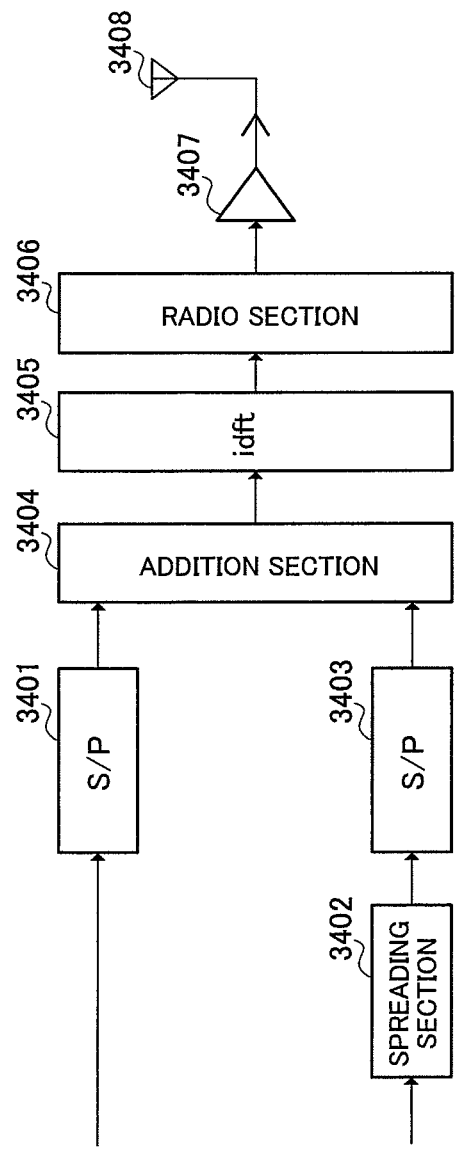
FIG. 35 is a block diagram showing a configuration of a transmitting apparatus of Embodiment 9.

A transmitting apparatus of this embodiment is configured as shown in FIG. 35. Transmitting apparatus 3400 performs serial/parallel conversion processing on a first information signal by means of a serial/parallel conversion section (S/P) 3401, and then sends the resulting signal to an addition section 3404.

Also, transmitting apparatus 3400 executes spreading processing on a second information signal by means of a spreading section 3402, executes serial/parallel conversion processing by means of a serial/parallel conversion section (S/P) 3403, and then sends the resulting signal to addition section 3404.

After these two signals are added by addition section 3404, the resulting signal undergoes inverse discrete Fourier transform processing by an inverse discrete Fourier transform section (idft) 3405. By this means, a multiplex transmit signal is formed in which an OFDM modulated signal and OFDM-spreading modulated signal with the frame configurations shown in FIG. 34 are multiplexed in the same frequency band.

This multiplex transmit signal is subjected to predetermined radio processing by a radio section 3406, is amplified by an amplification section 3407, and transmitted from an antenna 3408. Thus, a large-capacity multiplex transmit signal in which an OFDM modulated signal and OFDM-spreading modulated signal are multiplexed in the same frequency band is transmitted from transmitting apparatus 3400.

Figure 36:
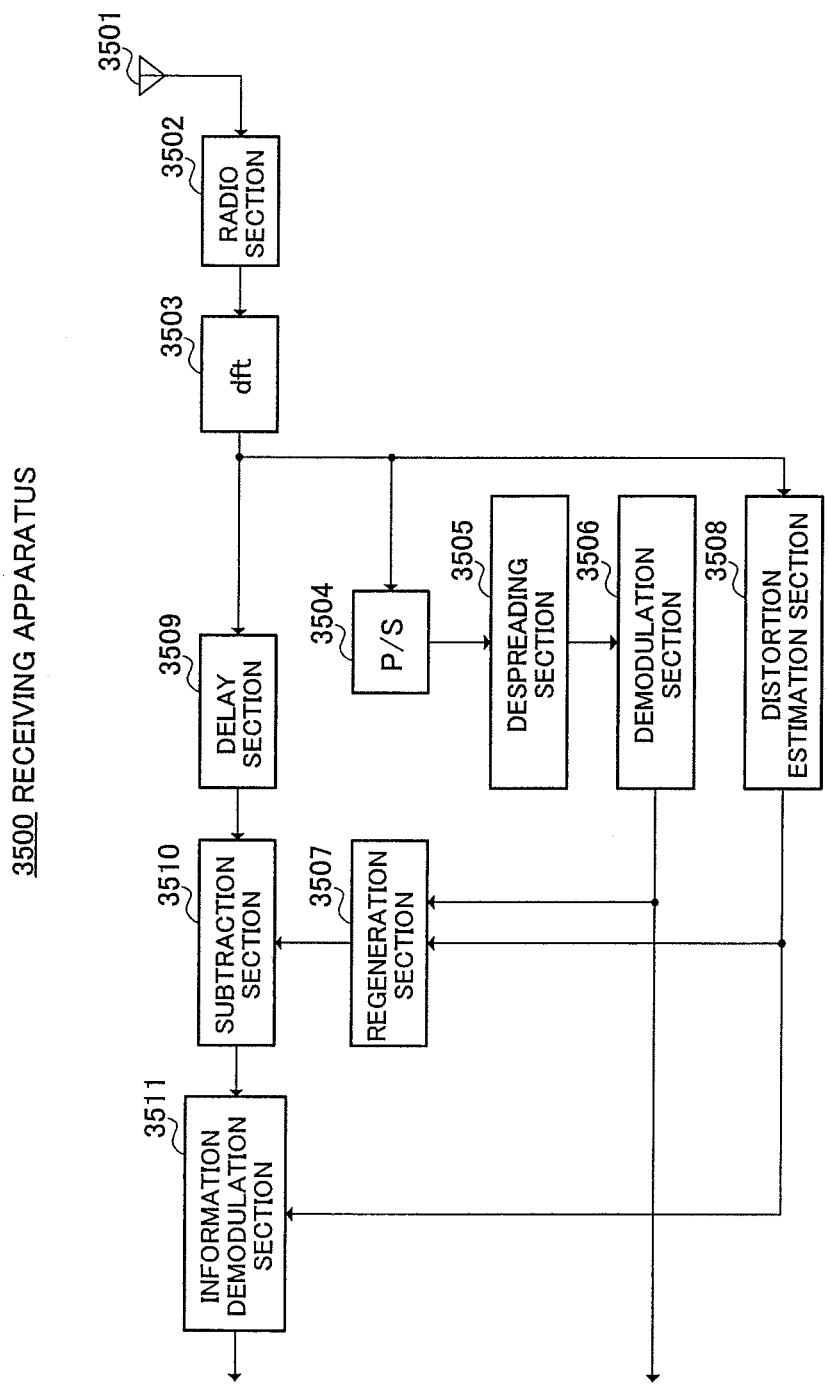
FIG. 36 is a block diagram showing a configuration of a receiving apparatus of Embodiment 9.

A receiving apparatus of this embodiment is configured as shown in FIG. 36. On receiving a multiplex transmit signal in which an OFDM modulated signal and OFDM-spreading modulated signal are multiplexed in the same frequency band at antenna 3501, receiving apparatus 3500 performs predetermined reception processing in a radio section 3502. The signal that has undergone radio reception processing is subjected to discrete Fourier transform processing by a discrete Fourier transform section (dft) 3503, and the processed signal is sent to a delay section 3509, parallel/serial conversion section (P/S) 3504, and distortion estimation section 3508.

The received multiplex signal that has undergone parallel/serial conversion by parallel/serial conversion section 3504 is input to a despreading section 3505, where despreading processing is executed. The signal output from despreading section 3505 is only a signal that was subject to OFDM-spreading modulation; an OFDM signal becomes a noise component with a very low signal level through despreading, and is consequently eliminated by despreading section 3505. The output of despreading section 3505 is sent to a demodulation section 3506.

Demodulation section 3506 executes demodulation processing corresponding to primary modulation executed on the transmitting side. In transmitting apparatus 3400 shown in FIG. 35 the configuration of the primary modulation section corresponding to this demodulation section 3506 is omitted, but in fact, modulation sections that execute modulation processing corresponding to an information demodulation section 3511 described later herein and demodulation section

3506 are provided on the input side of serial/parallel conversion section 3401 and on the input side of spreading section 3402.

The signal prior to OFDM-spreading modulation demodulated by demodulation section 3506 is output directly as a second information signal, and is also sent to a regeneration section 3507. Transmission distortion information estimated by distortion estimation section 3508 is also input to regeneration section 3507. Distortion estimation section 3508 estimates transmission distortion based on the pilot signal contained in the received multiplex signal.

Regeneration section 3507 regenerates an OFDM-spreading modulated signal by executing on the second information signal obtained by demodulation section 3506 the same spreading processing and serial/parallel conversion processing as performed on the transmitting side, and sends this signal to a subtraction section 3510.

A received multiplex signal delayed by delay section 3509 by an amount equivalent to the processing delay of parallel/serial conversion section 3504, despreading section 3505, demodulation section 3506, and regeneration section 3507 is input to subtraction section 3510. By subtracting the OFDM-spreading modulated signal from the received multiplex signal, subtraction section 3510 outputs only an OFDM modulated signal. Information demodulation section 3511 restores the first information signal by executing demodulation processing corresponding to the transmitting-side primary modulation processing on the OFDM modulated signal, and outputs this restored signal.

In this embodiment, the positions of signal points of an OFDM modulated signal and the positions of signal points of an OFDM-spreading modulated signal are arranged so as to be mutually different. By this means, even when an OFDM modulated signal and OFDM-spreading modulated signal are multiplexed in the same frequency band, interference between the signals can be obviated, and moreover the correlation between the signals can be lowered, enabling data errors to be suppressed during demodulation. In fact, since the correlation between an OFDM-spreading modulated signal and OFDM modulated signal is low, it is possible for only an OFDM-spreading modulated signal to be extracted by despreading section 3505.

Examples of signal point arrangements are shown in FIG. 25 and FIG. 26. FIG. 25 shows an example of a case in which an OFDM modulated signal and OFDM-spreading modulated signal are QPSK modulated. Through π/4 shift QPSK modulation, an OFDM modulated signal has the signal point arrangement shown by the black and white circles. On the other hand, through QPSK modulation, an OFDM-spreading modulated signal has the signal point arrangement shown by the white circles.

FIG. 26 shows an example of a case in which an OFDM modulated signal and OFDM-spreading modulated signal are BPSK modulated. Through π/2 shift BPSK modulation, an OFDM modulated signal has the signal point arrangement shown by the white and black circles. On the other hand, through BPSK modulation, an OFDM-spreading modulated signal has the signal point arrangement shown by the black circles.

Thus, according to the above configuration, by multiplexing and transmitting an OFDM modulated signal and OFDM-spreading modulated signal in the same frequency band, it is possible to perform extremely high-speed data transmission.

Also, by making the signal point positions in the I-Q plane different for an OFDM modulated signal and an OFDM-spreading modulated signal, it is possible to suppress signal degradation due to multiplexing, and the two signals can be separated with few data errors.

In this embodiment a case has been described in which, as described with regard to FIG. 35, when an OFDM-spreading modulated signal is formed, spreading processing is performed by spreading section 3402, and then serial/parallel conversion processing is performed by serial/parallel conversion section 3403. That is to say, mutually orthogonal subcarriers are formed after an information signal is spread on the frequency axis.

Figure 37:
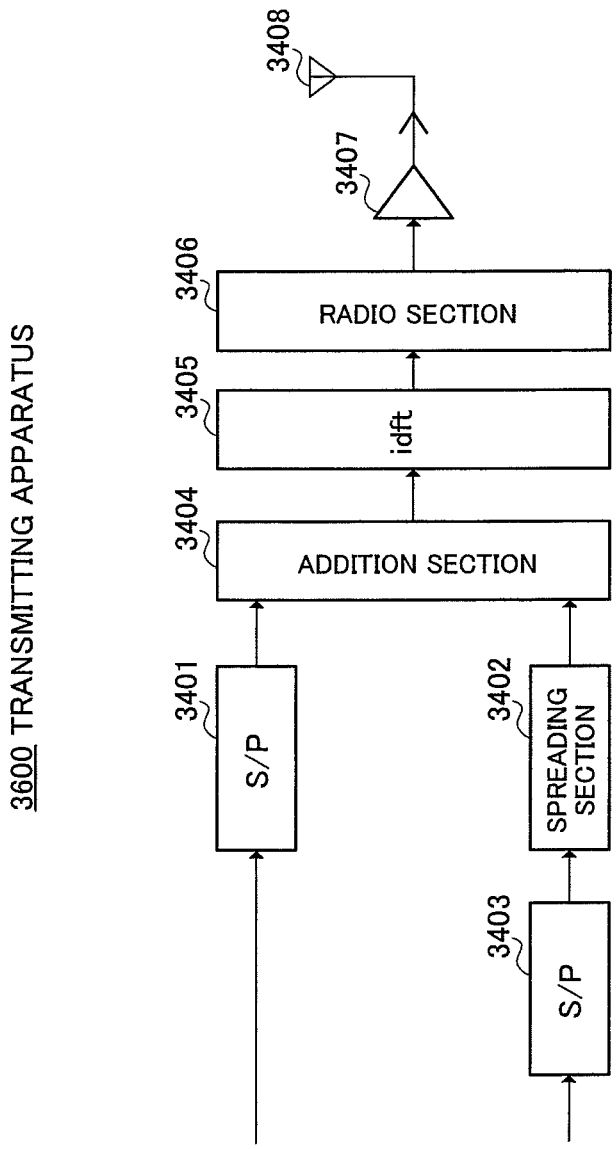
FIG. 37 is a block diagram showing another sample configuration of a transmitting apparatus of Embodiment 9.

However, the present invention is not limited to this, and it is also possible for spreading processing to be performed after serial/parallel conversion processing is performed, as in the case of transmitting apparatus 3600 shown in FIG. 37. That is to say, it is also possible to first assign an information signal to a plurality of mutually orthogonal subcarriers, and then perform spreading processing on a subcarrier-by-subcarrier basis.

Figure 38:
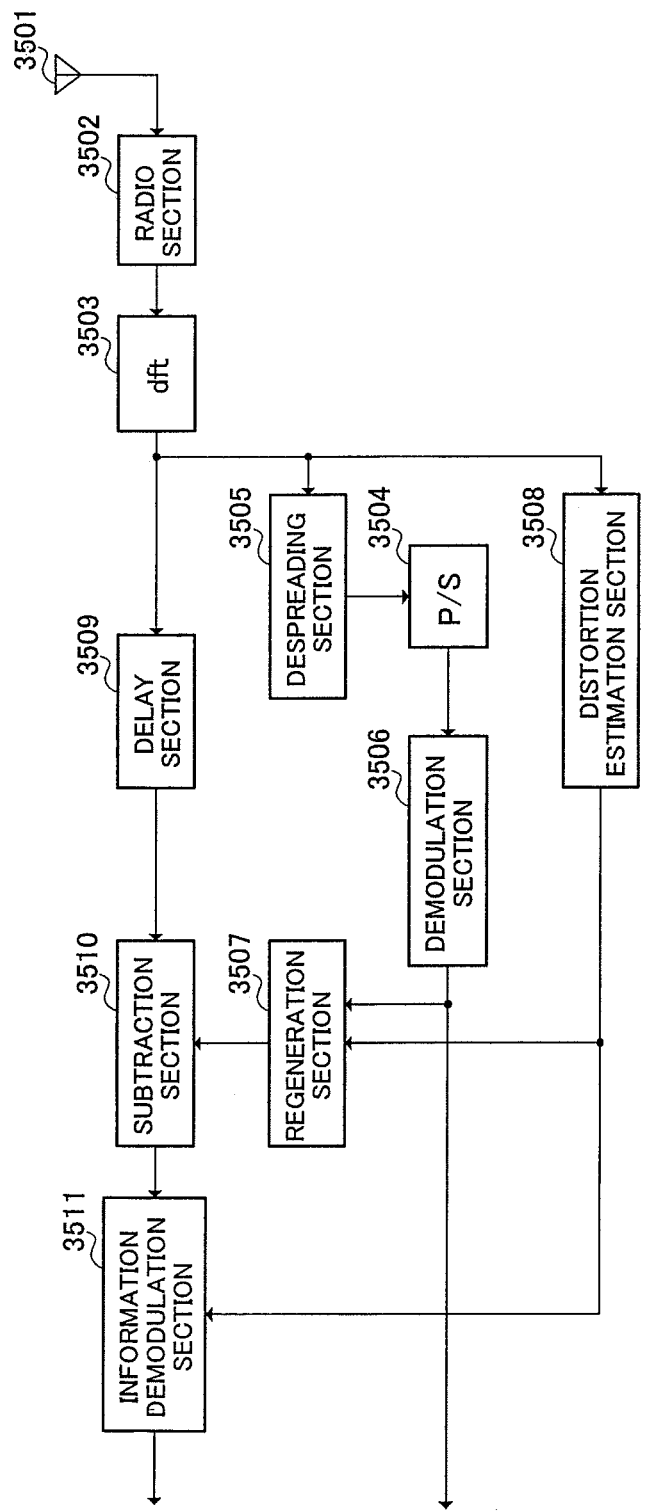
FIG. 38 is a block diagram showing another sample configuration of a receiving apparatus of Embodiment 9.

In this case, as shown in FIG. 38, in the configuration of a receiving apparatus 3700 it is only necessary to reverse the order of connection of despreading section 3505 and parallel/serial conversion section 3504, and perform parallel/serial conversion processing after despreading processing.

Embodiment 10

In this embodiment an OFDM modulated signal and OFDM-spreading modulated signal are multiplexed and transmitted in the same frequency band, and spreading code information used when performing OFDM-spreading modulation processing is also transmitted.

By this means, it is possible not only to transmit large amounts of data but also to perform highly secure communication between a transmitting apparatus and receiving apparatus of this embodiment. That is to say, if spreading code information is used as an encryption key only between mutually communicating parties, it is possible to share spreading code information with only a specific communicating party.

As a result, another communication terminal is unable to restore an OFDM-spreading modulated signal. Moreover, the inability to restore an OFDM-spreading modulated signal also means an inability to isolate and restore an OFDM modulated signal multiplexed at the same frequency and at the same time.

For example, rules can be decided be forehand between mutually communicating parties to the effect that "00" spreading code information corresponds to spreading code A, "01" spreading code information corresponds to spreading code B, "10" spreading code information corresponds to spreading code C, and "11" spreading code information corresponds to spreading code D.

Figure 39:
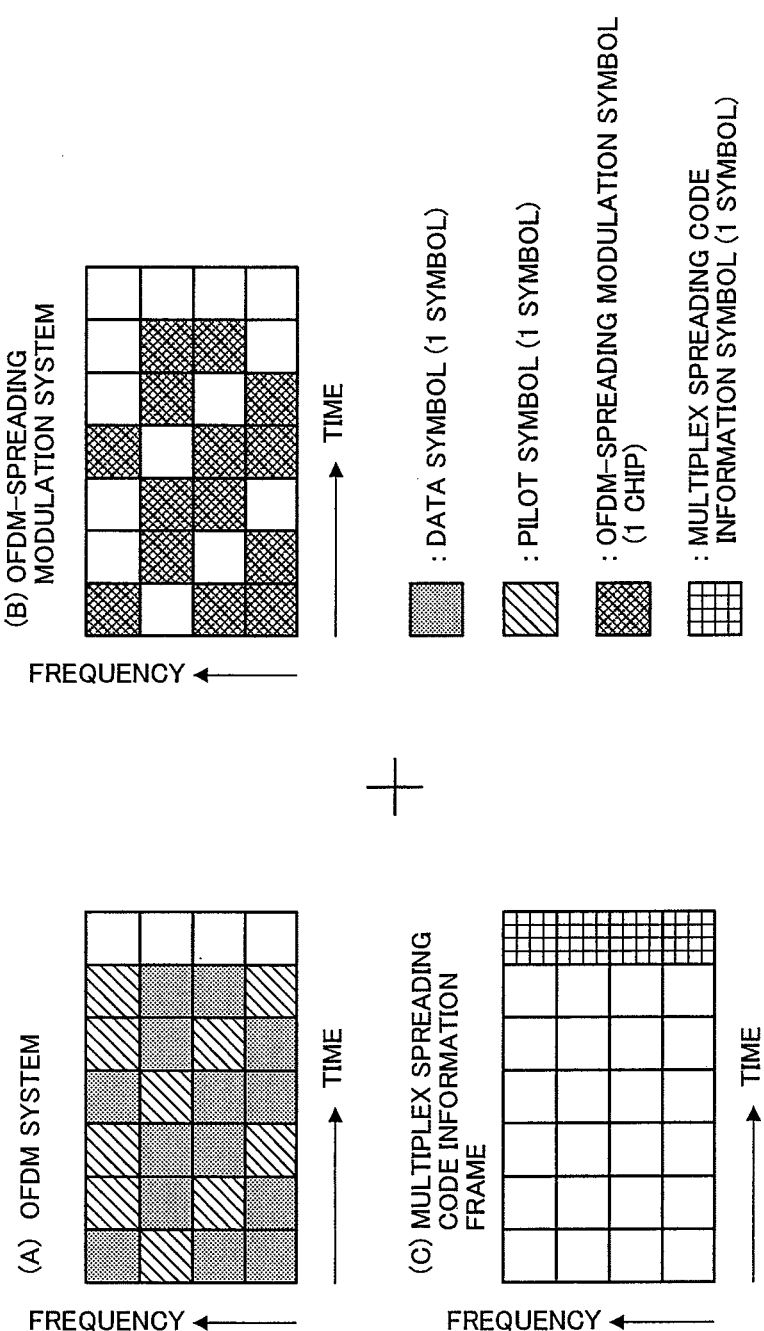
FIG. 39 is a drawing showing sample frame configurations of a multiplex transmit signal whose constituent signals are multiplexed in the same frequency band according to Embodiment 10.
Figure 40:
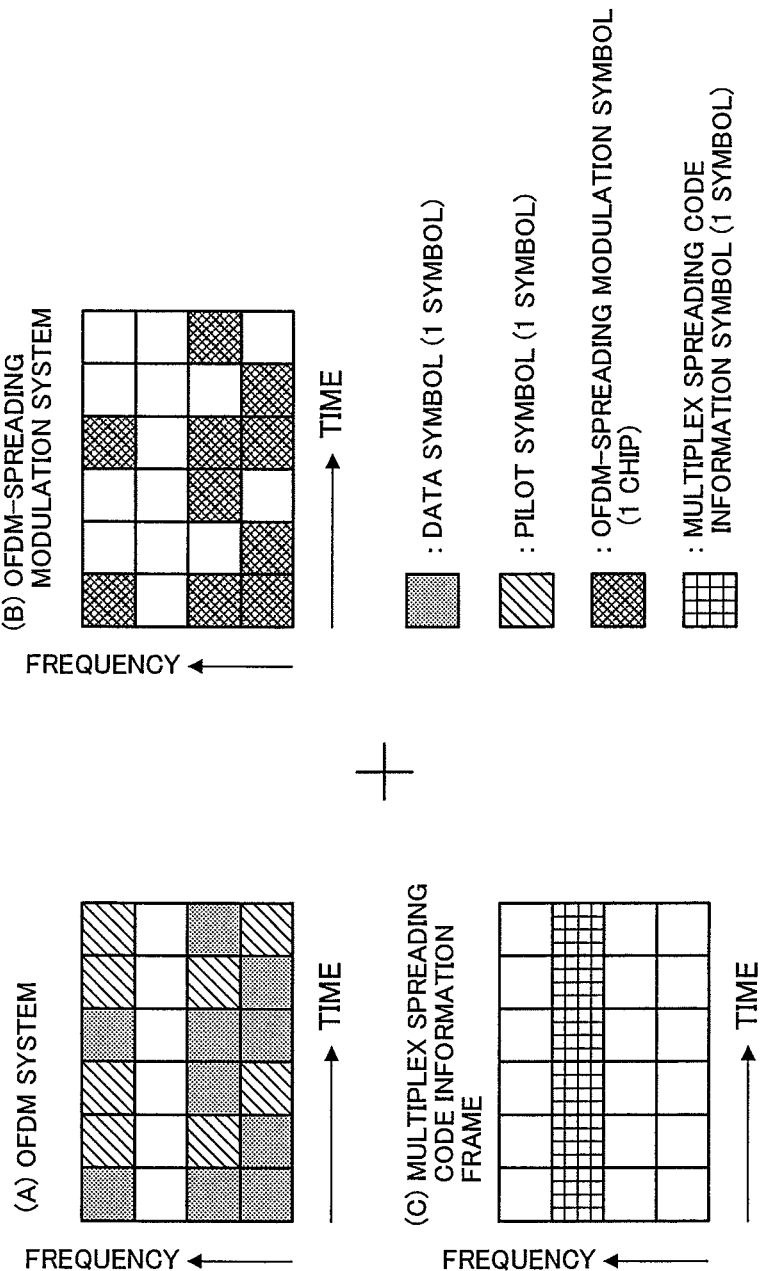
FIG. 40 is a drawing showing sample frame configurations of a multiplex transmit signal whose constituent signals are multiplexed in the same frequency band according to Embodiment 10.

FIG. 39 and FIG. 40 show sample frame configurations of a multiplex transmit signal when transmitting spreading code information (multiplex spreading code information symbols). FIG. 39 shows frame configurations in the case where multiplex spreading code information symbols are transmitted by subcarriers of different frequencies at the same time, and FIG. 40 shows frame configurations in the case where multiplex spreading code information symbols are transmitted in the same frequency band.

As is clear from FIG. 39 and FIG. 40. multiplex spreading code information symbols are arranged so as not to be multiplexed with other symbols or chips in respect of at least one of the elements of time or frequency. For example, in FIG. 39, multiplex spreading code information symbols are multiplexed with OFDM symbols, OFDM-spreading modulation symbols, and pilot symbols in the frequency direction, but are independent in the time direction. In FIG. 40, on the other hand, multiplex spreading code information symbols are multiplexed with OFDM symbols, OFDM-spreading modulation symbols, and pilot symbols in the time direction, but are independent in the frequency direction.

This enables multiplex spreading code information symbols to be extracted easily on the receiving side.

Figure 41:
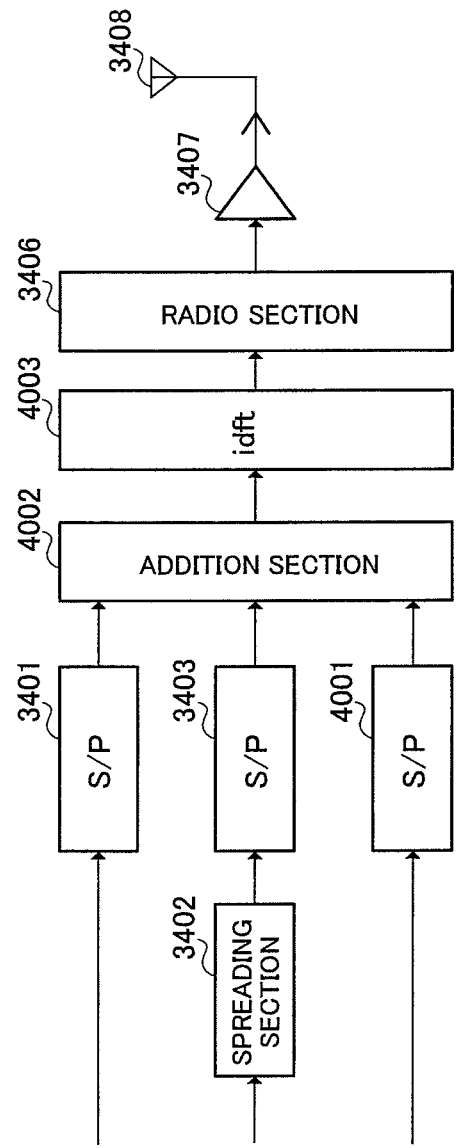
FIG. 41 is a block diagram showing the configuration of a transmitting apparatus that transmits the multiplex transmit signal of FIG. 39.

FIG. 41, in which parts corresponding to those in FIG. 35 are assigned the same codes as in FIG. 35, shows the configuration of a transmitting apparatus 4000 of this embodiment. Transmitting apparatus 4000 forms a multiplex transmit signal with the frame configuration shown in FIG. 39. Transmitting apparatus 4000 executes serial/parallel conversion processing by means of a serial/parallel conversion section (S/P) 4001 on spreading code information output from the system control unit (not shown) of transmitting apparatus 4000, and then sends the resulting signal to an addition section 4002.

Addition section 4002 adds a first information signal that has undergone serial/parallel conversion by serial/parallel conversion section 3401, a second information signal that has undergone spreading processing and serial/parallel conversion processing by a spreading section 3402 and serial/parallel conversion section 3403, and spreading code information that has undergone serial/parallel conversion by serial/parallel conversion section 4001. The signal resulting from this addition is then subjected to inverse discrete Fourier transform processing by an inverse discrete Fourier transform section (idft) 4003.

Thus in transmitting apparatus 4000, by performing serial/parallel conversion on spreading code information, followed by addition and inverse discrete Fourier transform processing, spreading code information is superimposed on a plurality of subcarriers in a mutually orthogonal relationship together with an OFDM modulated signal and OFDM-spreading modulated signal, as shown in FIG. 39.

Figure 42:
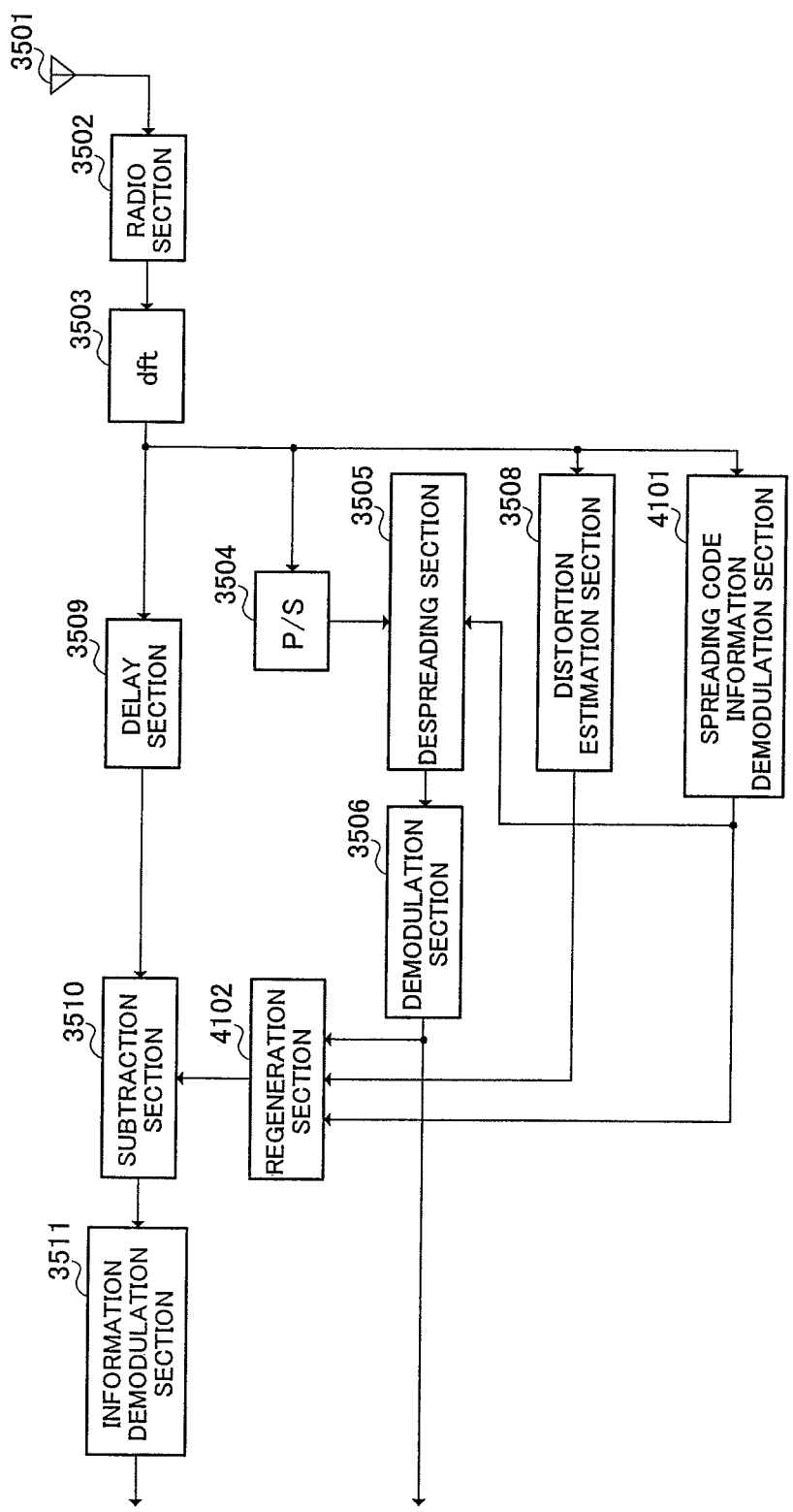
FIG. 42 is a block diagram showing the configuration of a receiving apparatus that receives the multiplex transmit signal of FIG. 39.

FIG. 42, in which parts corresponding to those in FIG. 38 are assigned the same codes as in FIG. 38, shows the configuration of a receiving apparatus 4100 that receives and demodulates a multiplex transmit signal transmitted from transmitting apparatus 4000 in FIG. 41. In receiving apparatus 4100, a received multiplex signal that has undergone discrete Fourier trans form processing is input to a spreading code information demodulation section 4101. Spreading code information demodulation section 4101 extracts only spreading code information from the received multiplex signal, and demodulates this spreading code information.

As shown in FIG. 39, spreading code information of this embodiment is multiplexed with OFDM symbols, OFDM-spreading modulation symbols, and pilot symbols in the frequency direction, but is independent in the time direction, enabling spreading code information to be extracted easily by spreading code information demodulation section 4101 by coordinating timing with the spreading code information.

Spreading code information demodulation section 4101 demodulates the spreading code information extracted in this way, selects a spreading code specification signal corresponding to the demodulated data from among held spreading code specification signals based on rules known only to transmitting apparatus 4000 and receiving apparatus 4100, and sends this spreading code specification signal to despreading section 3505 and a regeneration section 4102.

By this means, despreading section 3505 can restore the second information signal prior to OFDM-spreading modulation processing by performing despreading processing using the spreading code specified by the spreading code specification signal. Other receiving apparatuses, on the other hand, cannot restore the OFDM-spreading modulated signal as they do not know the spreading code.

Regeneration section 4102 regenerates an OFDM-spreading modulated signal by executing the same spreading processing and serial/parallel conversion processing as performed on the transmitting side on the second information signal obtained by de spreading section 3505, using the spreading code corresponding to the spreading code specification signal.

Thus, according to the above configuration, an OFDM modulated signal and OFDM-spreading modulated signal are multiplexed in the same frequency band, and also information on a spreading code used when performing OFDM-spreading modulation processing is transmitted as encryption key information that can be known only to a specific communicating party, as a result of which it is possible not only to perform high-speed data transmission but also to perform highly secure communication.

Figure 43:
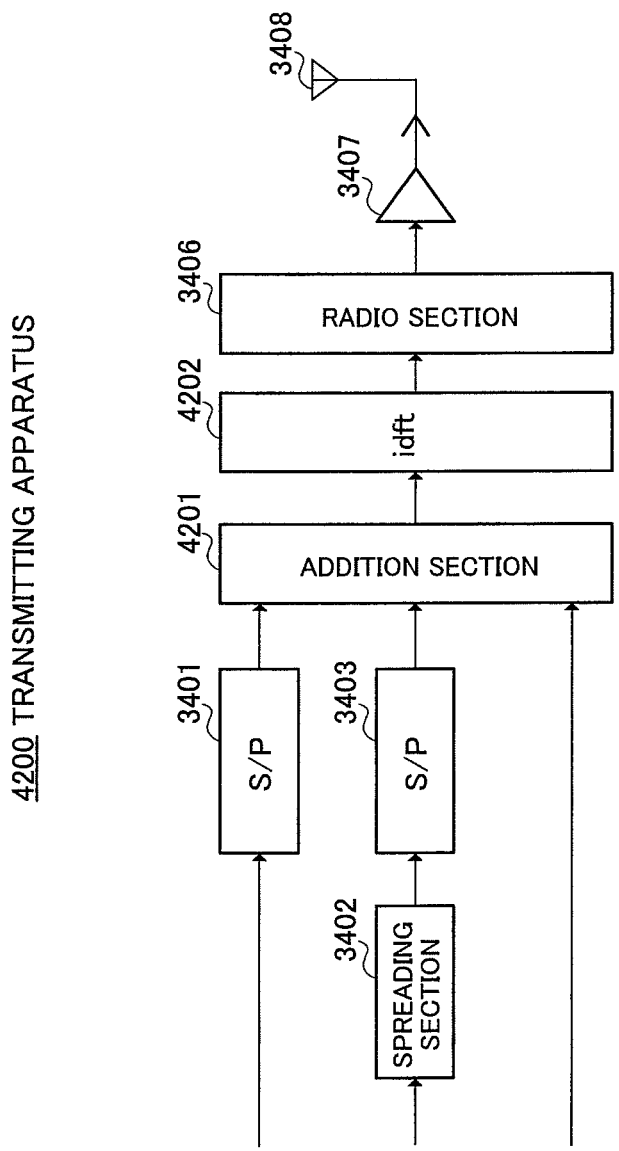
FIG. 43 is a block diagram showing the configuration of a transmitting apparatus that transmits the multiplex transmit signal of FIG. 40.

In the above embodiment, a description has been given of the configurations of a transmitting apparatus 4000 that forms a multiplex transmit signal in which spreading code information is arranged in the same time direction, as shown in FIG. 39, and a receiving apparatus 4100 that receives and demodulates that multiplex transmit signal, but a transmitting apparatus that forms a transmit signal in which spreading code information is arranged in the same frequency direction, as shown in FIG. 40, may also be configured as shown in FIG. 43.

In FIG. 43, in which parts corresponding to those in FIG. 41 are assigned the same codes as in FIG. 41, in communication apparatus 4200 spreading code information is input directly to an addition section 4201 without undergoing serial/parallel conversion processing. An inverse discrete Fourier transform section 4202 executes inverse discrete Fourier transform processing so that spreading code information is assigned to the same frequency. By this means, a multiplex transmit signal with the frame configuration shown in FIG. 40 is formed.

In this case, a receiving apparatus can have almost the same configuration as receiving apparatus 4100 shown in FIG. 42. Spreading code information can then easily be extracted by having information of a predetermined frequency extracted by spreading code information demodulation section 4101.

In this embodiment, also, a case has been described in which, when forming an OFDM-spreading modulated signal, spreading processing is performed by spreading section 3402, followed by serial/parallel conversion processing by serial/parallel conversion section 3403, but the present invention is not limited to this, and it is also possible for spreading processing to be performed after serial/parallel conversion processing, as described in Embodiment 9. In this case, it is only necessary for the receiving apparatus to perform parallel/serial conversion processing after despreading processing accordingly.

Embodiment 11

Figure 44:
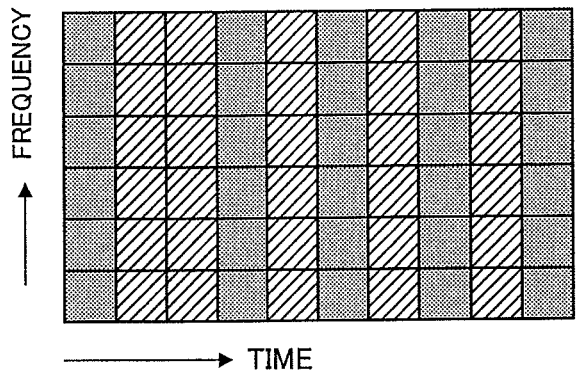
FIG. 44A is a drawing showing a sample frame configuration of a multiplex transmit signal whose constituent signals are multiplexed in the same frequency band according to Embodiment 11.
FIG. 44B is a drawing showing a sample frame configuration of a multiplex transmit signal whose constituent signals are multiplexed in the same frequency band according to Embodiment 11.
Figure 44:
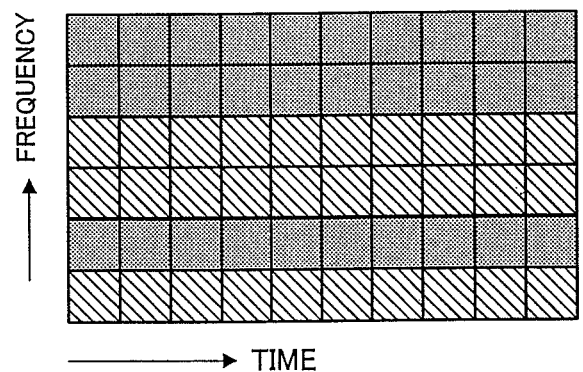

In this embodiment a method is proposed whereby, firstly, as shown in FIG. 44 (A), an OFDM modulated signal and OFDM-spreading modulated signal are multiplexed and transmitted at specific times, and at times other than the specific times, either an OFDM modulated signal or an OFDM-spreading modulated signal is transmitted.

Also, secondly, as shown in FIG. 44 (B), an OFDM modulated signal and OFDM-spreading modulated signal are multiplexed and transmitted on specific subcarriers, and on subcarriers other than the specific subcarriers, either an OFDM modulated signal or an OFDM-spreading modulated signal is transmitted.

By this means, in this embodiment it is possible to perform high-speed transmission of large amounts of data.

Figure 45:
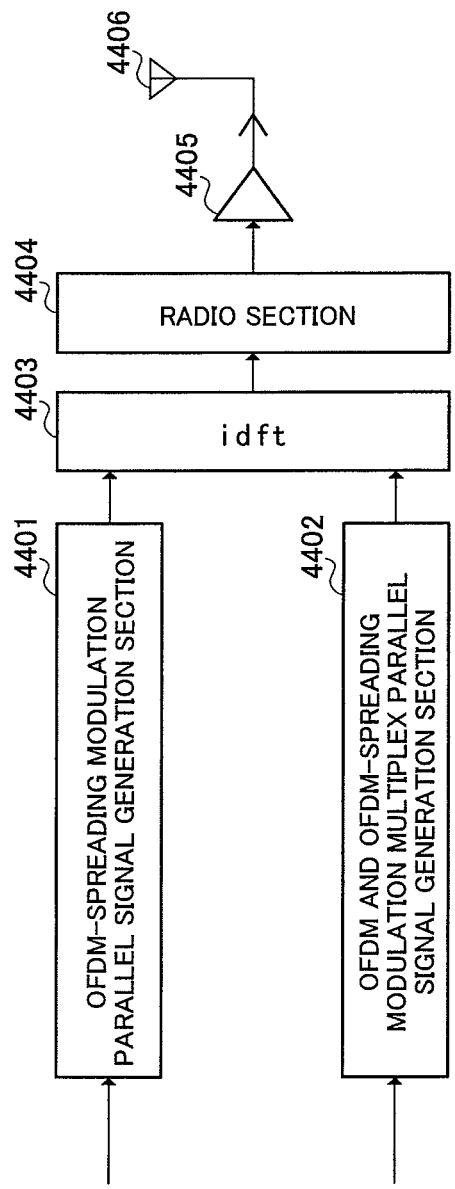
FIG. 45 is a block diagram showing the configuration of a transmitting apparatus that transmits the multiplex transmit signal of FIG. 44.

The configuration of a transmitting apparatus of this embodiment is shown in FIG. 45. In transmitting apparatus 4400, a first information signal is input to an OFDM-spreading modulation parallel signal generation section 4401, and a second information signal is input to an OFDM and OFDM-spreading modulation multiplex parallel signal generation section 4402.

OFDM-spreading modulation parallel signal generation section 4401 is composed of a spreading section and a parallel/serial conversion section, and generates spreading-processed parallel signals from the first information signal.

OFDM and OFDM-spreading modulation multiplex parallel signal generation section 4402 has the kind of configuration shown in the initial stage of FIG. 37. That is to say, a serial/parallel conversion section, and a serial/parallel conversion section and spreading section, are connected in parallel to the input stage of an addition section, a serial/parallel converted parallel signal and spread serial/parallel converted parallel signal are input to the addition section, and these two parallel signals are added by the addition section.

The parallel signal generated by OFDM-spreading modulation parallel signal generation section 4401 and the spread parallel signal generated by OFDM and OFDM-spreading modulation multiplex parallel signal generation section 4402 are subjected to inverse discrete Fourier transform processing by an inverse discrete Fourier transform section (idft) 4403, to become a multiplex transmit signal with a frame configuration as shown in FIG. 44.

Figure 46:
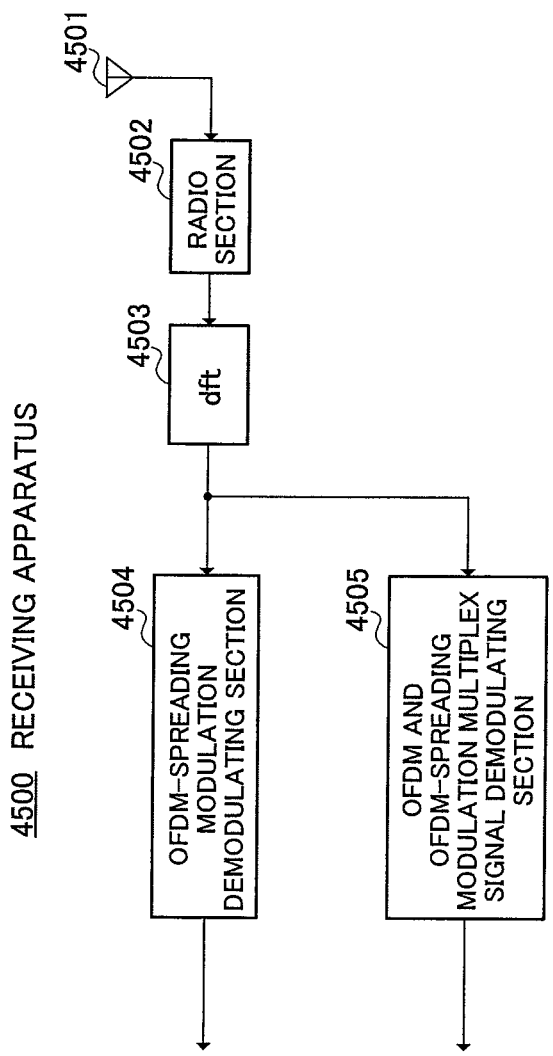
FIG. 46 is a block diagram showing the configuration of a receiving apparatus that receives the multiplex transmit signal of FIG. 44.

A multiplex transmit signal that has undergone inverse discrete Fourier transform processing is transmitted via a radio section 4404, amplifier 4405, and antenna 4406. A multiplex transmit signal transmitted in this way is received and demodulated by a receiving apparatus 4500 with the configuration shown in FIG. 46.

In receiving apparatus 4500, a signal received by an antenna 4501 is input to a discrete Fourier transform section (dft) 4503 via a radio section 4502. The received multiplex signal that has undergone discrete Fourier transform processing by discrete Fourier transform section 4503 is sent to an OFDM-spreading modulation demodulating section 4504 that performs the reverse of the processing of OFDM-spreading modulation parallel signal generation section 4401 (FIG. 45), and is also sent to an OFDM and OFDM-spreading modulation multiplex signal demodulating section 4505 that performs the reverse of the processing of OFDM and OFDM-spreading modulation multiplex parallel signal generation section 4402 (FIG. 45).

Then only the first information signal prior to OFDM-spreading modulation is demodulated by OFDM-spreading modulation demodulating section 4504. Also, the multiplexed OFDM modulated signal and OFDM-spreading modulated signal are each demodulated by OFDM and OFDM-spreading modulation multiplex signal demodulating section 4505.

Thus, according to the above configuration, by providing a region in which an OFDM modulated signal and OFDM-spreading modulated signal are multiplexed and transmitted, and a region in which only an OFDM modulated signal or OFDM-spreading modulated signal is transmitted, it is possible not only to perform high-speed transmission of large amounts of data but also to perform communication with greater diversity.

A case has been described in which, in transmitting apparatus 4400 in FIG. 45, an OFDM-spreading modulation parallel signal is generated by OFDM-spreading modulation parallel signal generation section 4401, and an OFDM-spreading modulated signal is assigned to other than specific times or specific subcarriers in which an OFDM modulated signal and OFDM-spreading modulated signal are multiplexed, but the present invention is not limited to this, and if an OFDM parallel signal generation section is used instead of OFDM-spreading modulation parallel signal generation section 4401, it is possible for an OFDM modulated signal to be assigned to other than specific times or specific subcarriers.

Embodiment 12

In this embodiment, spread spectrum symbols are multiplexed and transmitted together with data symbols in the same frequency band of the same time. Then information is placed on spread spectrum symbols, and spread spectrum symbols are used on the receiving side as a signal for synchronization.

By this means, in this embodiment high-speed data transmission can be performed and receiving-side synchronization processing can be performed accurately and easily.

Figure 48:
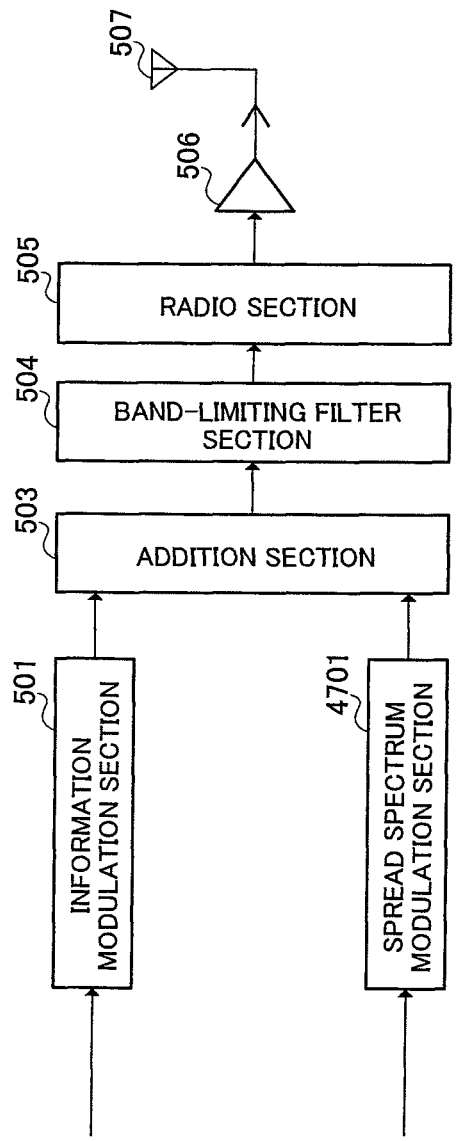
FIG. 48 is a block diagram showing the configuration of a transmitting apparatus that transmits the multiplex transmit signal of FIG. 47.

FIG. 48 shows the configuration of a transmitting apparatus 4700 of this embodiment. In FIG. 48, in which parts corresponding to those in FIG. 6 are assigned the same codes as in FIG. 6, transmitting apparatus 4700 is equipped with a spread spectrum modulation section 4701 instead of digital modulation section 502.

Spread spectrum modulation section 4701 has as input a second information signal different from the first information signal input to information modulation section 501, and forms a spread spectrum signal by performing spreading processing using a predetermined spreading code. The digitally modulated signal obtained by information modulation section 501 and spread spectrum signal obtained by spread spectrum modulation section 4701 are added by addition section 503. The processing subsequent to addition section 503 is similar to the processing described with regard to FIG. 6, and therefore a description thereof is omitted here.

Figure 49:
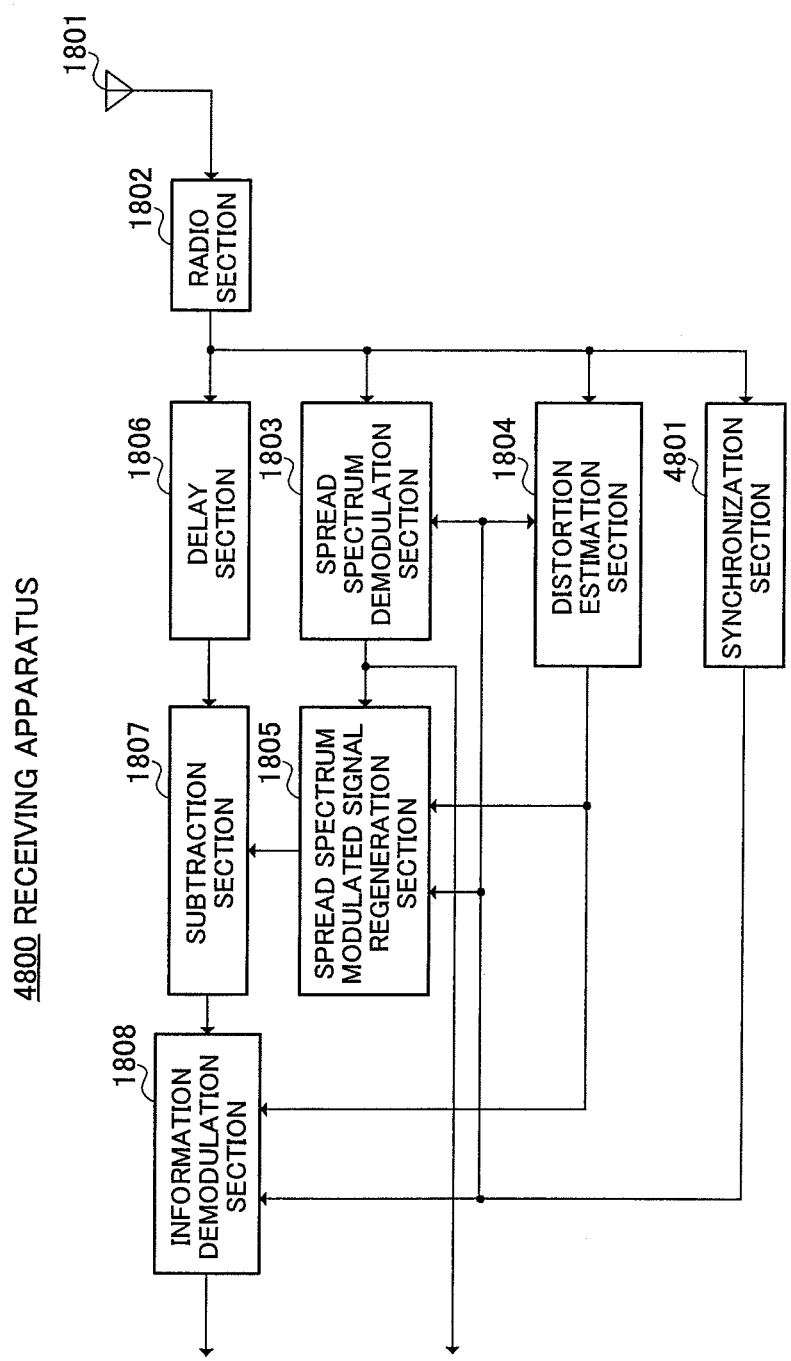
FIG. 49 is a block diagram showing the configuration of a receiving apparatus that receives the multiplex transmit signal of FIG. 37.

FIG. 49 shows the configuration of a receiving apparatus 4800 of this embodiment. In FIG. 49, in which parts corresponding to those in FIG. 19 are assigned the same codes as in FIG. 19, receiving apparatus 4800 has a similar configuration to receiving apparatus 1800 in FIG. 19, except for having a synchronization section 4801.

Figure 47:
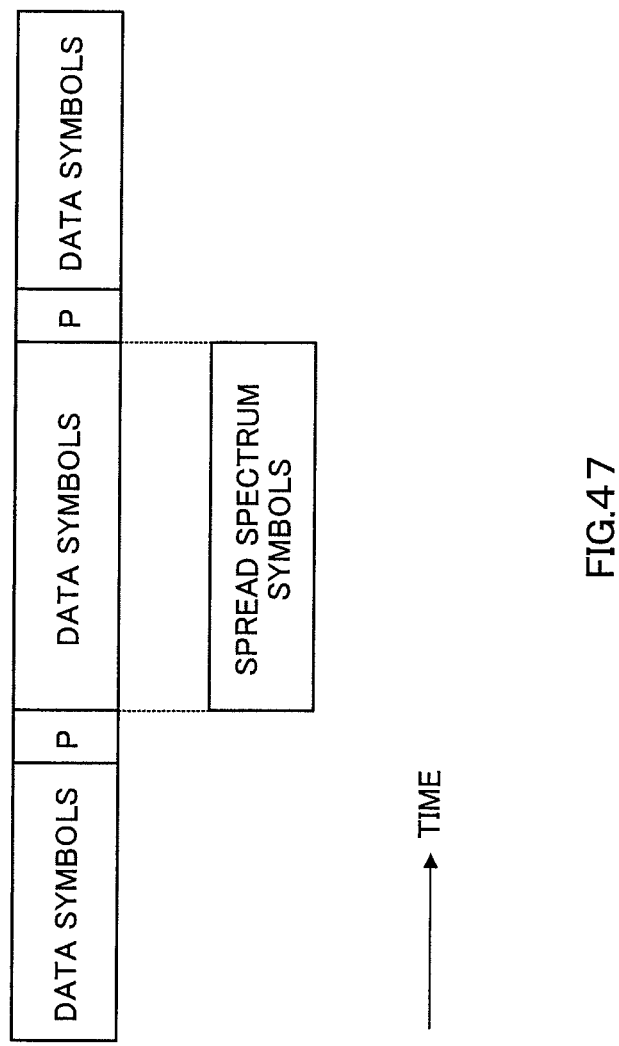
FIG. 47 is a drawing showing a frame configuration of a multiplex transmit signal according to Embodiment 12.

Synchronization section 4801 has as input a received multiplex signal with the frame configuration shown in FIG. 47. Synchronization section 4801 multiplies the received multiplex signal by the same spreading code as used by spread spectrum modulation section 4701 of transmitting apparatus 4700 (FIG. 48).

By this means, in synchronization section 4801 a correlation value peak is detected at the point in time at which a spread spectrum symbol within the received multiplex signal is input. Taking the point in time at which this peak is detected as synchronization timing, synchronization section 4801 sends a synchronization timing signal to spread spectrum demodulation section 1803, spread spectrum modulated signal regeneration section 1805, distortion estimation section 1804, and information demodulation section 1808.

Spread spectrum demodulation section 1803 extracts only spread spectrum symbols from the received multiplex signal by multiplying the received multiplex signal by the same spreading code as used by spread spectrum modulation section 4701 (FIG. 48), at the synchronization timing signal timing. Spread spectrum symbols demodulated by this means are output as a second information signal, and are also sent to spread spectrum modulated signal regeneration section 1805.

Figure 50:
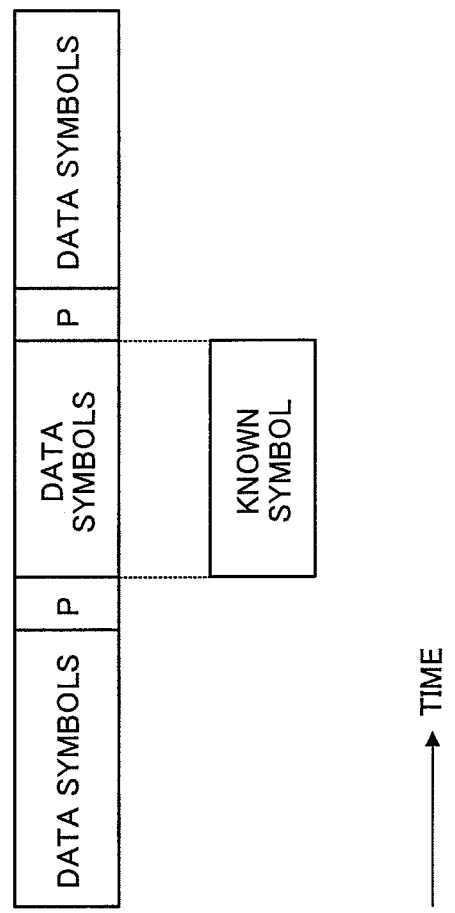
FIG. 50 is a drawing showing another sample frame configuration of a multiplex transmit signal according to Embodiment 12.

Spread spectrum modulated signal regeneration section 1805 regenerates a spread spectrum modulated signal by multiplying the demodulated spread spectrum symbols by a spreading code at timing based on the synchronization signal timing signal. In subtraction section 1807, a frame containing data symbols shown in the upper part of FIG. 50 is extracted by subtracting the regenerated spread spectrum modulated signal from the received multiplex signal.

Based on the synchronization timing signal from synchronization section 4801, information demodulation section 1808 demodulates the input signal at timing delayed by the delay section 1806 delay time and subtraction section 1807 processing time with respect to that synchronization timing signal. By this means, the first information signal is demodulated.

Incidentally, in this embodiment, the pilot symbols (P) located on either side of data symbols in a frame containing data symbols are used as a signal for estimating transmission path distortion.

Thus, according to the above configuration, by multiplexing and transmitting a digitally modulated first information signal and a spread spectrum modulated second information signal in the same frequency band of the same time, it becomes unnecessary to insert a signal for first information signal synchronization in the same frame as the first information signal. The fact that a synchronization signal is not necessary allows information signal insertion in first information signal frames to be increased accordingly, enabling high-speed transmission to be performed.

Also, significantly faster data transmission is made possible by not only transmitting a spread spectrum modulated signal for synchronization but also transmitting second information.

In the above embodiment, a case has been described in which spread spectrum symbols are multiplexed as a signal for synchronization, but it is also possible for known symbols to be multiplexed and transmitted instead of spread spectrum symbols, as shown in FIG. 50.

In this case, also, it is unnecessary to insert synchronization symbols in frames containing data symbols, enabling a greater amount of data to be included in those frames, and making possible high-speed data transmission.

Figure 51:
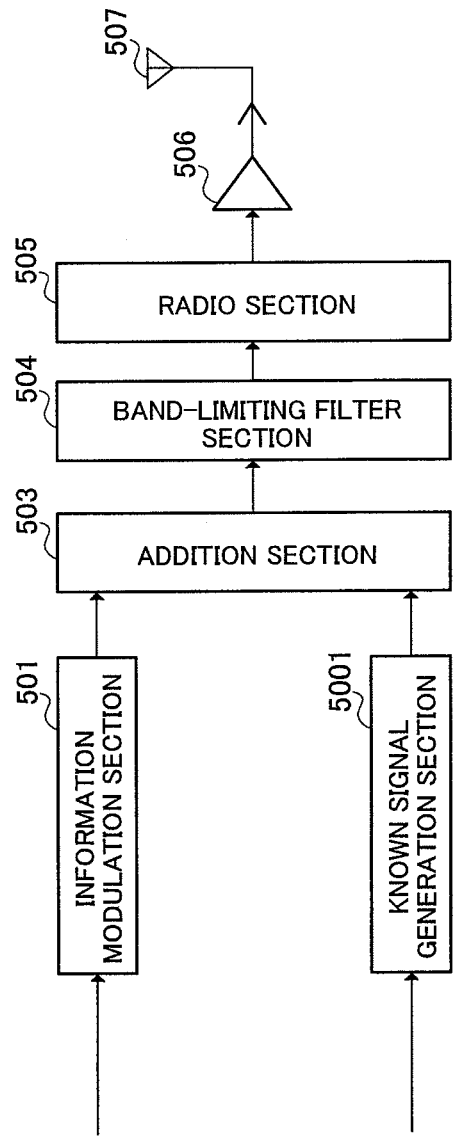
FIG. 51 is a block diagram showing the configuration of a transmitting apparatus that transmits the multiplex transmit signal of FIG. 50.

In this case, a transmitting apparatus may be configured as shown in FIG. 51. The difference between transmitting apparatus 5000 in FIG. 51, in which parts corresponding to those in FIG. 48 are assigned the same codes as in FIG. 48, and transmitting apparatus 4700, is that transmitting apparatus 5000 is equipped with a known signal generation section 5001 instead of spread spectrum modulation section 4701.

Figure 52:
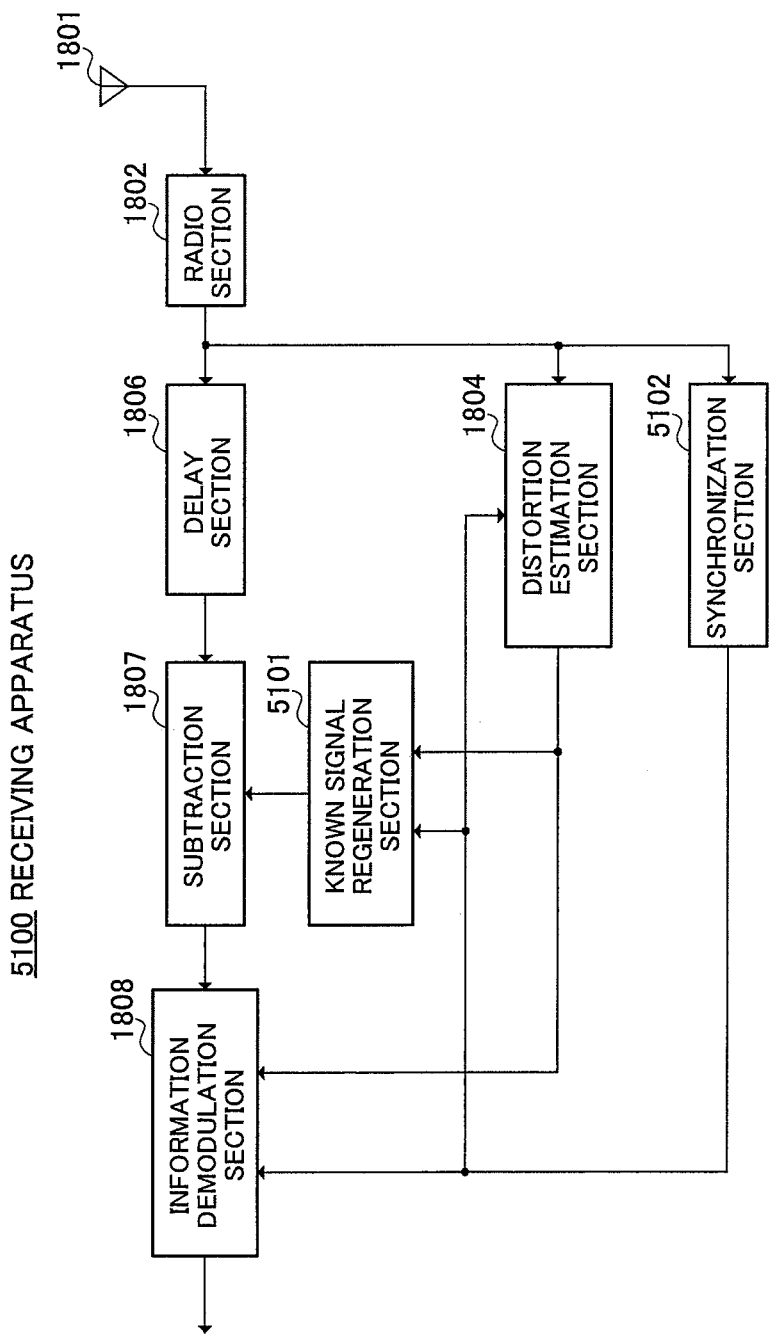
FIG. 52 is a block diagram showing the configuration of a receiving apparatus that receives the multiplex transmit signal of FIG. 50.

A receiving apparatus for this case may be configured as shown in FIG. 52. Differences between receiving apparatus 5100 in FIG. 52, in which parts corresponding to those in FIG. 49 are assigned the same codes as in FIG. 49, and receiving apparatus 4800, are that a synchronization section 5102 detects synchronization timing based on computation of correlation with a known symbol contained in a received multiplex signal, and also that a known signal regeneration section 5101 regenerates a known signal at the synchronization timing detected by synchronization section 5102 and with a distortion component estimated by distortion estimation section 1804 added.

Synchronization section 5102 holds a symbol that is the same as a known symbol, and calculates a correlation value between this held symbol and the received multiplex signal at all times. When a maximum correlation value is detected at a point in time at which a known symbol is input, synchronization section 5102 takes that timing as synchronization timing.

Embodiment 13

In this embodiment there are proposed a transmission method whereby modulated signals of spread spectrum communication systems with different spreading ratios are multiplexed, and a transmitting apparatus and receiving apparatus that use that transmission method.

Figure 53:
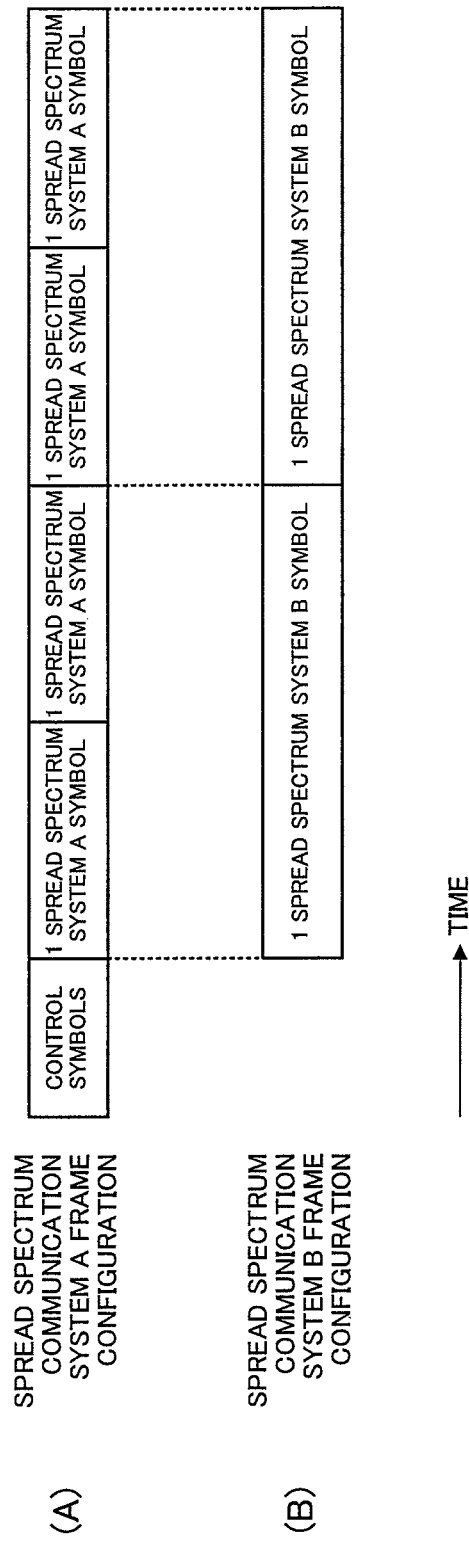
FIG. 53 is a drawing showing sample frame configurations of a multiplex transmit signal according to Embodiment 13.

FIG. 53 shows transmit signal frame configurations formed when the transmission method of this embodiment is used. With spread spectrum communication system A, following control symbols, each symbol is spread with spread spectrum system A that has a predetermined spreading ratio before being transmitted. As described later herein, control symbols are used to perform time synchronization between transmission and reception, estimation of transmission path distortion, or estimation and elimination of frequency offset on the receiving apparatus side, and are transmitted without being multiplexed with a spread spectrum communication system A modulated signal or spread spectrum communication system B modulated signal.

With spread spectrum communication system B, on the other hand, each symbol is spread with a different spreading ratio from spread spectrum system A (twice the spreading ratio in the case of this embodiment) before being transmitted. The signals formed by these spread spectrum systems A and B comprising different spreading ratios are then multiplexed in the same frequency band and transmitted. Here, as the spread spectrum system B spreading ratio is twice that of spread spectrum system A, one spread spectrum communication system B symbol is multiplexed for two spread spectrum communication system A symbols.

Figure 54:
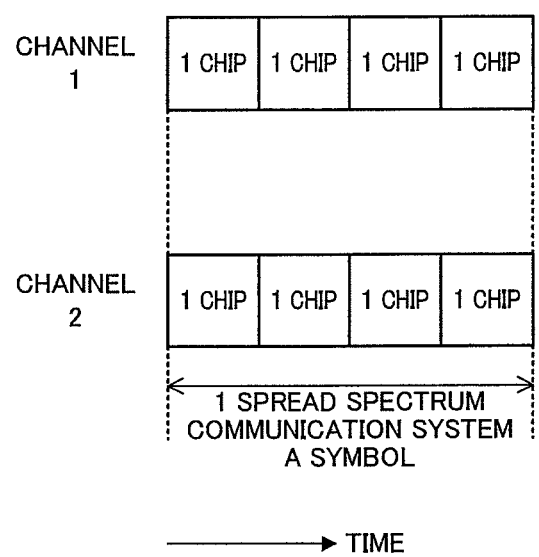
FIG. 54 is a drawing showing the symbol configuration of spread spectrum communication method A according to Embodiment 13.
Figure 55:
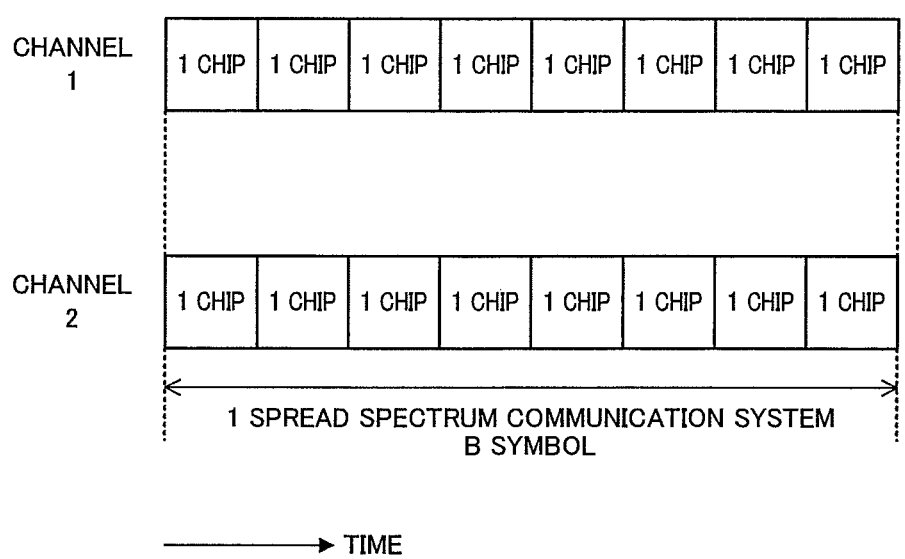
FIG. 55 is a drawing showing the symbol configuration of spread spectrum communication method B according to Embodiment 13.

In this embodiment, one symbol is spread over four chips by spread spectrum system A as shown in FIG. 54, and one symbol is spread over eight chips by spread spectrum system B as shown in FIG. 55. Also, in spread spectrum systems A and B, spread modulated signals for a plurality of channels (channels 1 and 2) are formed by using spreading codes with a correlation value of almost 0.

Figure 56:
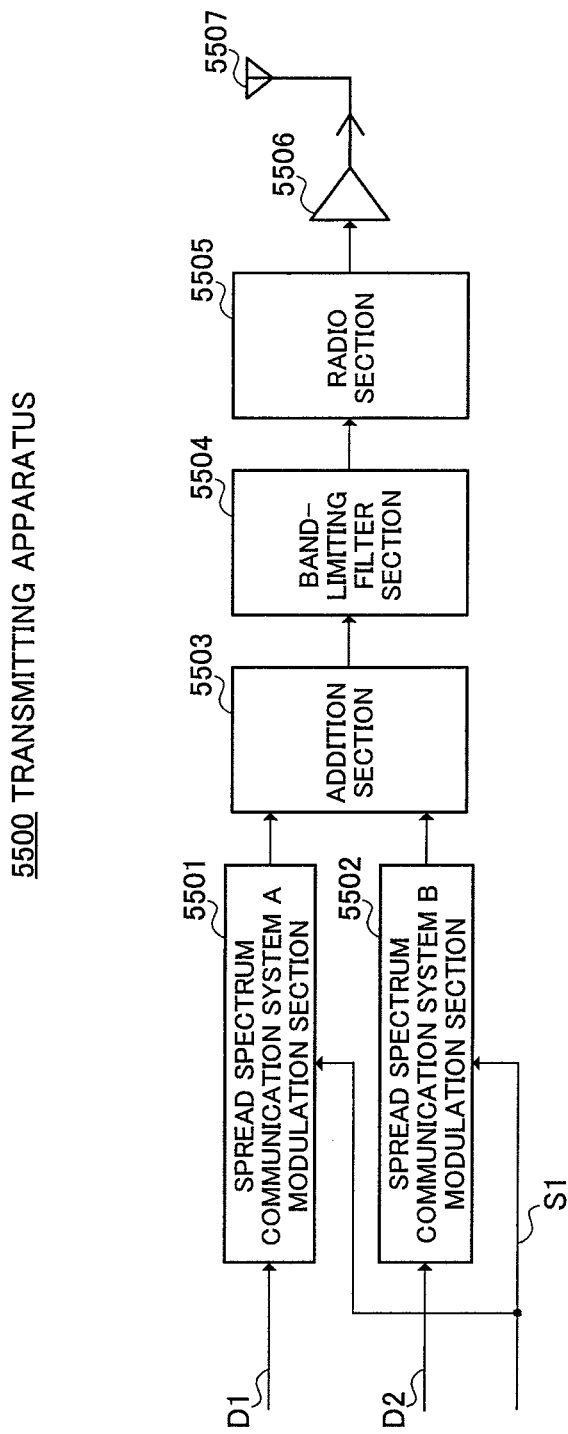
FIG. 56 is a block diagram showing the configuration of a transmitting apparatus according to Embodiment 13.

The configuration of a transmitting apparatus that multiplexes and transmits spread modulated signals with different spreading ratios in this way is shown in FIG. 56. In transmitting apparatus 5500, a first transmit digital signal D1 is input to a spread spectrum communication system A modulation section 5501, and a second transmit digital signal D2 is input to a spread spectrum communication system B modulation section 5502. In addition, a frame configuration signal S1, comprising frame information for forming frames such as shown in FIG. 53, is input to spread spectrum communication system A modulation section 5501 and spread spectrum communication system B modulation section 5502.

Spread spectrum communication system A modulation section 5501 forms a spread spectrum communication system A quadrature baseband signal by executing modulation such as QPSK or 16QAM, for example, on first transmit digital signal D1, and then performing spreading processing of one symbol over four chips, as described above. On the other hand, spread spectrum communication system B modulation section 5502 forms a spread spectrum communication system B quadrature baseband signal by executing modulation such as QPSK or 16QAM, for example, on second transmit digital signal D2, and then performing spreading processing of one symbol over eight chips.

Spread spectrum communication system A modulation section 5501 and spread spectrum communication system B modulation section 5502 send the signals that have undergone spreading processing to an addition section 5503. In spread spectrum communication system A modulation section 5501, control symbols are added at the head of a frame as shown in FIG. 53 in accordance with frame configuration signal S1. Here, a case is described in which control symbols are added by spread spectrum communication system A modulation section 5501, but control symbols may also be added at a predetermined position in a frame by spread spectrum communication system B modulation section 5502.

Addition section 5503 multiplexes the two input modulated spread signals with different spreading ratios and sends the signal resulting from this multiplexing to a band-limiting filter 5504. A multiplex signal band-limited by band-limiting filter 5504 is subjected to predetermined radio processing by a radio section 5505, and is then transmitted from an antenna 5507 via an amplifier 5506.

Figure 57:
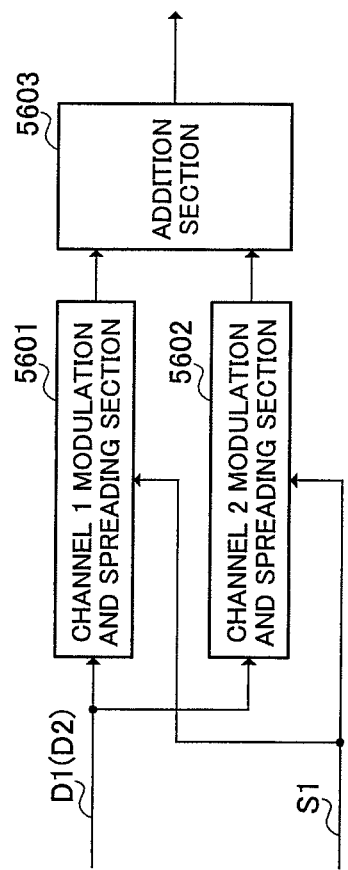
FIG. 57 is a block diagram showing the configuration of the spread spectrum communication method modulation section of FIG. 56.

Spread spectrum communication system A modulation section 5501 and spread spectrum communication system B modulation section 5502 are configured as shown in FIG. 57. As spread spectrum communication system A modulation section 5501 and spread spectrum communication system B modulation section 5502 have virtually identical configurations, except for having different spreading ratios, the configuration of spread spectrum communication system A modulation section 5501 will be described here.

In spread spectrum communication system A modulation section 5501, transmit digital signal D1 is input to a channel 1 modulation and spreading section 5601 and channel 2 modulation and spreading section 5602. Channel 1 modulation and spreading section 5601 executes modulation such as QPSK or 16QAM, for example, on transmit digital signal D1, and then spreads one symbol over four chips by executing spreading processing. Similarly, channel 2 modulation and spreading section 5602 executes modulation such as QPSK or 16QAM, for example, on transmit digital signal D1, and then spreads one symbol over four chips by executing spreading processing using a spreading code with a correlation value of almost 0 with respect to channel 1 modulation and spreading section 5601.

Channel 1 modulation and spreading sections 5601 and 5602 add control symbols at the head of a frame in accordance with frame configuration signal S1. The signal obtained by channel 1 modulation and spreading section 5601 and the signal obtained by channel 2 modulation and spreading section 5602 are multiplexed by an addition section 5603.

Thus, a signal for a plurality of channels, code division multiplexed using mutually orthogonal spreading codes with the same spreading ratio, is output from spread spectrum communication system A modulation section 5501. Spread spectrum communication system B modulation section 5502 performs almost the same kind of processing as channel 1 modulation and spreading section 5601, except for using a spreading code with twice the spreading ratio of that of channel 1 modulation and spreading section 5601 and not adding control symbols, and forms a code division multiplexed signal for a plurality of channels.

Figure 58:
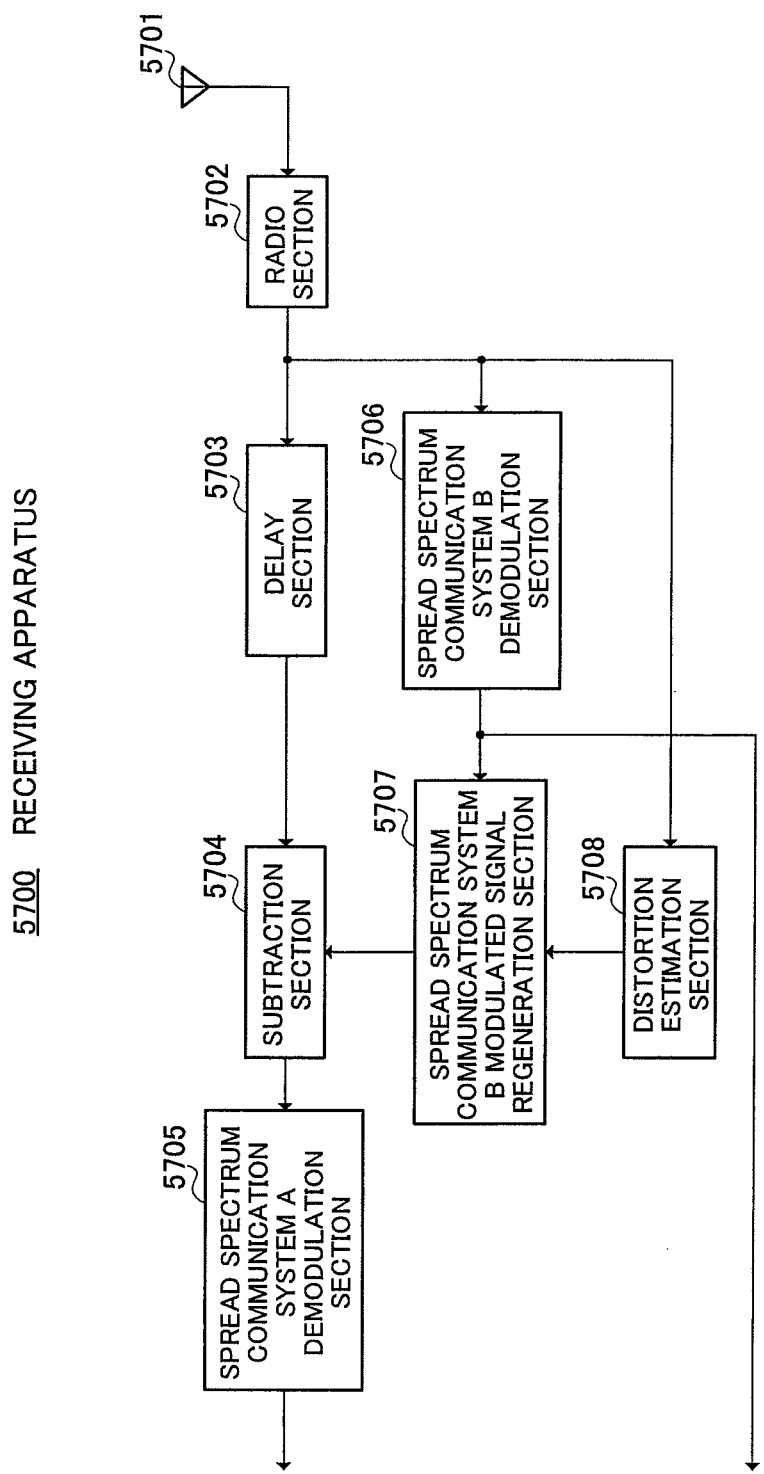
FIG. 58 is a block diagram showing the configuration of a receiving apparatus according to Embodiment 13.

FIG. 58 shows the configuration of a receiving apparatus 5700 according to this embodiment that receives and demodulates a signal transmitted by transmitting apparatus 5500. In receiving apparatus 5700, predetermined radio processing is performed by a radio section 5702 on a received signal received by an antenna 5701. Following radio processing, the signal is sent to a subtraction section 5704 via a delay section 5703, and is also sent to a spread spectrum communication system B demodulation section 5706 and distortion estimation section 5708.

Spread spectrum communication system B demodulation section 5706 obtains a pre-spreading digital signal by performing the reverse of the processing of transmitting-side spread spectrum communication system B modulation section 5502 on the input signal. This spread spectrum communication system B demodulated signal is output directly as a demodulated signal and is also sent to a spread spectrum communication system B modulated signal regeneration section 5707.

Spread spectrum communication system B modulated signal regeneration section 5707 forms a spread spectrum communication system B replica signal by performing spreading modulation processing by means of spread spectrum communication system B once again on the once demodulated spread spectrum communication system B signal.

At this time, spread spectrum communication system B modulated signal regeneration section 5707 forms a replica signal that includes the amount of distortion in transmission by forming a replica signal using transmission path distortion information estimated by distortion estimation section 5708 using control symbols. Spread spectrum communication system B modulated signal regeneration section 5707 actually forms a replica signal by performing respreading on the once demodulated spread spectrum communication system B signal, and remodulating the signal using transmission path distortion information. Spread spectrum communication system B modulated signal regeneration section 5707 sends the formed replica signal to subtraction section 5704.

In subtraction section 5704, the spread spectrum communication system B modulated signal replica signal obtained by spread spectrum communication system B modulated signal regeneration section 5707 is subtracted from the spread spectrum communication system A modulated signal and spread spectrum communication system B modulated signal multiplex signal delayed by delay section 5703 by the amount of time for forming the replica signal, by which means only the spread modulated signal spread and modulated by means of spread spectrum communication system A is extracted.

The extracted spread spectrum communication system A spread modulated signal is made a pre-spreading digital signal by being demodulated by a spread spectrum communication system A demodulation section 5705.

Thus, according to receiving apparatus 5700, even when spread signals spread using spread spectrum systems with different spreading ratios are transmitted multiplexed in the same frequency band, these signals spread by means of spread spectrum systems with different spreading ratios can be separated, and individually demodulated.

Figure 59:
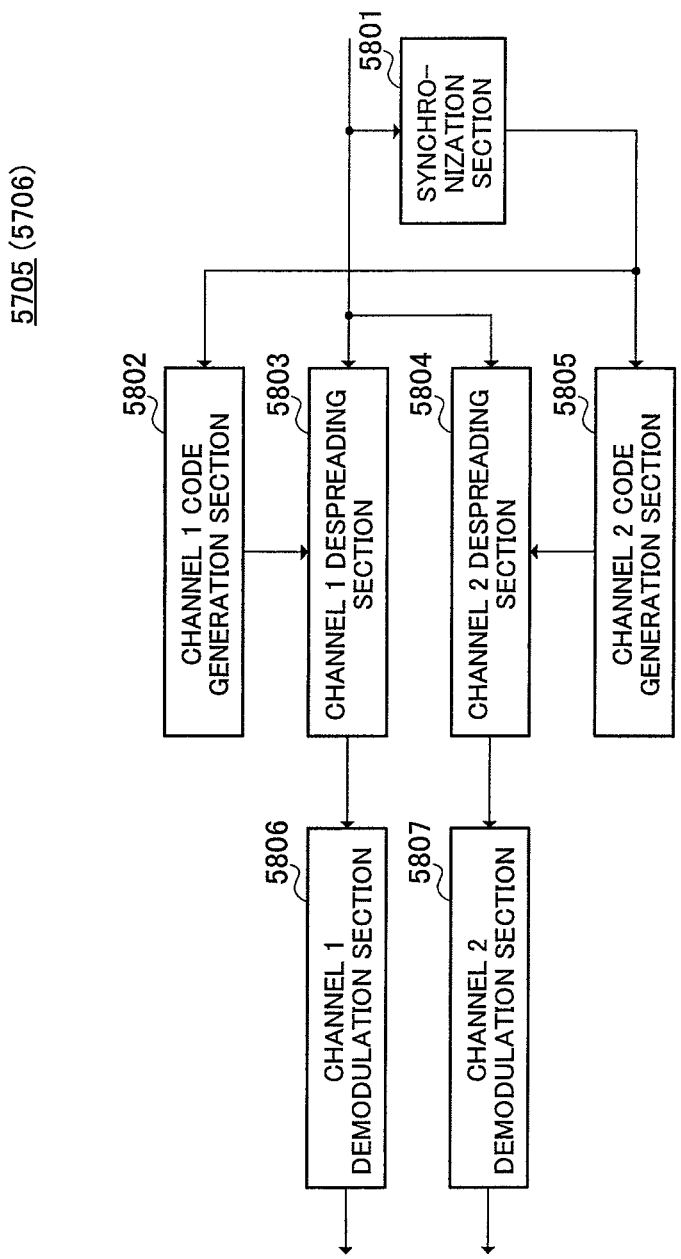
FIG. 59 is a block diagram showing a configuration of the spread spectrum communication demodulation section of FIG. 58.

Spread spectrum communication system A demodulation section 5705 and spread spectrum communication system B demodulation section 5706 may be configured as shown in FIG. 59, for example. Here, the case of spread spectrum communication system A demodulation section 5705 will be described. In spread spectrum communication system A demodulation section 5705, a signal spread and modulated by spread spectrum system A extracted by subtraction section 5704 is input to a synchronization section 5801, channel 1 despreading section 5803, and channel 2 despreading section 5804.

Synchronization section 5801 detects despreading timing based on a synchronization signal added to the input signal, and sends the detected despreading timing signal to a channel 1 code generation section 5802 and channel 2 code generation section 5805. Channel 1 code generation section 5802 and channel 2 code generation section 5805 generate a spreading code used for channel 1 and a spreading code used for channel 2, respectively, at timing in accordance with the despreading timing signal, and send these spreading codes to channel 1 despreading section 5803 and channel 2 despreading section 5804. The post-despreading signals obtained by channel 1 despreading section 5803 and channel 2 despreading section 5804 are demodulated by a channel 1 demodulation section 5806 and channel 2 demodulation section 5807, respectively, and as a result become channel 1 and channel 2 digital signals.

Figure 60:
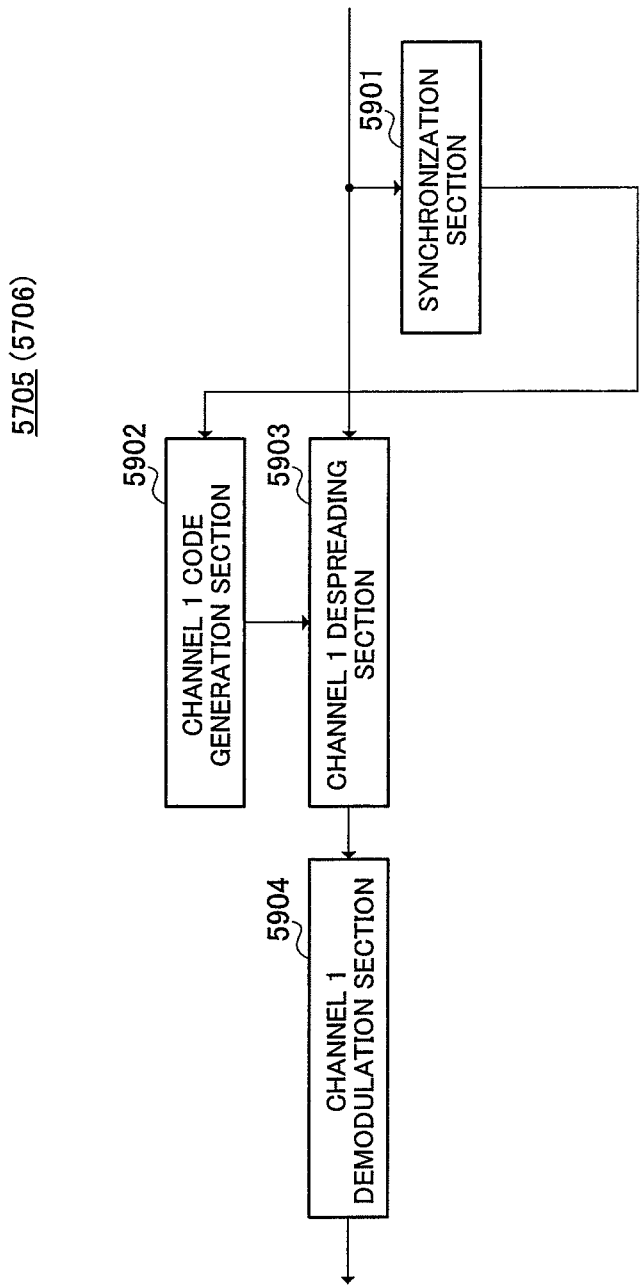
FIG. 60 is a block diagram showing another sample configuration of the spread spectrum communication demodulation section of FIG. 58.

In FIG. 59 a configuration is illustrated in which spread modulated signals for two channels are demodulated, but it goes without saying that the number of channels is not limited to this, and any number of channels can be selected. For example, FIG. 60 shows a sample configuration of spread spectrum communication system A demodulation section 5705 and spread spectrum communication system B demodulation section 5706 when a spread modulated signal for one channel is demodulated.

The case of spread spectrum communication system A demodulation section 5705 will be described here. In spread spectrum communication system A demodulation section 5705, a signal spread and modulated by spread spectrum system A extracted by subtraction section 5704 is input to a synchronization section 5901 and a channel 1 despreading section 5903.

Synchronization section 5901 detects despreading timing based on a synchronization signal added to the input signal, and sends the detected despreading timing signal to a channel 1 code generation section 5902. Channel 1 code generation section 5902 generates a spreading code used for channel 1 at timing in accordance with the despreading timing signal, and sends this spreading code to a channel 1 despreading section 5903. The post-despreading signal obtained by channel 1 despreading section 5903 is demodulated by a channel 1 demodulation section 5904, and as a result becomes a channel 1 digital signal.

Figure 61:
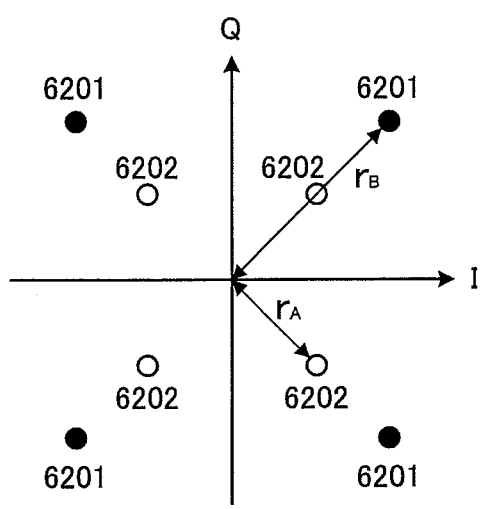
FIG. 61 is a drawing showing signal point arrangement in the I-Q plane when transmission power is changed every multiplexed signal.

In addition to such a configuration, in the case of this embodiment spread spectrum communication system B transmission power is made greater than spread spectrum communication system A transmission power. Specifically, in the case illustrated by the I-Q plane in FIG. 61 (here, a case in which QPSK modulation processing is performed will be described), distance $r_B$ of a spread spectrum communication system B signal point 6201 from the origin is greater than distance $r_A$ of a spread spectrum communication system A signal point 6202 from the origin—that is, $r_B > r_A$. That is to say, in this embodiment, spread spectrum communication system B transmission power relevant to replica signal formation is made greater than spread spectrum communication system A transmission power.

By this means, a spread spectrum communication system B replica signal formed by spread spectrum communication system B demodulation section 5706 and spread spectrum communication system B modulated signal regeneration section 5707 can be made a much more accurate signal.

This will now be explained in detail. In receiving apparatus 5700 in FIG. 58, the signal input to spread spectrum communication system B demodulation section 5706 is a received quadrature baseband signal in which signals modulated and spread by means of spread spectrum communication system A and spread spectrum communication system B respectively are multiplexed.

Therefore, when despreading processing is performed in spread spectrum communication system B demodulation section 5706 using a spreading code corresponding to spread spectrum communication system B, if the cross-correlation between the spreading code corresponding to spread spectrum communication system B and the spreading code corresponding to spread spectrum communication system A is high, it is not possible for only a signal spread by means of spread spectrum communication system B to be separated with a high degree of precision.

To prevent this problem, in this embodiment spread spectrum communication system B signal power is made greater than spread spectrum communication system A signal power, thereby improving despreading precision by lowering the correlation between a spread spectrum communication system B signal and a spread spectrum communication system A signal, and enabling spread spectrum communication system B demodulation section 5706 to extract only a signal spread by means of spread spectrum system B with a high degree of precision. By this means, a highly accurate replica signal can be formed by spread spectrum communication system B modulated signal regeneration section 5707, enabling a signal spread by means of spread spectrum communication system A also to be extracted with a high degree of precision by subtraction section 5704.

Also, in this embodiment, when spread signals with different spreading ratios are separated from a received multiplex signal in receiving apparatus 5700, a spread spectrum communication system B signal, which has a large spreading ratio, is first separated by despreading. As a spread signal with a large spreading ratio has greater spreading gain, separation precision is higher for the spread signal separated first (the spread spectrum communication system B signal). As a result, replica signal precision is improved, and the separation precision of the spread signal with a small spreading ratio extracted next (the spread spectrum communication system A signal) is also improved. Consequently, all spread signals can be separated and demodulated with good precision.

According to the above configuration, by transmitting modulated signals of spread spectrum communication systems with different spreading ratios multiplexed in the same frequency band on the transmitting side, and on the receiving side, forming a replica signal by despreading and then respreading one or other of the multiplexed signals, and separating and extracting multiplexed signals by subtracting the replica signal from the multiplex signal, it is possible to demodulate both multiplexed signals. As a result, the data transmission speed can be improved.

The method described in this embodiment whereby, of the multiplexed signals, the transmission power of a signal for which a replica signal for subtraction is formed is made greater than the transmission power of other multiplexed signals, is also effective when applied to other above-described embodiments and embodiments described later herein.

For example, a case will here be described in which this method is applied when an information modulated signal and spread spectrum communication system modulated signal are multiplexed in the same frequency band, as described in Embodiment 3. Here, signal points of an information modulated signal are denoted by reference numeral 6202 in FIG. 61, signal points of a spread spectrum communication system modulated signal by reference numeral 6201, the distance between a spread spectrum communication system signal point 6201 and the origin by $r_B$, and the distance between a spread spectrum communication system signal point 6202 and the origin by $r_A$. It is here assumed that $r_B > r_A$. That is to say, spread spectrum communication system transmission power relevant to replica signal formation is made greater than information modulation transmission power.

By this means, the correlation with an information signal, which represents interference with respect to a spread spectrum signal, is made small, and consequently the reception characteristics of an information signal obtained from spread spectrum demodulation section 1803 in FIG. 19 improve. As a result, the despreading precision of spread spectrum demodulation section 1803 can be improved, making it possible to extract only a spread spectrum processed signal with a high degree of precision. A highly accurate replica signal can therefore be formed by spread spectrum modulated signal regeneration section 1805, enabling an information modulated signal also to be extracted with a high degree of precision by the subtraction section.

In addition, the method described in this embodiment whereby, when signals generated using spreading codes with different spreading ratios are multiplexed in the same frequency band, signals are separated and demodulated in order from the signal with the largest spreading ratio, also enables a similar effect to be obtained when applied to embodiments described later herein.

In this embodiment, a receiving apparatus 5700 has been described that is provided with both a spread spectrum communication system A demodulation section 5705 that demodulates a spread spectrum communication system A signal and a spread spectrum communication system B demodulation section 5706 that demodulates a spread spectrum communication system B signal, as shown in FIG. 59, but it is not absolutely essential for demodulation sections that demodulate all multiplexed signals to be provided. For example, if only spread spectrum communication system A demodulation section 5705 is provided, a dedicated receiving apparatus can be implemented that receives and demodulates only a spread spectrum communication system A signal, and if only spread spectrum communication system B demodulation section 5706 is provided, a dedicated receiving apparatus can be implemented that receives and demodulates only a spread spectrum communication system B signal.

In this embodiment, a case has been described in which signals of two channels are transmitted and received in the case of both spread spectrum communication system A and spread spectrum communication system B, but it goes without saying that any number of channels can be selected. For example, three or more channels may be multiplexed for spread spectrum communication system A and spread spectrum communication system B respectively.

In this embodiment, the description has referred to multiplexing of two systems, spread spectrum communication system A and spread spectrum communication system B, but this is not a limitation, and multiplexing may also be performed of three or more spread spectrum communication systems with different spreading ratios. Also, modulated signals that are not spread at the same time—that is to say, that are not spread spectrum communication system signals—may be multiplexed at the same time.

Embodiment 14

In this embodiment there are proposed a transmitting apparatus that multiplexes in the same frequency band and transmits signals of a plurality of OFDM-spreading modulation systems formed using spreading codes with different spreading ratios, and a receiving apparatus that receives and demodulates that multiplex transmit signal. In this embodiment so-called frequency domain spreading is performed, whereby chips spread by a spreading code are spread across subcarriers in the frequency axis direction.

Figure 62:
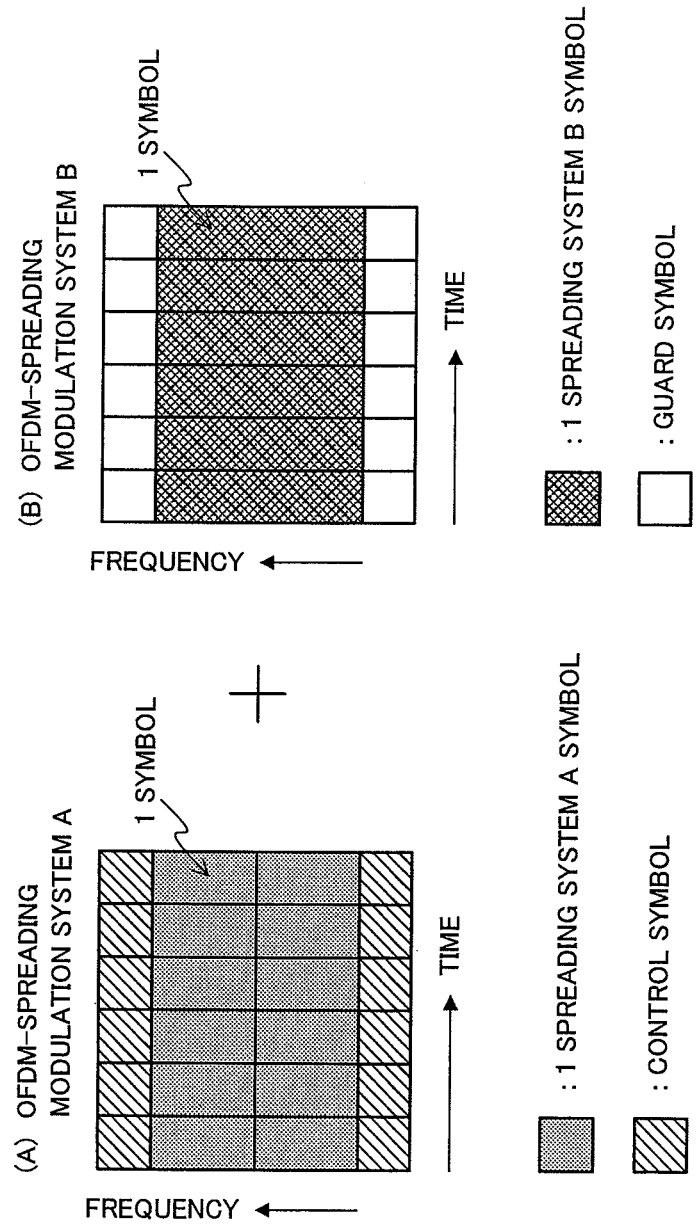
FIG. 62 is a drawing showing sample frame configurations of a multiplex transmit signal whose constituent signals are multiplexed in the same frequency band according to Embodiment 14.

FIG. 62 shows sample frame configurations on the frequency-time axes according to this embodiment. In FIG. 62, one box is equivalent to one symbol. As can be seen from the figure, one symbol is spread in the frequency axis direction.

In this embodiment, the OFDM-spreading modulation system A signal shown in FIG. 62 (A) and the OFDM-spreading modulation system B signal shown in FIG. 62 (B) are transmitted multiplexed in the same frequency band. Comparing OFDM-spreading modulation system A shown in FIG. 62 (A) with OFDM-spreading modulation system B shown in FIG. 62 (B), the OFDM-spreading modulation system B spreading ratio is greater than the OFDM-spreading modulation system A spreading ratio. As a result, twice as many OFDM-spreading modulation system A symbols as OFDM-spreading modulation system B symbols are transmitted in the same period.

In an OFDM-spreading modulation system A frame, control symbols are arranged in the time direction, and guard symbols (that is, sections where no signal is located) are placed at positions corresponding to control symbols in an OFDM-spreading modulation system B frame. By this means, control symbols, which are the basis for transmission path estimation and synchronization processing, can be extracted easily and with a high degree of precision on the receiving side.

Figure 63:
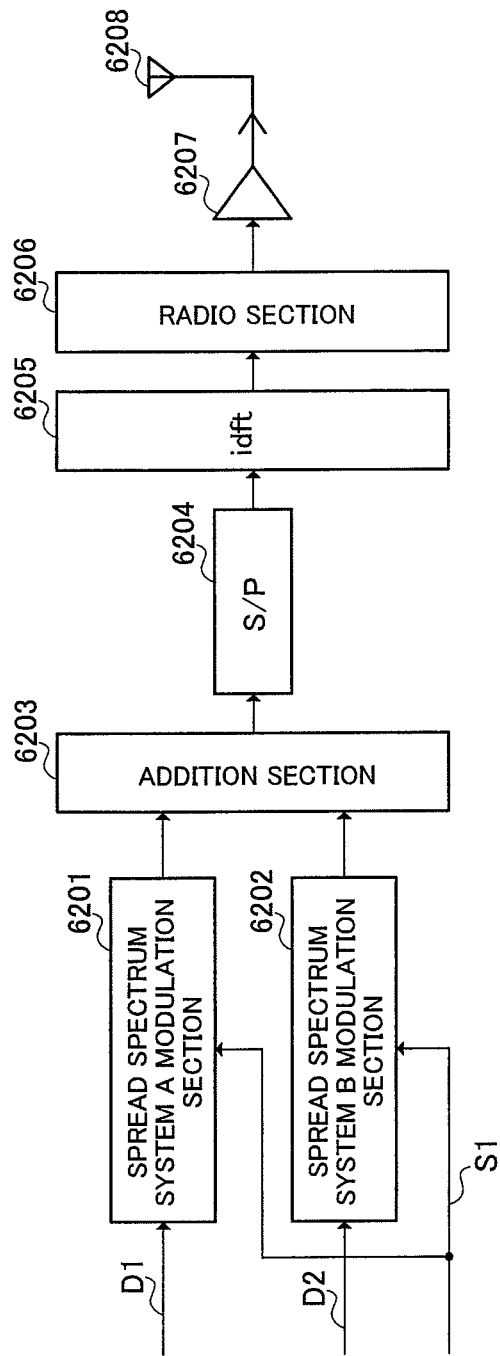
FIG. 63 is a block diagram showing the configuration of a transmitting apparatus of Embodiment 14.

The configuration of a transmitting apparatus that multiplexes and transmits signals of a plurality of OFDM-spreading modulation systems formed using spreading codes with different spreading ratios in this way is shown in FIG. 63. In transmitting apparatus 6200, a first transmit digital signal D1 is input to a spread spectrum communication system A modulation section 6201, and a second transmit digital signal D2 is input to a spread spectrum communication system B modulation section 6202. In addition, a frame configuration signal S1, comprising frame information for forming frames such as shown in FIG. 62, is input to spread spectrum communication system A modulation section 6201 and spread spectrum communication system B modulation section 6202.

Spread spectrum communication system A modulation section 6201 forms a spread spectrum communication system A quadrature baseband signal by executing modulation such as QPSK or 16QAM, for example, on first transmit digital signal D1, and then performing spreading processing of one symbol over four chips. On the other hand, spread spectrum communication system B modulation section 6202 forms a spread spectrum communication system B quadrature baseband signal by executing modulation such as QPSK or 16QAM, for example, on second transmit digital signal D2, and then performing spreading processing of one symbol over eight chips. Spread spectrum communication system A modulation section 6201 and spread spectrum communication system B modulation section 6202 send the signals that have undergone spreading processing to an addition section 6203.

As shown in FIG. 62, in accordance with frame configuration signal S1, in spread spectrum communication system A modulation section 6201 control symbols are added at a predetermined position in a frame, and in spread spectrum communication system B modulation section 6202 guard symbols (null signals) are placed at positions corresponding to control symbols. Here, a case is described in which control symbols are added by spread spectrum communication system A modulation section 6201, but control symbols may also be added at a predetermined position in a frame by spread spectrum communication system B modulation section 6202.

Addition section 6203 multiplexes the two input modulated spread signals with different spreading ratios. The multiplexed signal undergoes serial/parallel conversion by a serial/parallel conversion section (S/P) 6204, followed by inverse discrete Fourier transform processing by an inverse discrete Fourier transform section (idft) 6205. By this means, post-spreading chips are spread across a plurality of subcarriers in the frequency direction, and a multiplex transmit signal is formed in which an OFDM-spreading modulation system A signal and OFDM-spreading modulation system B signal with the frame configurations shown in FIG. 62 are multiplexed in the same frequency band. This multiplex transmit signal is subjected to predetermined radio processing by a radio section 6206, and is then transmitted from an antenna 6208 via an amplifier 6207.

Figure 64:
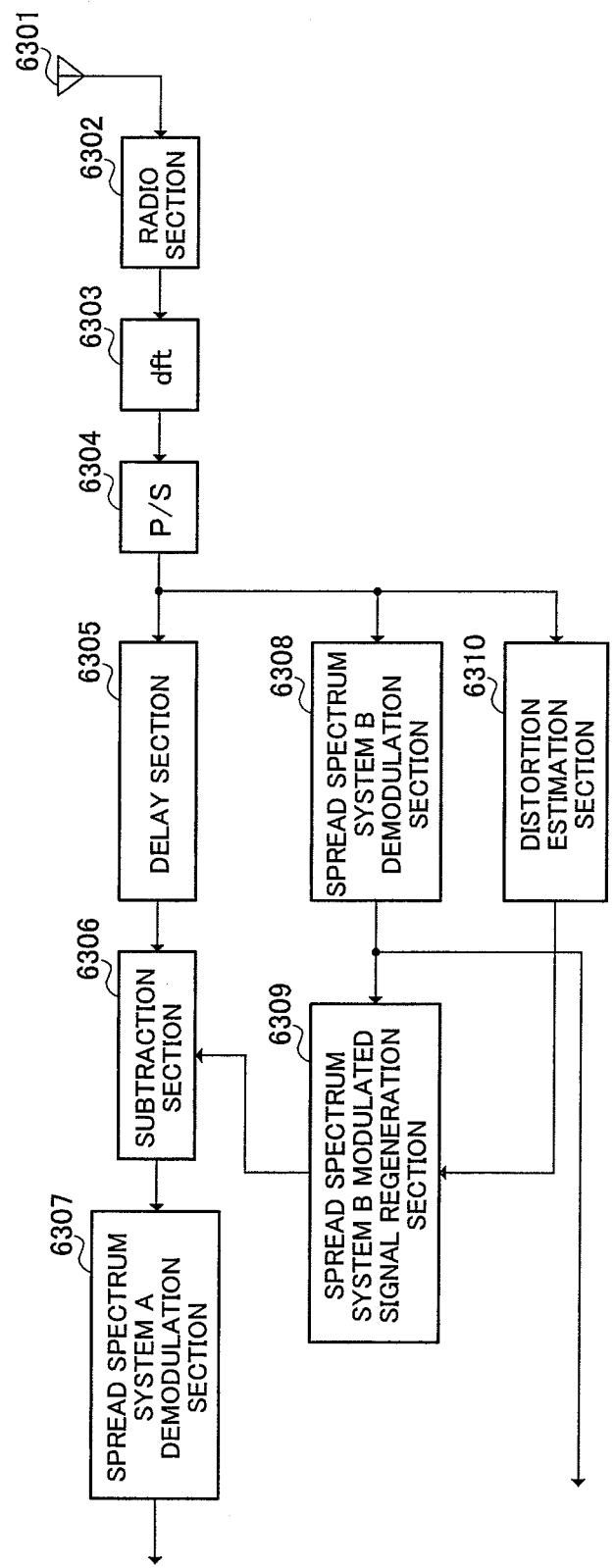
FIG. 64 is a block diagram showing the configuration of a receiving apparatus of Embodiment 14.

FIG. 64 shows the configuration of a receiving apparatus 6300 according to this embodiment that receives and demodulates a signal transmitted by transmitting apparatus 6200. In receiving apparatus 6300, predetermined radio processing is performed by a radio section 6302 on a received signal received by an antenna 6301. Following radio processing, the signal undergoes Fourier transform processing by a discrete Fourier transform section (dft) 6303 and parallel/serial conversion by a parallel/serial conversion section (P/S) 6304, whereby chips spread in the frequency axis direction are restored to the original code division multiplex signal.

The code division multiplex signal is sent to a subtraction section 6306 via a delay section 6305, and is also sent to a spread spectrum system B demodulation section 6308 and distortion estimation section 6310.

Spread spectrum system B demodulation section 6308 obtains a pre-spreading digital signal by performing the reverse of the processing of transmitting-side spread spectrum system B modulation section 6202 on the input signal. This spread spectrum system B demodulated signal is output directly as a demodulated signal and is also sent to a spread spectrum system B modulated signal regeneration section 6309.

Spread spectrum system B modulated signal regeneration section 6309 forms a spread spectrum system B replica signal by performing spreading modulation processing by means of spread spectrum system B once again on the once demodulated spread spectrum communication system B signal. At this time, spread spectrum system B modulated signal regeneration section 6309 forms a replica signal that includes the amount of distortion in transmission by forming a replica signal using transmission path distortion information estimated by distortion estimation section 6310 using control symbols. Spread spectrum system B modulated signal regeneration section 6309 actually forms a replica signal by performing respreading on the once demodulated spread spectrum system B signal, and remodulating the signal using transmission path distortion information. Spread spectrum system B modulated signal regeneration section 6309 sends the formed replica signal to subtraction section 6306.

In subtraction section 6306, the spread spectrum system B modulated signal replica signal obtained by spread spectrum system B modulated signal regeneration section 6309 is subtracted from the spread spectrum system A modulated signal and spread spectrum system B modulated signal multiplex signal delayed by delay section 6305 by the amount of time for forming the replica signal, by which means only the spread modulated signal spread and modulated by means of spread spectrum system A is extracted.

The extracted spread spectrum system A spread modulated signal is made a pre-spreading digital signal by being demodulated by a spread spectrum system A demodulation section 6307.

Thus, according to receiving apparatus 6300, even when signals of a plurality of OFDM-spreading modulation systems formed using spreading codes with different spreading ratios are transmitted multiplexed in the same frequency band, these OFDM-spreading modulation signals can be separated and individually demodulated.

Signals of a plurality of channels may be code division multiplexed using different spreading codes by configuring spread spectrum communication modulation system A modulation section 6201 and spread spectrum communication modulation system B modulation section 6202 as shown in FIG. 57. In this case, the configurations of spread spectrum system A demodulation section 6307 and spread spectrum system B demodulation section 6308 of receiving apparatus 6300 should be made configurations that enable despreading and demodulation of spread signals of a plurality of channels.

In addition to such a configuration, in the case of this embodiment, as in Embodiment 13, spread spectrum system B transmission power is made greater than spread spectrum system A transmission power. By this means, when despreading processing is performed by spread spectrum system B demodulation section 6308 using a spreading code corresponding to spread spectrum system B, the correlation between a spread signal corresponding to spread spectrum system B and a spread signal corresponding to spread signal A can be made small, enabling only a signal spread by means of spread spectrum system B to be separated with a high degree of precision.

As a result, it possible to extract only a signal spread by means of spread spectrum system B in spread spectrum system B demodulation section 6308 with a high degree of precision, enabling a highly accurate replica signal to be formed by spread spectrum system B modulated signal regeneration section 6309, and so making it possible for a signal spread by means of spread spectrum system A also to be extracted with a high degree of precision by subtraction section 6306.

Also, in this embodiment, when OFDM-spreading modulated signals with different spreading ratios are separated from a received multiplex signal in receiving apparatus 6300, an OFDM-spreading modulated signal with a large spreading ratio is first separated by despreading. As an OFDM-spreading modulated signal with a large spreading ratio has greater spreading gain, separation precision of the OFDM-spreading modulated signal separated first (the OFDM-spreading modulated signal using spread spectrum communication system B) can be improved. As a result, replica signal precision is improved, and the separation precision of the OFDM-spreading modulated signal with a small spreading ratio extracted next (the OFDM-spreading modulated signal using spread spectrum communication system A) is also improved. Consequently, all OFDM-spreading modulated signals can be separated and demodulated with good precision.

According to the above configuration, by multiplexing and transmitting signals of a plurality or OFDM-spreading modulation systems formed using spreading codes with different spreading ratios on the transmitting side, and on the receiving side, forming a replica signal by despreading and then respreading one or other of the multiplexed signals, and separating and extracting multiplexed signals by subtracting the replica signal from the multiplex signal, it is possible to demodulate both multiplexed signals. As a result, the data transmission speed can be improved.

In this embodiment, a method has been described whereby signals of OFDM-spreading modulation systems with different spreading ratios are multiplexed in all frequency-time axis frames excluding control symbols, but this is not a limitation, and it is also possible, for example, for multiplexing to be performed only in some specific frequency-time axis frames. That is to say, it is possible for an independent OFDM signal or an independent OFDM-spreading modulation system signal with which a signal with a different spreading ratio is not multiplexed to be used in other frames. This also applies in the case of Embodiment 15 described below.

In this embodiment, a receiving apparatus has been described that is provided with both a spread spectrum system A demodulation section 6307 that demodulates a spread spectrum system A signal and a spread spectrum system B demodulation section 6308 that demodulates a spread spectrum system B signal, as shown in FIG. 64, but it is not absolutely essential for demodulation sections that demodulate all multiplexed signals to be provided. For example, if only spread spectrum system A demodulation section 6307 is provided, a dedicated receiving apparatus can be implemented that receives and demodulates only an OFDM-spreading modulation system A signal, and if only spread spectrum system B demodulation section 6308 is provided, a dedicated receiving apparatus can be implemented that receives and demodulates only an OFDM-spreading modulation system B signal.

In this embodiment, the description has referred to multiplexing of two systems, OFDM-spreading modulation system A and OFDM-spreading modulation system B, but this is not a limitation, and if, for example, three spreading codes with different spreading ratios are provided and three OFDM-spreading modulation system signals are formed, and these are multiplexed in the same frequency band, it will still be possible to separate and demodulate signals transmitted by means of all the OFDM-spreading modulation systems with the above-described method. This also applies in the case of Embodiment 15 described below.

Embodiment 15

In above-described Embodiment 14 there were proposed a transmitting apparatus that multiplexes in the same frequency band and transmits signals of a plurality of OFDM-spreading modulation systems obtained by using spreading codes with different spreading ratios and spreading chips in the frequency axis direction, and a corresponding receiving apparatus, but in this embodiment, there are proposed a transmitting apparatus that multiplexes in the same frequency band and transmits signals of a plurality of OFDM-spreading modulation systems obtained by using spreading codes with different spreading ratios and spreading chips in the time axis direction (so-called time domain spreading), and a corresponding receiving apparatus.

Figure 65:
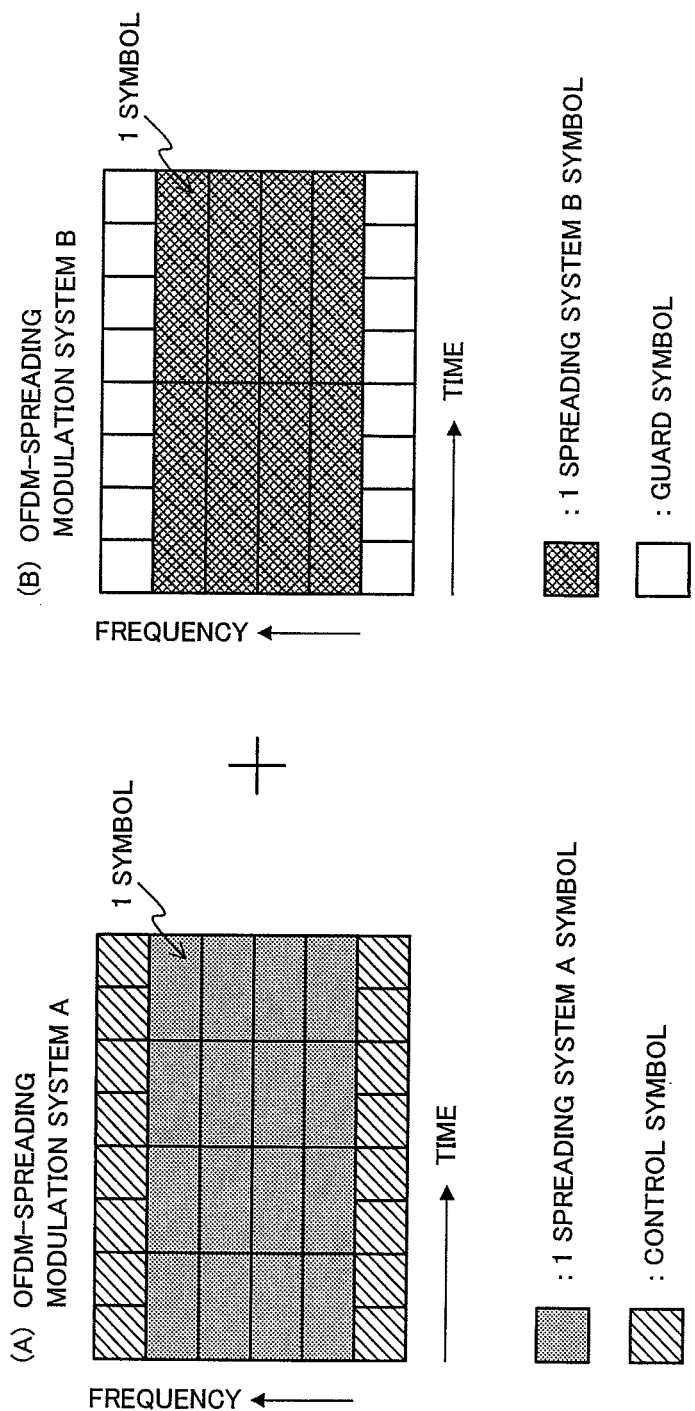
FIG. 65 is a drawing showing sample frame configurations of a multiplex transmit signal whose constituent signals are multiplexed in the same frequency band according to Embodiment 15.
Figure 66:
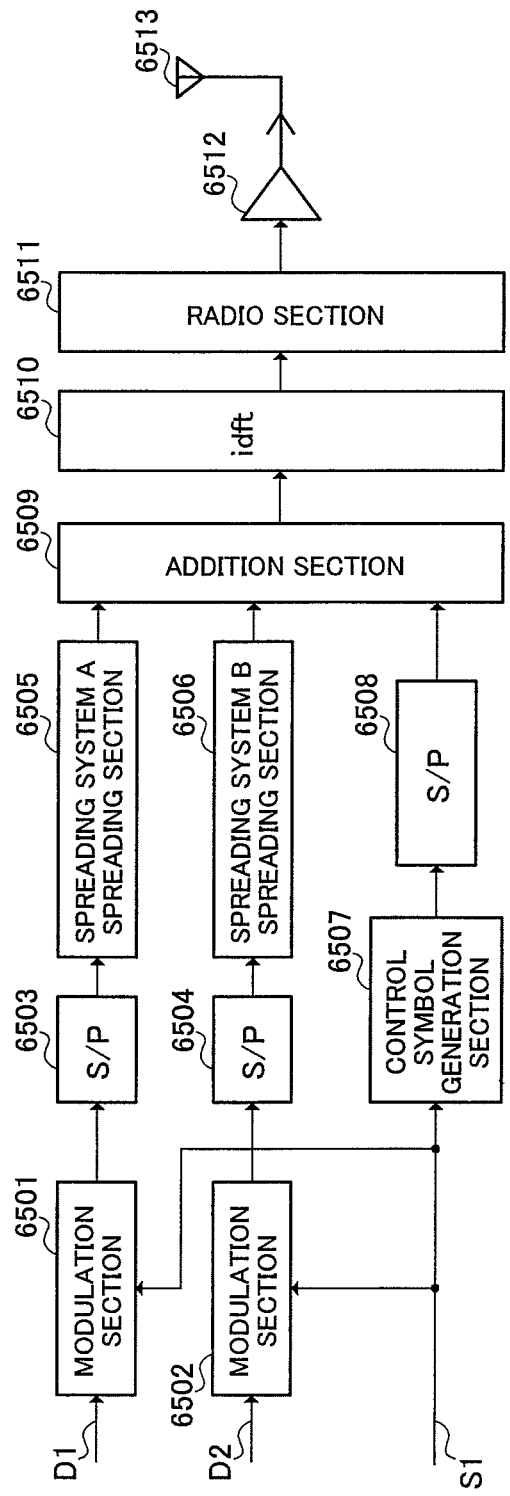
FIG. 66 is a block diagram showing the configuration of a transmitting apparatus of Embodiment 15.

FIG. 65 shows sample frame configurations on the frequency-time axes according to this embodiment. In FIG. 66, one box is equivalent to one symbol. As can be seen from the figure, one symbol is spread in the time axis direction.

In this embodiment, the OFDM-spreading modulation system A signal shown in FIG. 65 (A) and the OFDM-spreading modulation system B signal shown in FIG. 65 (B) are transmitted multiplexed in the same frequency band. Comparing OFDM-spreading modulation system A shown in FIG. 65 (A) with OFDM-spreading modulation system B signal in FIG. 65 (B), the OFDM-spreading modulation system B spreading ratio is greater than the OFDM-spreading modulation system A spreading ratio (in the case of this embodiment, twice as large). As a result, twice as many OFDM-spreading modulation system A symbols as OFDM-spreading modulation system B symbols are transmitted in the same period.

In an OFDM-spreading modulation system A frame, control symbols are arranged in the time direction, and guard symbols are placed at positions corresponding to control symbols in an OFDM-spreading modulation system B frame. By this means, control symbols, which are the basis for transmission path estimation and synchronization processing, can be extracted easily and with a high degree of precision on the receiving side.

The configuration of a transmitting apparatus that multiplexes and transmits signals of a plurality of OFDM-spreading modulation systems formed using spreading codes with different spreading ratios in this way will now be described using FIG. 66. In transmitting apparatus 6500, a first transmit digital signal D1 is input to a modulation section 6501, and a second transmit digital signal D2 is input to a modulation section 6502. In addition, a frame configuration signal S1, comprising frame information for forming frames such as shown in FIG. 65, is input to modulation section 6501 and modulation section 6502. Modulation sections 6501 and 6502 execute QPSK or 16QAM modulation processing on the input signals, and send the resulting signals to a spreading system A spreading section 6505 and spreading system B spreading section 6506 via serial/parallel conversion sections (S/Ps) 6503 and 6504 respectively.

Spreading system A spreading section 6505 spreads one input parallel signal symbol over, for example, four chips. On the other hand, spreading system B spreading section 6506 spreads one input parallel signal symbol over, for example, eight chips. Post-spreading parallel signals output from spreading system A spreading section 6505 and spreading system B spreading section 6506 are multiplexed by an addition section 6509.

Also, a control symbol generated by a control symbol generation section 6507 in accordance with frame configuration signal S1 is input to addition section 6509 via a serial/parallel conversion section (S/P) 6508, and this serial/parallel converted control symbol is multiplexed together with the parallel signals output from spreading system A spreading section 6505 and spreading system B spreading section 6506. The multiplexed signal undergoes inverse discrete Fourier transform processing by an inverse discrete Fourier transform section (idft) 6510.

By this means, post-spreading chips are spread in the time axis direction, and a multiplex transmit signal is formed in which an OFDM-spreading modulation system A signal and OFDM-spreading modulation system B signal with the frame configurations shown in FIG. 65 are multiplexed in the same frequency band. This multiplex transmit signal is subjected to predetermined radio processing by a radio section 6511, and is then transmitted from an antenna 6513 via an amplifier 6512.

Figure 67:
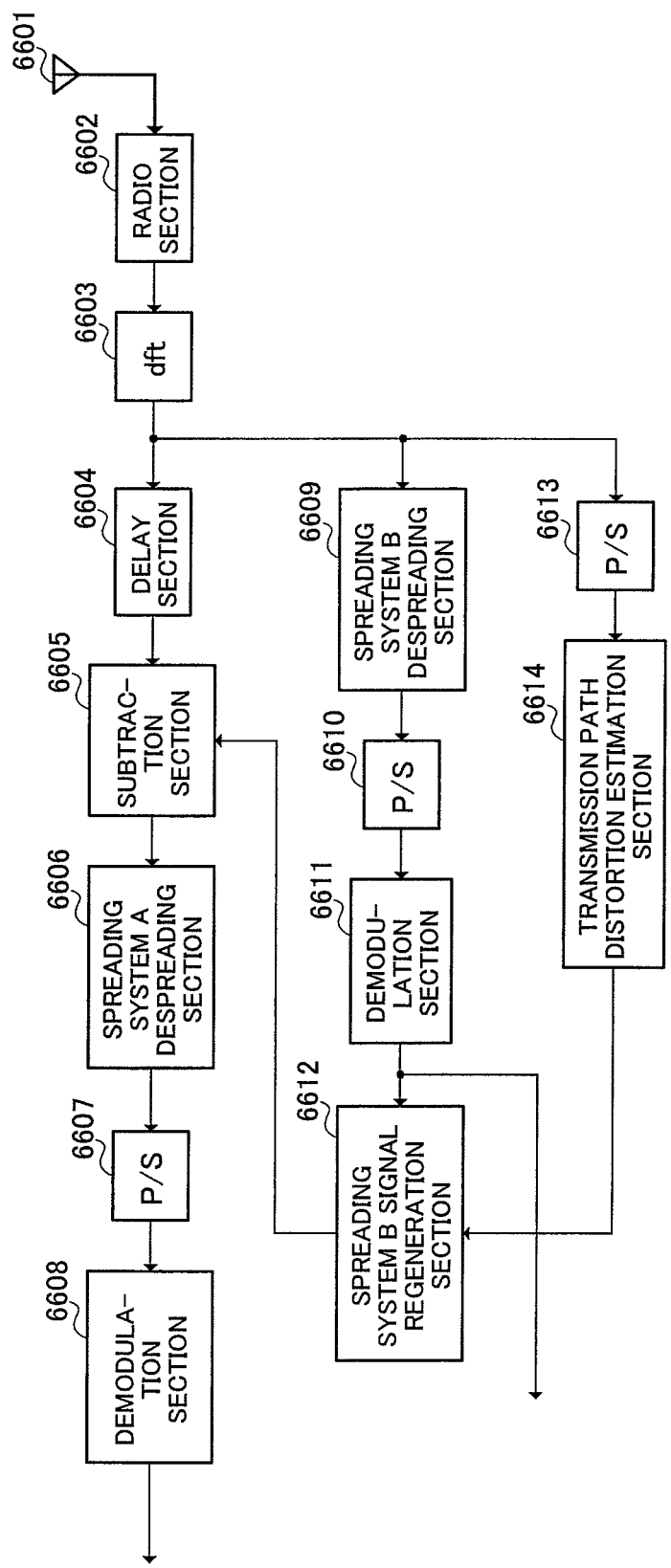
FIG. 67 is a block diagram showing the configuration of a receiving apparatus of Embodiment 16.

FIG. 67 shows the configuration of a receiving apparatus 6600 according to this embodiment that receives and demodulates a signal transmitted by transmitting apparatus 6500. In receiving apparatus 6600, predetermined radio processing is performed by a radio section 6602 on a received signal received by an antenna 6601. Following radio processing, the signal undergoes Fourier transform processing by a discrete Fourier transform section (dft) 6603 and is then input to a subtraction section 6605 via a delay section 6604, and is also input to a spreading system B despreading section 6609 and parallel/serial conversion section (P/S) 6613.

Spread spectrum system B despreading section 6609 performs the reverse of the processing of transmitting-side spread spectrum system B spreading section 6506 on the input signal. After despreading the signal undergoes parallel/serial conversion processing by a parallel/serial conversion section (P/S) 6610, is demodulated by a demodulation section 6611, and is then output directly as a demodulated signal and also input to a spreading system B signal regeneration section 6612. Meanwhile, the signal resulting from parallel/serial conversion by parallel/serial conversion section (P/S) 6613 is input to a transmission path distortion estimation section 6614. Transmission path distortion estimation section 6614 estimates transmission path distortion based on control symbols, and sends estimated transmission path distortion information to spreading system B signal regeneration section 6612. As the control symbols have not been subjected to spreading processing, they can be used by transmission path distortion estimation section 6614 without undergoing despreading processing.

Spread spectrum system B signal regeneration section 6612 performs modulation processing again on the once demodulated spread spectrum system B signal, followed by serial/parallel conversion processing and spreading system B spreading processing, thereby forming a spread spectrum system B replica signal. At this time, spreading system B signal regeneration section 6612 forms a replica signal that includes the amount of distortion in transmission by forming a replica signal using transmission path distortion information from transmission path distortion estimation section 6614. Spreading system B signal regeneration section 6612 sends the formed replica signal to subtraction section 6605.

In subtraction section 6605, the spread spectrum system B replica signal obtained by spreading system B signal regeneration section 6612 is subtracted from the spread spectrum system A signal and spread spectrum system B signal multiplex signal delayed by delay section 6604 by the amount of time for forming the replica signal, by which means only the spread modulated signal spread and modulated by means of spread spectrum system A is extracted.

The extracted spread spectrum system A spread modulated signal is made a post-despreading parallel signal by undergoing despreading processing by a spreading system A despreading section 6606 using the same spreading code as spreading system A spreading section 6505. This parallel signal is input to a demodulation section 6608 via a parallel/serial conversion section (P/S) 6607, and is made a demodulated signal by demodulation section 6608.

Thus, according to receiving apparatus 6600, even when signals of a plurality of OFDM-spreading modulation systems formed by time axis spreading using spreading codes with different spreading ratios are transmitted multiplexed in the same frequency band, these OFDM-spreading modulation signals can be separated and individually demodulated.

Figure 68:
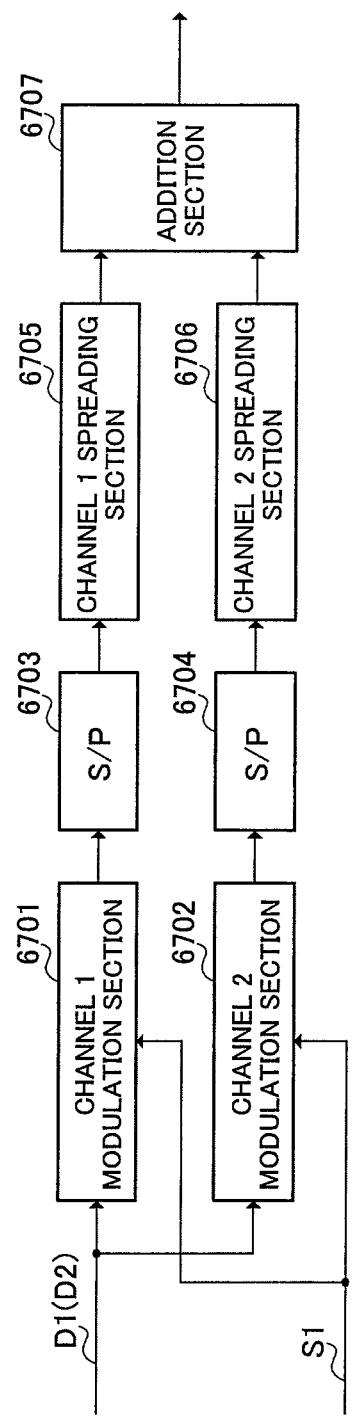
FIG. 68 is a block diagram showing the configuration of a modulation section, serial/parallel conversion section, and spreading section when a multiplexed signal is composed of a plurality of channels.

If OFDM-spreading modulation system A or OFDM-spreading modulation system B signals multiplexed here are configured with a plurality of channels, the amount of transmission information can be greatly increased. This can be done, for example, by configuring modulation section 6501, serial/parallel conversion section (S/P) 6503, and spreading system A spreading section 6505 shown in FIG. 66, which form an OFDM-spreading modulation system A signal, as shown in FIG. 68. As this also applies to modulation section 6502, serial/parallel conversion section (S/P) 6504, and spreading system B spreading section 6506, which form an OFDM-spreading modulation system B signal, the case in which an OFDM-spreading modulation system A signal is formed will be described below.

In FIG. 68, a first transmit digital signal D1 is sent to an addition section 6707 via a plurality (being equal to the number of channels: in FIG. 68, two channels) of channel modulation sections 6701 and 6702, serial/parallel conversion sections (S/Ps) 6703 and 6704, and channel spreading sections 6705 and 6706. In channel 1 spreading section 6705 and channel 2 spreading section 6706, spreading processing is performed using spreading codes that have the same spreading ratio and for which there is almost no cross-correlation. The code division multiplexed signal for a plurality of channels obtained by multiplexing by addition section 6707 is sent to addition section 6509 in FIG. 66.

Figure 69:
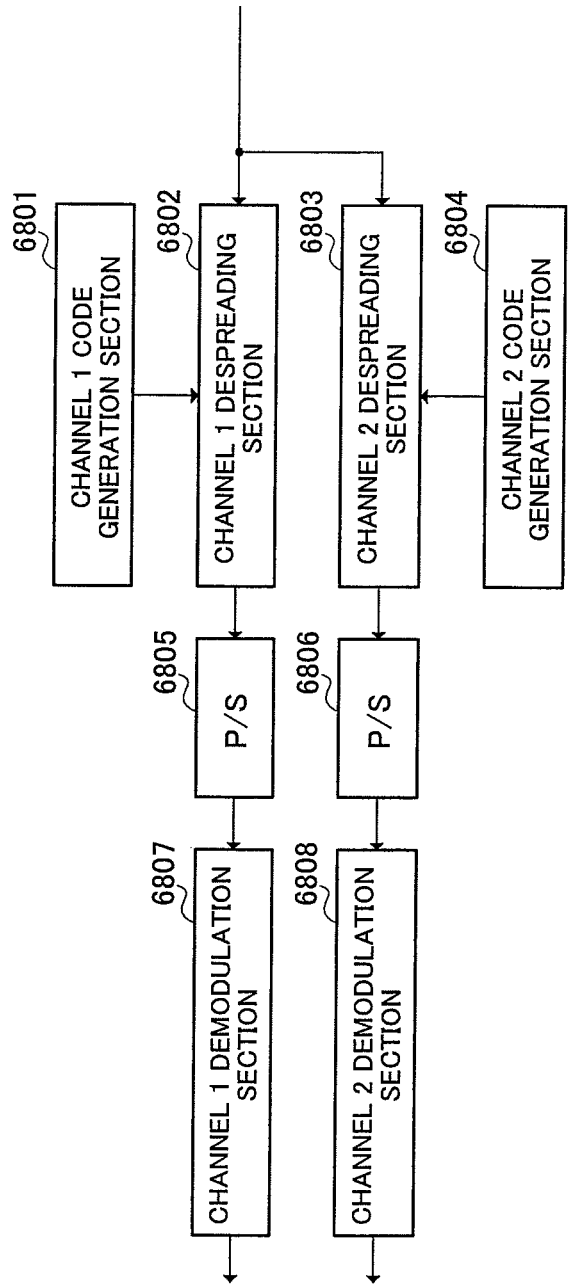
FIG. 69 is a block diagram showing the configuration when a signal composed of a plurality of channels is demodulated.

To demodulate OFDM-spreading modulation system A or OFDM-spreading modulation system B signals configured with a plurality of channels in this way, spreading system A despreading section 6606, parallel/serial conversion section (P/S) 6607, and demodulation section 6608 shown in FIG. 67 can be configured as shown in FIG. 69. As this also applies to spreading system B despreading section 6609, parallel/serial conversion section (P/S) 6610, and demodulation section 6611, which demodulate an OFDM-spreading modulation system B signal, a case in which OFDM-spreading modulation system A signals of two channels are demodulated will be described below.

In FIG. 69, an output signal from subtraction section 6605 is input to a channel 1 despreading section 6802 and channel 2 despreading section 6803. Channel 1 despreading section 6802 and channel 2 despreading section 6803 perform despreading processing using spreading codes input from a channel 1 code generation section 6801 and channel 2 code generation section 6804 respectively. The despread signal obtained by channel 1 despreading section 6802 is made a channel 1 received digital signal by means of a parallel/serial conversion section (P/S) 6805 and channel 1 demodulation section 6807. Similarly, the despread signal obtained by channel 2 despreading section 6803 is made a channel 2 received digital signal by means of a parallel/serial conversion section (P/S) 6806 and channel 2 demodulation section 6808.

According to the above configuration, by multiplexing and transmitting signals of a plurality of OFDM-spreading modulation systems that have undergone time domain spreading using spreading codes with different spreading ratios on the transmitting side, and on the receiving side, forming a replica signal by despreading and then respreading one or other of the multiplexed signals, and separating and extracting multiplexed signals by subtracting the replica signal from the multiplex signal, it is possible to demodulate both multiplexed signals. As a result, the data transmission speed can be improved.

Embodiment 16

In this embodiment it is proposed that, in addition to transmitting an OFDM modulated signal and OFDM-spreading modulated signal multiplexed in the same frequency band, selection be made of executing OFDM modulation processing or executing OFDM-spreading modulation processing on an information signal directed to each transmission target station according to the radio wave propagation path environment between the transmitting side and each transmission target station. By this means, it is possible to achieve both an improvement in error rate characteristics and an increase in the amount of transmit data.

Figure 70:
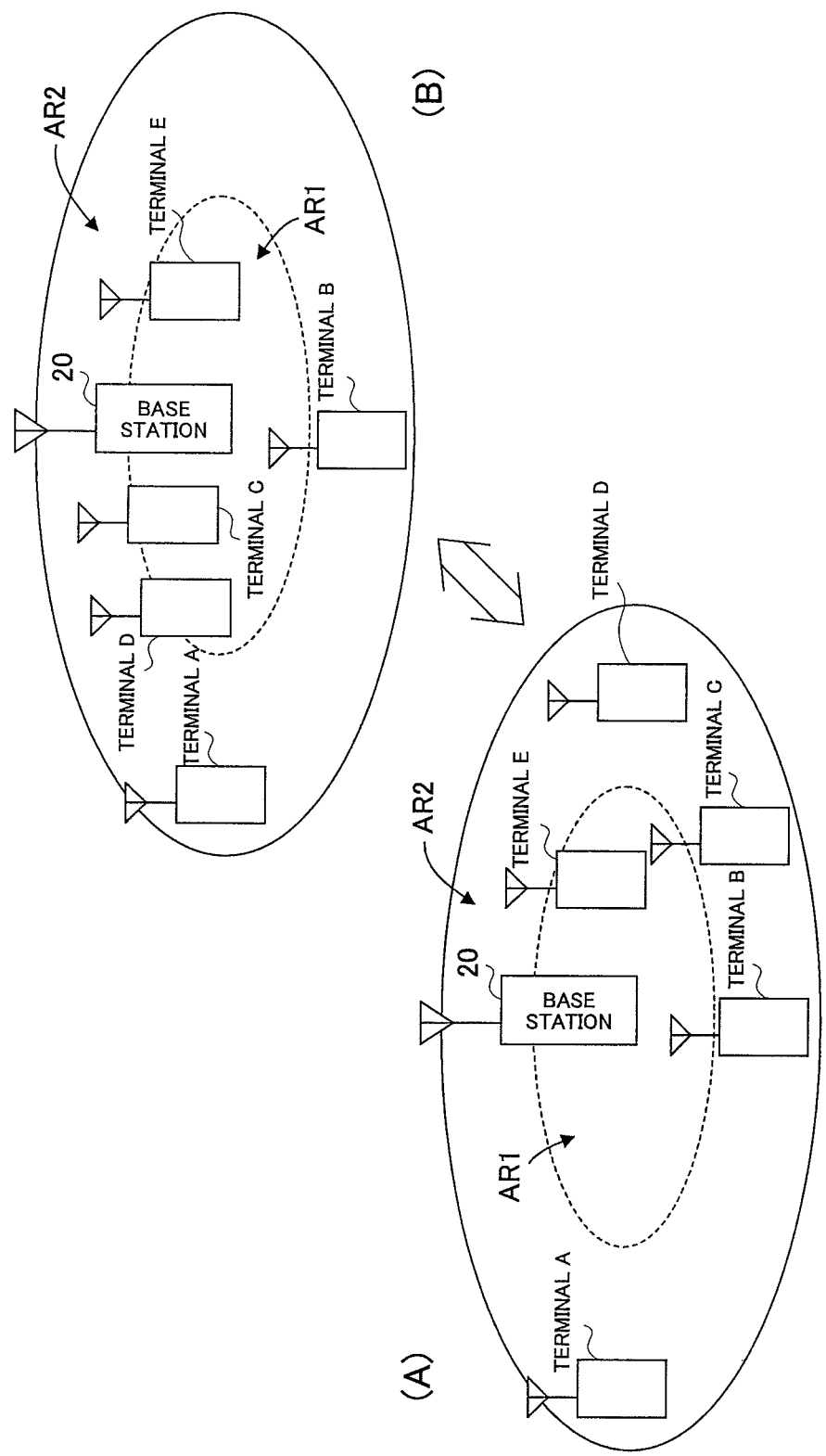
FIG. 70 is a drawing showing the positional relationship between a base station and terminals provided for explanation of Embodiment 16.

FIG. 70 is a conceptual diagram of this embodiment. In FIG. 70, a base station transmits an OFDM modulated signal and OFDM-spreading modulated signal multiplexed in the same frequency band to terminals A through E. For terminals in area AR1 close to the base station in terms of distance, an information signal subjected to OFDM modulation processing is transmitted, placing the emphasis on the amount of transmission information rather than resistance to error. On the other hand, for terminals in outer area AR2 surrounding AR1, an information signal is transmitted that has undergone OFDM-spreading modulation processing, which has good error rate resistance.

To give a specific example, when one terminal E is present in area AR1, as shown in FIG. 70 (A), an information signal for terminal E is OFDM modulated and information signals for terminals A through D are OFDM-spreading modulated, and these modulated signals are transmitted multiplexed in the same frequency band. On the other hand, when terminals C and D move into area AR1, as shown in FIG. 70 (B), information signals for terminals C, D, and E are OFDM modulated and information signals for terminals A and B are OFDM-spreading modulated, and these modulated signals are transmitted multiplexed in the same frequency band.

Figure 71:
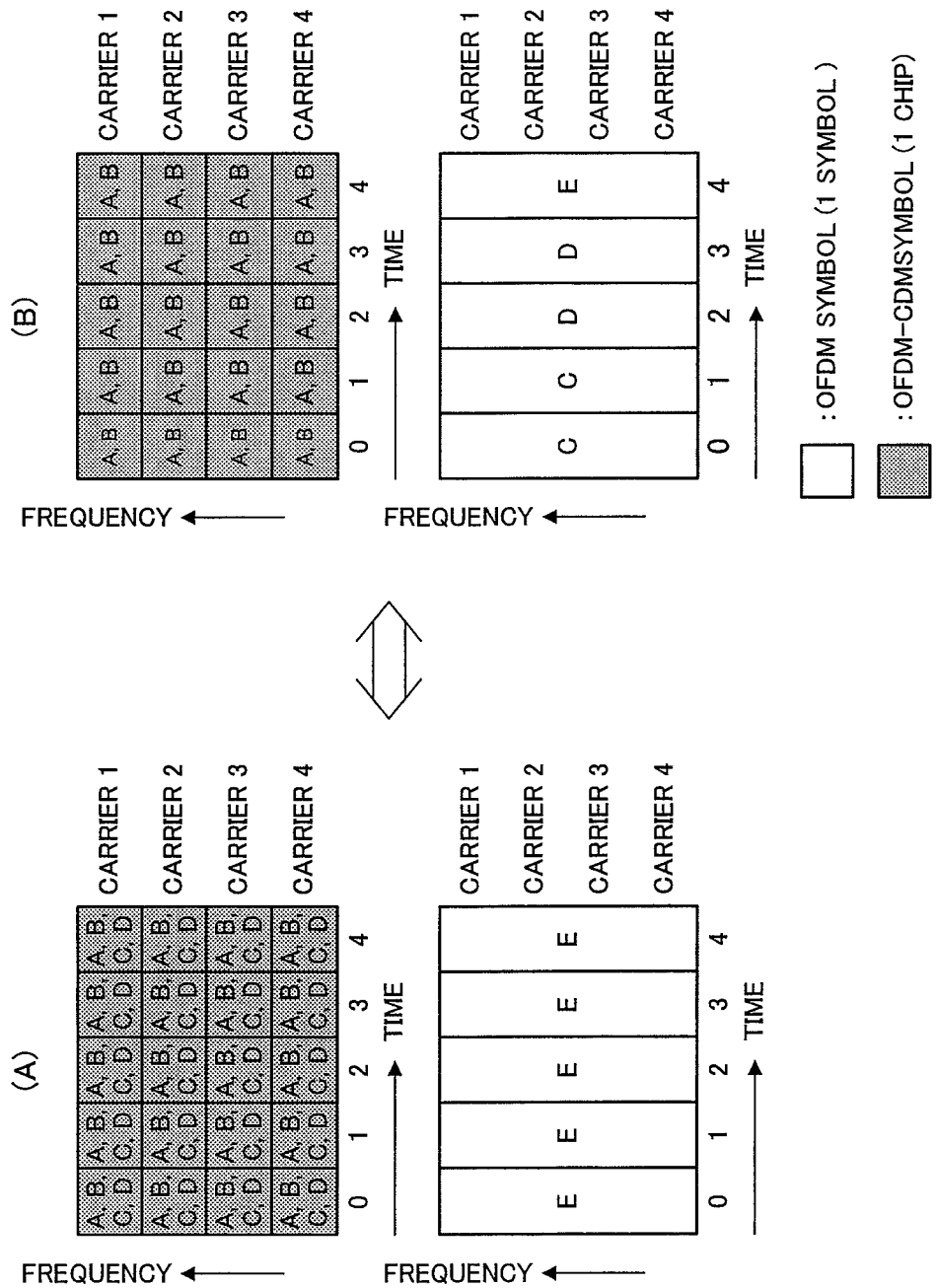
FIG. 71 is a drawing showing an example of frame configurations of a transmit signal in Embodiment 16.
Figure 72:
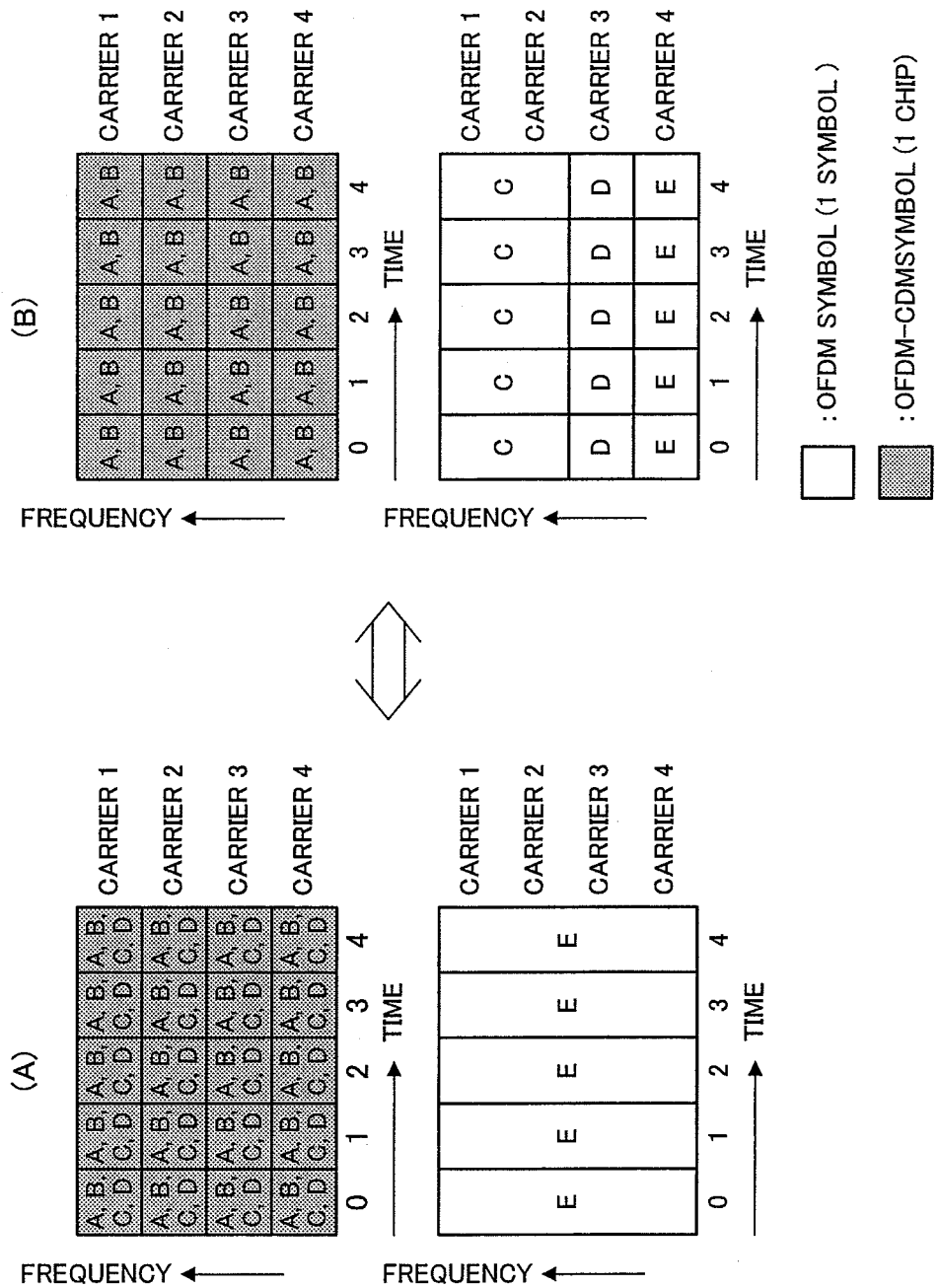
FIG. 72 is a drawing showing an example of frame configurations of a transmit signal in Embodiment 16.

FIG. 71 and FIG. 72 show sample frame configurations of a transmit signal transmitted from the base station. FIG. 71 (A) and FIG. 72 (A) show transmit signal frame configurations when terminals A through E are at the locations shown in FIG. 70 (A), and FIG. 71 (B) and FIG. 72 (B) show transmit signal frame configurations when terminals A through E have moved to the locations shown in FIG. 70 (B). Reference codes A through E in FIG. 71 and FIG. 72 indicate signals directed to terminals A through E respectively.

Here, OFDM-spreading modulated signals (OFDM-CDM symbols) may be spread in the frequency axis direction, may be spread in the time axis direction, or may be spread two-dimensionally in the frequency axis direction and time axis direction. For OFDM symbols, when there are a plurality of terminals, OFDM signals for each terminal may be time division multiplexed as shown in FIG. 71 (B), or a plurality of carriers may be used and assigned to individual terminals as shown in FIG. 72 (B).

In order to simplify the explanation, in FIG. 70, FIG. 71, and FIG. 72 a case has been described in which signals that have undergone OFDM modulation processing, which offers a large transmission volume, are transmitted to terminals near a base station, and signals that have undergone OFDM-spreading modulation processing, which offers good resistance to errors, are transmitted to terminals far from the base station, but in actuality, modulation processing is selected according to the radio wave propagation environment, as described below.

Figure 73:
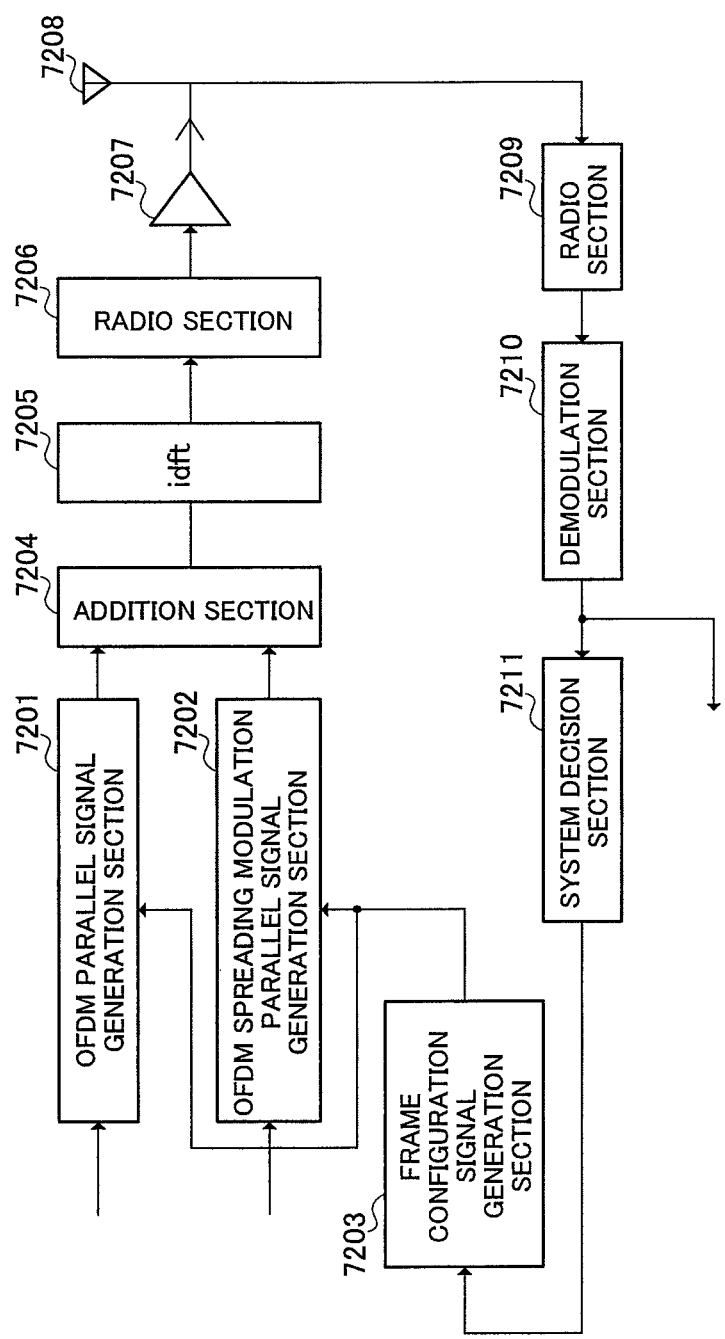
FIG. 73 is a block diagram showing the configuration of a transmitting apparatus that selects OFDM modulation signals or OFDM-spreading modulation signals according to the radio wave propagation environment and transmits them multiplexed in the same frequency band.

FIG. 73 shows the configuration of a base station of this embodiment. In the base station, an information signal for each terminal is input to an OFDM parallel signal generation section 7201 and OFDM spreading modulation parallel signal generation section 7202. OFDM parallel signal generation section 7201 and OFDM spreading modulation parallel signal generation section 7202 processes information signals of corresponding terminals in accordance with a frame configuration signal generated by a frame configuration signal generation section 7203 as a modulation selection means. For example, in the situation shown in FIG. 70 (A), OFDM parallel signal generation section 7201 processes only an information signal for terminal E, and OFDM spreading modulation parallel signal generation section 7202 processes information signals for terminals A through D.

Signals generated by OFDM parallel signal generation section 7201 and OFDM spreading modulation parallel signal generation section 7202 are added by an addition section 7204, followed by inverse discrete Fourier transform processing by an inverse discrete Fourier transform section (idft) 7205. By this means, information signals for the respective terminals for which OFDM modulation processing or OFDM-spreading modulation processing has been selected according to the radio wave propagation environment are multiplexed in the same frequency band. The signal resulting from inverse Fourier transform processing is transmitted from an antenna 7208 via a radio section 7206 and amplifier 7207.

Figure 75:
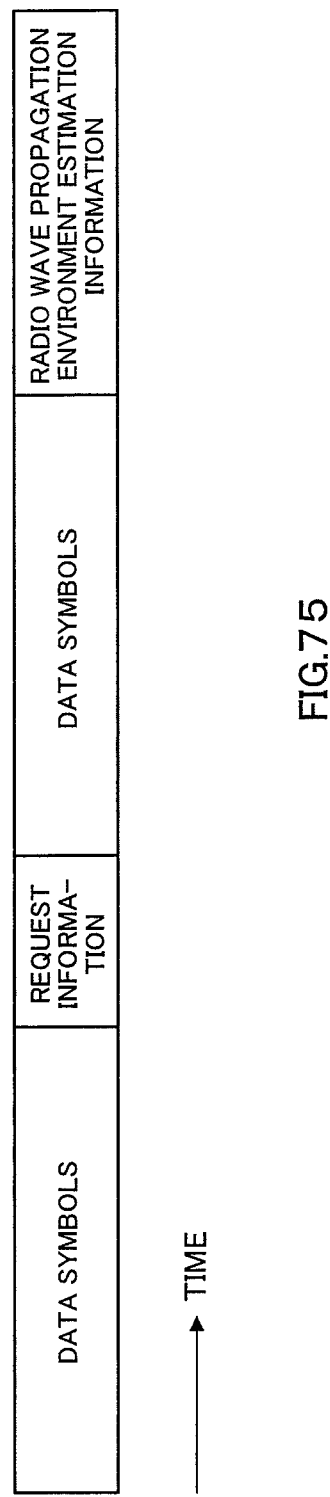
FIG. 75 is a drawing showing the frame configuration generated by the frame generation section of FIG. 74.

In the receiving system, on the other hand, a signal from a terminal received by antenna 7208 is input to a demodulation section 7210 via a radio section 7209. Receive data demodulated by demodulation section 7210 is input to a system decision section 7211. The receive data has the kind of frame configuration shown in FIG. 75, and based on request information and radio wave propagation environment estimation information from each terminal, system decision section 7211 decides whether or not to transmit an information signal to each terminal and, if an information signal is to be sent, decides whether to send an OFDM modulated signal or OFDM-spreading modulated signal. System decision section 7211 sends the result of the decision to frame configuration signal generation section 7203.

Figure 74:
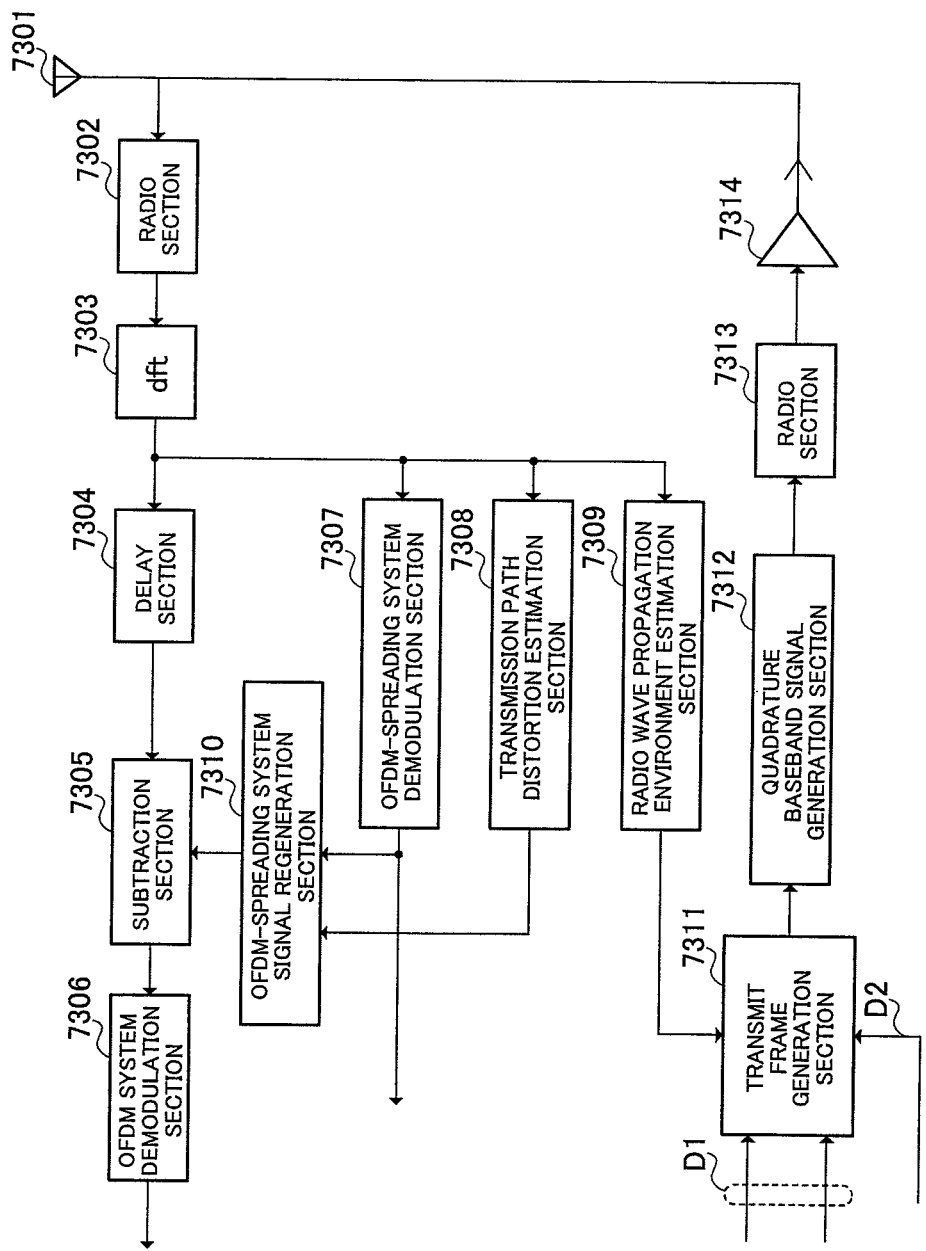
FIG. 74 is a block diagram showing the configuration of a receiving apparatus that demodulates a multiplex signal transmitted from the transmitting apparatus of FIG. 73.

The configuration of a terminal is shown in FIG. 74. In a terminal, predetermined radio processing is performed by a radio section 7302 on a received signal received by an antenna 7301. Following radio processing, the signal undergoes Fourier transform processing by a discrete Fourier transform section (dft) 7303, and is then input to a subtraction section 7305 via a delay section 7304, and is also input to an OFDM-spreading system demodulation section 7307, transmission path distortion estimation section 7308, and radio wave propagation environment estimation section 7309.

OFDM-spreading system demodulation section 7307 demodulates an OFDM-spreading modulated signal by performing despreading processing and discrete Fourier transform processing on the received multiplex signal. The demodulated OFDM-spreading modulated signal is output directly as a demodulated signal and is also input to an OFDM-spreading system signal regeneration section 7310.

In OFDM-spreading system signal regeneration section 7310, an OFDM-spreading modulated signal replica signal is formed by again executing modulation processing, serial/parallel conversion processing, and spreading processing on the once demodulated OFDM-spreading modulated signal. At this time, OFDM-spreading system signal regeneration section 7310 forms a replica signal that includes the amount of distortion in transmission by forming a replica signal using transmission path distortion information from transmission path distortion estimation section 7308. OFDM-spreading system signal regeneration section 7310 sends the formed replica signal to subtraction section 7305.

In subtraction section 7305, the OFDM-spreading modulated signal replica signal obtained by OFDM-spreading system signal regeneration section 7310 is subtracted from the received multiplex signal delayed by delay section 7304 by the amount of time for forming the replica signal, by which means only an OFDM modulated signal is extracted. The extracted OFDM modulated signal is demodulated by an OFDM system demodulation section 7306.

Radio wave propagation environment estimation section 7309 estimates the radio wave propagation environment, such as the SIR (Signal to Interference Ratio), Doppler frequency, received field strength, or multipath environment, and sends the estimation result to a transmit frame generation section 7311. In addition to the radio wave propagation environment estimation result, transmit data D1 and request information D2 requesting signal transmission are also input to transmit frame generation section 7311. Using these signals, transmit frame generation section 7311 generates the kind of transmit frame shown in FIG. 75. The output from transmit frame generation section 7311 is transmitted from antenna 7301 via an quadrature baseband signal generation section 7312, radio section 7313, and amplifier 7314.

Thus, according to the above configuration, an OFDM-spreading modulated signal that is resistant to errors is transmitted to a transmission target station for which the propagation environment is poor, and an OFDM modulated signal with a high transmission rate is transmitted to a transmission target station for which the propagation environment is good, these signals being transmitted multiplexed in the same frequency band, thereby making it possible to achieve both an improvement in error rate characteristics and an increase in the amount of transmit data.

In this embodiment, a case has been described in which execution of OFDM modulation processing or execution of OFDM-spreading modulation processing is selected for an information signal directed to a terminal according to the radio wave propagation environment, but it is also possible to execute both OFDM modulation processing and OFDM-spreading modulation processing on the information signal of each terminal and transmit the respective signals, and for one or other of these signals to be demodulated selectively on the terminal side according to the radio wave propagation environment. It is also possible for execution of both OFDM modulation processing and OFDM-spreading modulation processing not to be limited to an information signal directed to each station, but for both to be executed, for example, on a common information signal for all terminals such as a broadcast signal and for the respective signals to be transmitted, and for one or other of these signals to be demodulated selectively on the terminal side according to the radio wave propagation environment.

Figure 76:
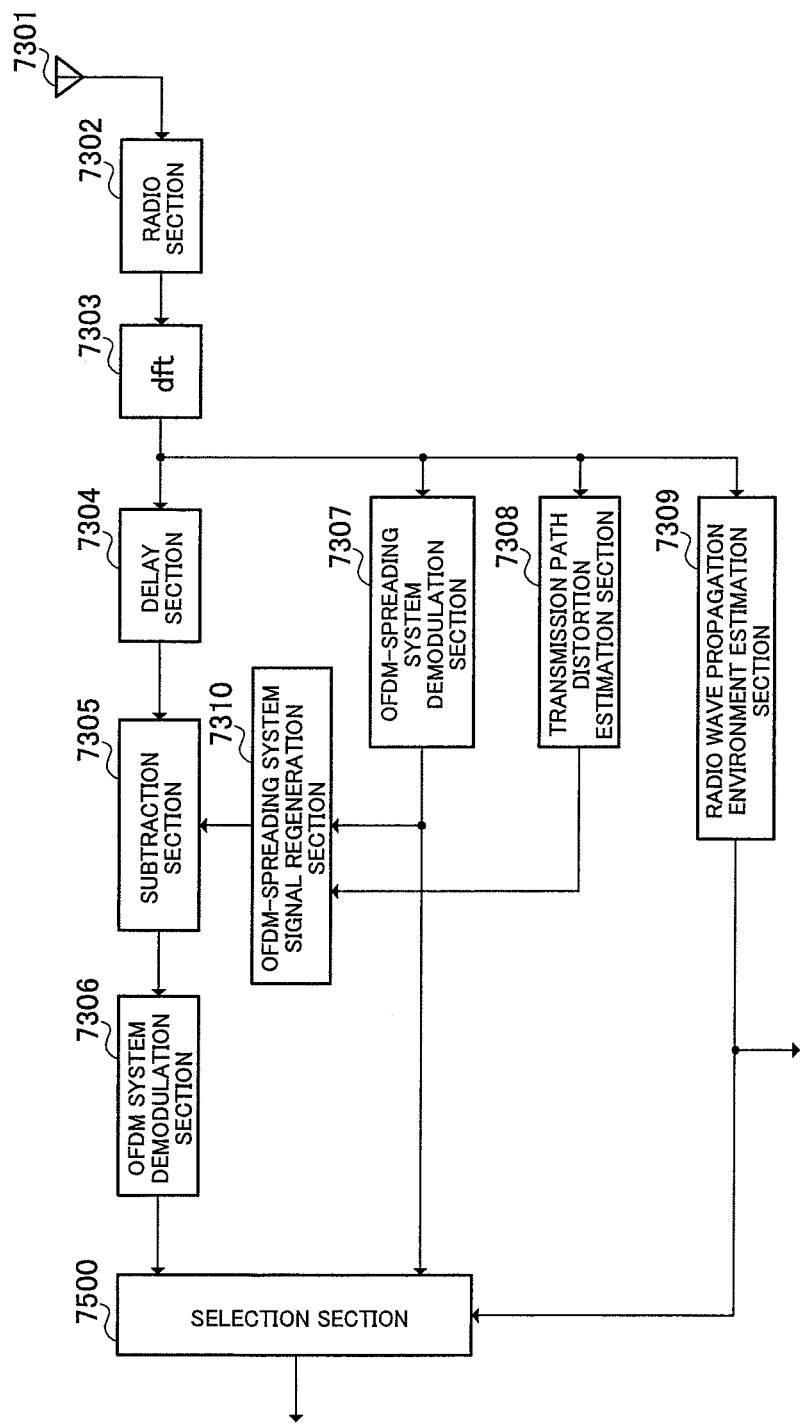
FIG. 76 is a block diagram showing the configuration of a receiving apparatus that selects a signal according to the radio wave propagation environment from signals which undergo both OFDM modulation processing and OFDM-spreading modulation processing on the same information signal and are multiplexed in the same frequency band.

The configuration of a receiving system in this case is shown in FIG. 76. FIG. 76, in which parts corresponding to those in FIG. 74 are assigned the same codes as in FIG. 74, shows the overall configuration of a terminal receiving system, which is similar to the configuration in FIG. 74 except for the provision of a selection section 7500 that selects either demodulated data obtained by OFDM system demodulation section 7306 or demodulated data obtained by OFDM-spreading system demodulation section 7307, based on the estimation result from radio wave propagation environment estimation section 7309.

That is to say, when the radio wave propagation environment is poor, selection section 7500 selects information transmitted using the error-resistant OFDM-spreading system, and when the radio wave propagation environment is good, selection section 7500 selects information transmitted using the OFDM modulation system, which offers a high transmission volume. By this means, it is possible to achieve both an improvement in error rate characteristics and an increase in the amount of transmit data.

In this embodiment a case has been described in which execution of OFDM modulation processing or execution of OFDM-spreading modulation processing is selected for an information signal directed to a terminal according to the radio wave propagation environment, but the present invention is not limited to a combination of OFDM modulation processing and OFDM-spreading modulation processing. For example, it is also possible to select execution of spreading processing or non-execution of spreading processing for an information signal directed to a terminal according to the radio wave propagation environment, and for the respective signals to be transmitted multiplexed in the same frequency band. In this case, also, if on the receiving side a spread signal is first demodulated, then a spread signal replica signal is formed, and the replica signal is eliminated from the multiplex signal, a non-spread signal can be extracted, enabling both signals to be demodulated. As a result, in this case also it is possible to achieve both an improvement in error rate characteristics and an increase in the amount of transmit data by selecting a spread signal when the propagation environment is poor and selecting a non-spread signal when the propagation environment is good.

In this embodiment, a case has been described in which the radio wave propagation environment is estimated by the receiving side that receives a signal in which an OFDM modulated signal and OFDM-spreading modulated signal are multiplexed in the same frequency band, but the present invention is not limited to this, and the radio wave propagation environment may also be estimated by the transmitting side that transmits an OFDM modulated signal and OFDM-spreading modulated signal multiplexed in the same frequency band.

A transmitting apparatus according to the present invention has a configuration comprising a first modulation section that digitally modulates an information signal and obtains a first modulated signal, a second modulation section that digitally modulates a preset signal sequence and obtains a second modulated signal, a multiplexing section that multiplexes the first modulated signal and second modulated signal in the same frequency band and obtains a multiplex signal, and a transmission section that transmits the multiplex signal.

A transmitting apparatus according to the present invention has a configuration in which a second modulation section digitally modulates a preset signal sequence by means of PSK modulation.

A transmitting apparatus according to the present invention has a configuration in which a preset signal sequence can be modified.

According to these configurations, since a transmitting apparatus transmits a first modulated signal and second modulated signal multiplexed in the same frequency band, effective frequency utilization can be achieved. Also, by digitally modulating a preset signal sequence by means of PSK modulation, it is possible to facilitate the configuration of a transmitting apparatus and receiving apparatus. Moreover, if a preset signal sequence is used as an encryption key, secure radio communication can be performed by modifying the signal sequence.

A receiving apparatus according to the present invention has a configuration comprising a reception section that receives a multiplex signal in which a first modulated signal in which an information signal is digitally modulated and a second modulated signal in which a preset signal sequence is digitally modulated are multiplexed in the same frequency band, a synchronization section that acquires time synchronization with the transmitting apparatus using the second modulated signal, and a demodulation section that demodulates the first modulated signal from the multiplex signal using synchronization information obtained by the synchronization section.

According to this configuration, since the synchronization section can perform time synchronization based on the preset second modulated signal, it is not necessary to transmit separately a unique word or pilot signal for performing time synchronization. As a result, transmission of other information signals can be increased correspondingly, enabling the data transmission speed to be improved.

A receiving apparatus according to the present invention has a configuration in which a demodulation section comprises a signal regeneration section that forms a replica signal of a second modulated signal by regenerating the second modulated signal within a multiplex signal using synchronization information obtained by a synchronization section, and a signal elimination section that extracts the first modulated signal by eliminating the second modulated signal replica signal from the multiplex signal.

According to this configuration, even when a first modulated signal in which an information signal is digitally modulated and a second modulated signal in which a preset signal sequence is digitally modulated are multiplexed in the same frequency band, the first modulated signal and second modulated signal can be separated satisfactorily.

A receiving apparatus according to the present invention has a configuration in which a signal regeneration section comprises a first code multiplication section that multiplies a multiplex signal by a code corresponding to a second modulated signal, and a second code multiplication section that forms a replica signal for the second modulated signal by again multiplying the signal after code multiplication by the code corresponding to the second modulated signal.

According to this configuration, when a multiplex signal is multiplied in the first code multiplication section by a code corresponding to the second modulated signal at timing synchronized with the second modulated signal, only the second modulated signal is extracted from the multiplex signal. Then a replica signal of the second modulated signal is formed by again multiplying by the code corresponding to the second modulated signal in the second code multiplication section. When this replica signal is eliminated from the multiplex signal, the first modulated signal is extracted. Thus, by making the second modulated signal a preset signal sequence signal, it is possible to separate the first modulated signal and second modulated signal satisfactorily from multiplexed signals multiplexed in the same frequency band.

A receiving apparatus according to the present invention has a configuration further comprising a low-pass filter that passes and supplies to a second code multiplication section only a low-frequency region signal of signals after code multiplication by a first code multiplication section.

According to this configuration, it is possible to eliminate a noise component based on a first modulated signal contained in a signal after code multiplication by the first code multiplication section, enabling a second modulated signal to be separated with significantly better precision. As a result, the quality of a replica signal of the second modulated signal also improves, and therefore the precision of separation of the first modulated signal also improves.

A receiving apparatus according to the present invention has a configuration comprising a pilot signal estimation section that generates a pilot signal by multiplying a multiplex signal by a code corresponding to a second modulated signal, and a coherent detection section that performs coherent detection of a first modulated signal extracted by a signal elimination section using the generated pilot signal.

According to this configuration, a pilot signal is generated from the second modulated signal and used to perform first modulated signal coherent detection, enabling the first modulated signal to be demodulated with significantly better precision.

A receiving apparatus according to the present invention has a configuration whereby multiplex signals transmitted simultaneously from a plurality of transmitting apparatuses are received simultaneously, synchronization timing of the respective multiplex signals is detected by a synchronization section, and a first modulated signal is demodulated by a demodulation section by executing equalization processing on the first modulated signal using the synchronization timing.

According to this configuration, even when multiplex signals in which a first and second modulated signal are multiplexed in the same frequency band are transmitted from a plurality of transmitting apparatuses, and propagation delay differences occur due to differences in the distances from the receiving apparatus to each transmitting apparatus, the first modulated signal can be demodulated with significantly better precision by performing equalization processing using synchronization timing detected based on a second modulation section when the first modulated signal is demodulated.

A receiving apparatus according to the present invention has a configuration whereby a preset signal sequence is held as confidential information.

According to this configuration, if a preset signal sequence is not known, a second modulated signal cannot be separated from a multiplex signal, and therefore it is also impossible to obtain a first modulated signal. Thus, secure radio communication can be performed by using a preset signal sequence as an encryption key.

A transmitting apparatus according to the present invention has a configuration comprising a first modulation section that digitally modulates an information signal and obtains a first modulated signal, a second modulation section that digitally modulates an information signal by means of a spread spectrum system and obtains a second modulated signal, a multiplexing section that multiplexes the first modulated signal and second modulated signal in the same frequency band and obtains a multiplex signal, and a transmission section that transmits the multiplex signal.

According to this configuration, since a first modulated signal and second modulated signal are transmitted multiplexed in the same frequency band, effective frequency utilization can be achieved. Also, the second modulated signal digitally modulated by means of a spread spectrum system can be separated from the multiplex signal on the receiving side by using the same spreading code as on the transmitting side.

A transmitting apparatus according to the present invention has a configuration in which a second modulation section obtains a plurality of second modulated signals by spreading an information signal using a plurality of spreading codes.

According to this configuration, it is possible to make second modulated signals code division multiplexed signals using different spreading codes, thereby making it possible to greatly increase the quantity of information signals multiplexed in the same frequency band, and enabling the data transmission speed to be significantly improved.

A transmitting apparatus according to the present invention has a configuration whereby an information signal input to a second modulation section is used as control information.

According to this configuration, a pilot signal or unique word or the like, or control information for controlling a terminal or base station necessary for performing communication, is transmitted in a second modulated signal, making it unnecessary to insert control information in a first modulated signal. By this means a correspondingly greater amount of data can be transmitted in the first modulated signal, and the data transmission speed can be improved.

A transmitting apparatus according to the present invention has a configuration whereby a spreading code used by a second modulation section can be modified.

According to this configuration, secure radio communication can be performed by using a spreading code as an encryption key and modifying the spreading code.

A receiving apparatus according to the present invention has a configuration comprising a reception section that receives a multiplex signal, in which a first modulated signal in which an information signal is digitally modulated and a second modulated signal in which an information signal is spread spectrum modulated are multiplexed in the same frequency band, a spread spectrum demodulation section that obtains a second modulated signal demodulated signal from the multiplex signal by despreading the second modulated signal, a spread spectrum modulated signal regeneration section that forms a replica signal of the second modulated signal by executing spreading processing on the signal obtained by the spread spectrum demodulation section, a signal elimination section that extracts the first modulated signal by eliminating the second modulated signal replica signal from the multiplex signal, and a demodulation section that demodulates the extracted first modulated signal.

According to this configuration, even when a first modulated signal in which an information signal is digitally modulated and a second modulated signal in which an information signal is spread spectrum modulated are multiplexed in the same frequency band, the first modulated signal and second modulated signal can be separated satisfactorily.

A receiving apparatus according to the present invention has a configuration wherein a second modulated signal is a code division multiplexed signal obtained by performing spread spectrum processing on a plurality of information signals using different spreading codes; a spread spectrum demodulation section demodulates a code division multiplexed plurality of signals by performing despreading processing using a plurality of spreading codes on the multiplex signal; and a spread spectrum modulated signal regeneration section forms a replica signal of the second modulated signal by executing spreading processing using a plurality of spreading codes on the plurality of signals obtained by the spread spectrum demodulation section.

According to this configuration, even when a second modulated signal is a signal code division multiplexed using a plurality of spreading codes, a first modulated signal and the second modulated signal can be separated satisfactorily. Also, as the second modulated signal is a code division multiplexed signal, a significantly greater amount of information can be obtained.

A receiving apparatus according to the present invention has a configuration further comprising a distortion estimation section that estimates transmission path distortion of a multiplex signal using a pilot signal received simultaneously with the multiplex signal, wherein a spread spectrum modulated signal regeneration section forms a replica signal to which the estimated transmission path distortion component has been added.

According to this configuration, a replica signal can be made a signal with the same kind of transmission path distortion as a multiplex signal, enabling a first modulated signal to be extracted significantly more satisfactorily by eliminating the replica signal from the multiplex signal.

A transmitting apparatus according to the present invention has a configuration comprising a modulation section that digitally modulates an information signal and obtains a modulated signal, a selection section that selects a signal corresponding to the information signal from a plurality of specific modulated signals, a multiplexing section that multiplexes the modulated signal and the specific modulated signal selected by the selection section in the same frequency band and obtains a multiplex signal, and a transmission section that transmits the multiplex signal.

According to this configuration, an information signal is transmitted via a specific modulated signal, enabling the information signal to be estimated from the specific modulated signal on the receiving side. As a result, it is possible to increase the amount of information that can effectively be transmitted in the same frequency band. As the number of specific modulated signals is limited, if a correlation value is found on the receiving side between a multiplex signal and specific modulated signals whose number is limited, for example, the specific modulated signal contained in the multiplex signal can easily be detected.

A transmitting apparatus according to the present invention has a configuration in which a selection section enables the correspondence between a selected specific modulated signal and an information signal to be modified.

According to this configuration, if the correspondence between a specific signal and an information signal is used as an encryption key, secure radio communication can be performed by modifying the correspondence. That is to say, only a receiving apparatus that recognizes this correspondence can obtain the information signal corresponding to a specific modulated signal.

A receiving apparatus according to the present invention has a configuration comprising a reception section that receives a multiplex signal in which modulated signal in which an information signal is digitally modulated and a specific modulated signal selected as corresponding to the information signal are multiplexed in the same frequency band, a specific modulated signal estimation section that estimates a specific modulated signal contained in the multiplex signal and outputs an information signal corresponding to that specific modulated signal, a signal elimination section that extracts a modulated signal within the multiplex signal by eliminating a specific modulated signal from the multiplex signal, and a demodulation section that demodulates the extracted modulated signal.

According to this configuration, the specific modulated signal estimation section finds, for example, correlation values between a plurality of specific modulated signals and a multiplex signal and estimates a specific modulated signal contained in the multiplex signal, and obtains an information signal corresponding to the estimated specific modulated signal. The modulated signal is extracted by having the estimated specific modulated signal eliminated from the multiplex signal by the signal elimination section. As a result, it is possible to obtain an information signal corresponding to a modulated signal and an information signal corresponding to a specific modulated signal from multiplex signals multiplexed in the same frequency band.

A receiving apparatus according to the present invention has a configuration further comprising a distortion estimation section that estimates transmission path distortion of a multiplex signal using pilot symbols received simultaneously with the multiplex signal, wherein a signal elimination section eliminates a specific modulated signal to which the estimated transmission path distortion component has been added from the multiplex signal.

According to this configuration, an estimated specific signal can be made a signal that has the same kind of transmission path distortion as a multiplex signal, so that a specific modulated signal to which a distortion component has been added is eliminated by a signal elimination section from a multiplex signal containing that distortion component. As a result, a modulated signal can be extracted much more satisfactorily.

A receiving apparatus according to the present invention has a configuration whereby information about correspondence between a specific modulated signal and information signal is received from a transmitting station, and a specific modulated signal estimation section outputs an information signal corresponding to a specific modulated signal based on received correspondence information.

According to this configuration, only a receiving apparatus that receives the correspondence between a specific modulated signal and information signal can obtain an information signal corresponding to a specific modulated signal. As a result, secure radio communication can be performed.

A transmitting apparatus according to the present invention has a configuration comprising a first modulation section that digitally modulates an information signal and obtains a first modulated signal, a second modulation section that modulates an information signal using a spread spectrum system and obtains a second modulated signal, a multiplexing section that multiplexes the first modulated signal and second modulated signal in the same frequency band and obtains a multiplex signal, and a transmission section that transmits the multiplex signal; wherein the first and second modulation sections perform modulation processing so that signal points of the first modulated signal and the second modulated signal are arranged at different positions in the in-phase-quadrature plane.

According to this configuration, since signal points of the first modulated signal and second modulated signal in the in-phase-quadrature plane are arranged differently, data errors can be suppressed when demodulating each modulated signal. As a result, a transmit signal can be transmitted at high speed and with good quality.

A transmitting apparatus according to the present invention has a configuration comprising a first modulation section that digitally modulates an information signal and obtains a first modulated signal, a second modulation section that modulates an information signal using a spread spectrum system and obtains a second modulated signal, a multiplexing section that multiplexes the first modulated signal and second modulated signal in the same frequency band and obtains a multiplex signal, and a transmission section that transmits the multiplex signal; wherein the second modulation section forms a plurality of spread information signals as second modulated signals by performing spreading processing on signals subject to spreading using different spreading codes, and the multiplexing section multiplexes multiplex frame information and/or spreading code information together with the multiplex signal.

According to this configuration, multiplex frame or spreading code information can be used as an encryption key, enabling secure communication to be achieved.

A transmitting apparatus according to the present invention has a configuration comprising a first modulation section that digitally modulates an information signal and obtains a first modulated signal, a second modulation section that forms a plurality of specific modulated signals modulated in a specific known arrangement decided beforehand with the receiving side, a selection section that selects a signal corresponding to the information signal from among the plurality of specific modulated signals, a multiplexing section that multiplexes the first modulated signal and the specific modulated signal selected by the selection section in the same frequency band and obtains a multiplex signal, and a transmission section that transmits the multiplex signal; wherein the first and second modulation sections perform modulation processing so that signal points of the first modulated signal and specific modulated signal are arranged at different positions in the in-phase-quadrature plane.

According to this configuration, an information signal is transmitted via a specific modulated signal, enabling the information signal to be estimated from the specific modulated signal on the receiving side. As a result, it is possible to increase the amount of information that can be transmitted in the same frequency band. As the number of specific modulated signals is limited, the specific modulated signal contained in the multiplex signal can easily be detected by sequentially finding a correlation value on the receiving side between the multiplex signal and specific modulated signals whose number is limited, for example. Also, since signal points of the first modulated signal and specific modulated signal in the in-phase-quadrature plane are arranged differently, data errors can be suppressed when demodulating each modulated signal.

A transmitting apparatus according to the present invention has a configuration comprising an OFDM modulation section that executes orthogonal frequency division multiplexing processing on an information signal and obtains an OFDM modulated signal, an OFDM-spreading modulation section that executes spreading processing and orthogonal frequency division multiplexing processing on an information signal and obtains an OFDM-spreading modulated signal, a multiplexing section that multiplexes the OFDM modulated signal and OFDM-spreading modulated signal in the same frequency band and obtains a multiplex signal, and a transmission section that transmits the multiplex signal.

According to this configuration, since an OFDM modulated signal and OFDM-spreading modulated signal are transmitted multiplexed in the same frequency band, effective frequency utilization can be achieved. Also, the OFDM-spreading modulated signal can be separated from the multiplex signal on the receiving side by using the same spreading code as on the transmitting side.

A transmitting apparatus according to the present invention has a configuration in which an OFDM modulation section and OFDM-spreading modulation section perform modulation processing so that signal points of the OFDM modulated signal and OFDM-spreading modulated signal are arranged at different positions in the in-phase-quadrature plane.

According to this configuration, since signal points of an OFDM modulated signal and OFDM-spreading modulated signal in the in-phase-quadrature plane are arranged differently, data errors can be suppressed on the receiving side when demodulating each modulated signal after separating each modulated signal.

A transmitting apparatus according to the present invention has a configuration in which a multiplexing section multiplexes an OFDM modulated signal and OFDM-spreading modulated signal in specific subcarriers.

A transmitting apparatus according to the present invention has a configuration in which a multiplexing section multiplexes an OFDM modulated signal and OFDM-spreading modulated signal in a specific time in a frame on the frequency-time axes.

According to these configurations, it is possible to increase only the amount of transmission information in a specific subcarrier or only the amount of transmission information for a specific time, enabling versatile communication to be performed.

A transmitting apparatus according to the present invention has a configuration whereby, in addition to an OFDM modulated signal and OFDM-spreading modulated signal, information of a spreading code used when performing OFDM-spreading modulation processing is multiplexed and transmitted.

According to this configuration, an OFDM-spreading modulated signal can be accurately separated from a multiplex signal and demodulated on the receiving side based on spreading code information.

A transmitting apparatus according to the present invention has a configuration whereby an OFDM modulated signal and OFDM-spreading modulated signal are transmitted multiplexed in the same frequency band at a specific time, and also either an OFDM modulated signal or an OFDM-spreading modulated signal is transmitted at a time other than that specific time.

According to this configuration, when it is wished to transmit a larger amount of information, for example, this information is transmitted as a signal multiplexed with an OFDM modulated signal and OFDM-spreading modulated signal at a specific time, and in the case of information for which it is wished to emphasize transmission quality rather than the amount of transmission information, this information is transmitted as an OFDM modulated signal or OFDM-spreading modulated signal at a time other than the specific time. As a result, it is possible to perform communication with greater diversity.

A receiving apparatus according to the present invention has a configuration comprising a reception section that receives a multiplex signal in which a first modulated signal in which an information signal is digitally modulated and a second modulated signal in which an information signal is modulated using a spread spectrum system and whose signal points are arranged at different positions from those of the first modulated signal in the in-phase-quadrature plane are multiplexed in the same frequency band, a despreading and demodulation section that despreads the received multiplex signal and also demodulates the second modulated signal taking account of the signal point arrangement at the time of modulation, a regeneration section that regenerates the second modulated signal from the demodulated signal and forms a replica signal of the second modulated signal, a signal elimination section that extracts the first modulated signal by eliminating the replica signal from the received multiplex signal, and a demodulation section that demodulates the extracted first modulated signal taking account of the signal point arrangement at the time of modulation.

According to this configuration, when the first modulated signal is demodulated by the despreading and demodulation section, and when the second modulated signal is demodulated by the despreading section, one modulated signal has different signal point positions from the other modulated signal, and therefore even when the other modulated signal component remains when one modulated signal is demodulated, that one modulated signal can be demodulated with good precision.

A receiving apparatus according to the present invention has a configuration comprising a reception section that receives a multiplex signal in which a first modulated signal in which an information signal is digitally modulated and a second modulated signal formed by performing spreading processing on information signals subject to spreading using different spreading codes are multiplexed in the same frequency band, and multiplex frame information and/or spreading code information; a despreading and demodulation section that despreads the received multiplex signal using different spreading codes and demodulates each spread information signal; a regeneration section that forms a second modulated signal replica signal by regenerating a second modulated signal from each demodulated information signal; a signal elimination section that extracts the first modulated signal by eliminating the second modulated signal replica signal from the received multiplex signal at predetermined timing; and a demodulation section that demodulates the extracted first modulated signal; wherein the despreading and demodulation section and/or signal elimination section performs despreading and demodulation processing and/or signal elimination processing based on received multiplex frame information and/or spreading code information.

According to this configuration, it is possible to perform second modulated signal despreading processing by means of the despreading and demodulation section based on multiplex frame information or spreading code information, satisfactorily perform processing for replica signal elimination from a multiplex signal by means of the signal elimination section, and separate and demodulate a second modulated signal and first modulated signal with good quality.

A receiving apparatus according to the present invention has a configuration comprising a reception section that receives a multiplex signal in which an OFDM modulated signal resulting from execution of OFDM modulation processing on an information signal and an OFDM-spreading modulated signal resulting from execution of OFDM-spreading modulation processing on an information signal are multiplexed in the same frequency band, a first demodulation section that demodulates the OFDM-spreading modulated signal within the multiplex signal, a regeneration section that forms a replica signal of the OFDM-spreading modulated signal by regenerating the OFDM-spreading modulated signal from the demodulated signal, a signal elimination section that extracts the OFDM modulated signal by eliminating the OFDM-spreading modulated signal replica signal from the received multiplex signal, and a second demodulation section that demodulates the extracted OFDM modulated signal.

According to this configuration, an OFDM modulated signal can be separated from a multiplex signal by first separating and demodulating an OFDM-spreading modulated signal from the multiplex signal by means of the first demodulation section using a spreading code, and then eliminating the OFDM-spreading modulated signal replica signal formed by the regeneration section from the multiplex signal in the signal elimination section. By this means, it is possible to separate and demodulate an OFDM modulated signal and OFDM-spreading modulated signal multiplexed in the same frequency band.

A receiving apparatus according to the present invention has a configuration comprising a reception section that receives a multiplex signal in which an OFDM modulated signal resulting from execution of OFDM modulation processing on an information signal and an OFDM-spreading modulated signal resulting from execution of OFDM-spreading modulation processing on an information signal are multiplexed in the same frequency band, and information of a spreading code used when performing OFDM-spreading modulation processing; a first demodulation section that demodulates the OFDM-spreading modulated signal within the multiplex signal based on the spreading code information; a regeneration section that forms a replica signal of the OFDM-spreading modulated signal by regenerating the OFDM-spreading modulated signal from the demodulated signal; a signal elimination section that extracts the OFDM modulated signal by eliminating the OFDM-spreading modulated signal replica signal from the received multiplex signal; and a second demodulation section that demodulates the extracted OFDM modulated signal.

According to this configuration, a spreading code used when the first demodulation section separates an OFDM-spreading modulated signal from a multiplex signal is received from the transmitting side, so that only the specific receiving apparatus that receives this spreading code can separate and demodulate an OFDM modulated signal and OFDM-spreading modulated signal from a multiplex signal, enabling secure communication to be achieved.

A receiving apparatus according to the present invention has a configuration further comprising a distortion estimation section that estimates transmission path distortion based on a known signal in a received multiplex signal; wherein a regeneration section forms a replica signal of an OFDM-spreading modulated signal to which the estimated transmission path distortion component has been added.

According to this configuration, a replica signal can be made a signal that has the same kind of transmission path distortion as a received multiplex signal, so that an OFDM modulated signal can be extracted far more satisfactorily by having a signal elimination section eliminate a replica signal to which a distortion component has been added from a received multiplex signal containing a distortion component.

A transmitting apparatus according to the present invention has a configuration comprising a first spreading section that obtains a first spread signal by spreading an information signal using a first spreading code that has a first spreading ratio, a second spreading section that obtains a second spread signal by spreading an information signal using a second spreading code that has a second spreading ratio different from the first spreading ratio, a multiplexing section that obtains a multiplex signal by multiplexing the first spread signal and second spread signal in the same frequency band, and a transmission section that transmits the multiplex signal.

According to this configuration, since a first spread signal and second spread signal with different spreading ratios are transmitted multiplexed in the same frequency band, effective frequency utilization can be achieved. Also, spread signals with different spreading ratios can be separated from a multiplex signal by using spreading codes with different spreading ratios on the receiving side.

A transmitting apparatus according to the present invention has a configuration comprising a first OFDM-spreading modulation section that obtains a first OFDM-spreading modulated signal by performing spreading processing using a first spreading code that has a first spreading ratio and orthogonal frequency division multiplexing processing on an information signal, a second OFDM-spreading modulation section that obtains a second OFDM-spreading modulated signal by performing spreading processing using a second spreading code that has a second spreading ratio different from the first spreading ratio and orthogonal frequency division multiplexing processing on an information signal, a multiplexing section that obtains a multiplex signal by multiplexing the first OFDM-spreading modulated signal and second OFDM-spreading modulated signal in the same frequency band, and a transmission section that transmits the multiplex signal.

According to this configuration, since first and second OFDM-spreading modulated signals are transmitted multiplexed in the same frequency band, effective frequency utilization can be achieved. Also, two OFDM-spreading modulated signals with different spreading ratios can be separated from a multiplex signal by using spreading codes with different spreading ratios on the receiving side.

A transmitting apparatus according to the present invention has a configuration whereby the transmission power of a second modulated signal is made greater than the transmission power of a first modulated signal.

According to this configuration, the correlation between a first modulated signal and second modulated signal can be made small, enabling each signal to be separated from a multiplex signal with significantly better precision on the receiving side. Also, when the second modulated signal with the larger transmission power is separated from the multiplex signal before the second modulated signal on the receiving side, the precision of separation of the second modulated signal separated first can be improved, enabling the precision of separation of the first modulated signal extracted by subtracting a replica signal of the second modulated signal from the multiplex signal also to be improved.

A transmitting apparatus according to the present invention has a configuration whereby the transmission power of an OFDM-spreading modulated signal is made greater than the transmission power of an OFDM modulated signal.

According to this configuration, the correlation between an OFDM-spreading modulated signal and OFDM modulated signal can be made small, enabling each signal to be separated from a multiplex signal with significantly better precision on the receiving side. Also, the OFDM-spreading modulated signal is separated from the multiplex signal before the OFDM modulated signal on the receiving side, and as the transmission power of the OFDM-spreading modulated signal separated first is greater at this time, the OFDM-spreading modulated signal can be separated with good precision. Therefore, the precision of separation of an OFDM modulated signal extracted by subtracting a replica signal of the OFDM-spreading modulated signal from the multiplex signal can also be improved.

A transmitting apparatus according to the present invention has a configuration whereby the transmission power of whichever of a first or second spread signal is spread using a spreading code with a larger spreading ratio is made greater than the transmission power of the other spread signal.

According to this configuration, the correlation between a first spread signal and second spread signal can be made small, enabling each spread signal to be separated from a multiplex signal with significantly better precision on the receiving side. Also, when the spread signal with the larger spreading ratio is separated first from the multiplex signal on the receiving side, as the transmission power of this spread signal with the larger spreading ratio is greater than the transmission power of the other spread signal, the spread signal with the larger spreading ratio can be separated from the multiplex signal with good precision. Therefore, the precision of separation of the spread signal with the smaller spreading ratio extracted by subtracting a replica signal of the spread signal with the larger spreading ratio from the multiplex signal can also be improved.

A transmitting apparatus according to the present invention has a configuration whereby, of a first and second OFDM-spreading modulated signal, the transmission power of the OFDM-spreading modulated signal formed using the spreading code with the larger spreading ratio is made greater than the transmission power of the other OFDM-spreading modulated signal.

According to this configuration, the correlation between a first OFDM-spreading modulated signal and second OFDM-spreading modulated signal can be made small, enabling each OFDM-spreading modulated signal to be separated from a multiplex signal with significantly better precision on the receiving side. Also, when the OFDM-spreading modulated signal with the larger spreading ratio is separated first from the multiplex signal on the receiving side, as the transmission power of this OFDM-spreading modulated signal with the larger spreading ratio is greater than the transmission power of the other OFDM-spreading modulated signal, the OFDM-spreading modulated signal with the larger spreading ratio can be separated from the multiplex signal with good precision. Therefore, the precision of separation of the OFDM-spreading modulated signal with the smaller spreading ratio extracted by subtracting a replica signal of the OFDM-spreading modulated signal with the larger spreading ratio from the multiplex signal can also be improved.

A receiving apparatus according to the present invention has a configuration comprising a reception section that receives a multiplex signal in which first and second spread spectrum signals formed using spreading codes with different spreading ratios on an information signal are multiplexed in the same frequency band, a first demodulation section that separates and demodulates the first spread spectrum signal from the received multiplex signal using a spreading code corresponding to the first spread spectrum signal, a regeneration section that forms a replica signal of the first spread spectrum signal by regenerating the first spread spectrum signal from the demodulated signal, a signal elimination section that extracts the second spread spectrum signal by eliminating the first spread spectrum signal replica signal from the received multiplex signal, and a second demodulation section that demodulates the extracted second spread spectrum signal.

According to this configuration, a first spread spectrum signal can be separated and demodulated from a received multiplex signal by means of despreading processing by the first demodulation section. Also, a second spread spectrum signal can be separated by eliminating the first spread spectrum signal component from the received multiplex signal by means of the signal elimination section. Thus, spread spectrum signals with different spreading ratios can be separated from a received multiplex signal and demodulated.

A receiving apparatus according to the present invention has a configuration whereby a first spread spectrum signal is a spread spectrum signal with a larger spreading ratio than a second spread spectrum signal, and demodulation is performed in order from the spread spectrum signal with the larger spreading ratio.

According to this configuration, attention is paid to the fact that, when spread signals with different spreading ratios are multiplexed, despreading precision is higher for the spread signal with the larger spreading ratio, and separation and demodulation are performed within a received multiplex signal in order from the spread signal with the larger spreading ratio. As a result, the precision of separation of a spread signal next extracted by subtracting a replica signal from the multiplex signal is also improved, enabling all spread signals to be separated and demodulated with good precision.

A receiving apparatus according to the present invention has a configuration comprising a reception section that receives a multiplex signal in which first and second OFDM-spreading modulated signals formed using spreading codes with different spreading ratios on an information signal and executing orthogonal frequency division multiplexing on the signals after spreading are multiplexed in the same frequency band, a first demodulation section that separates and demodulates the first OFDM-spreading modulated signal from the received multiplex signal using a spreading code corresponding to the first OFDM-spreading modulated signal, a regeneration section that forms a replica signal of the first OFDM-spreading modulated signal by regenerating the first OFDM-spreading modulated signal from the demodulated signal, a signal elimination section that extracts the second OFDM-spreading modulated signal by eliminating the first OFDM-spreading modulated signal replica signal from the received multiplex signal, and a second demodulation section that demodulates the extracted second OFDM-spreading modulated signal.

According to this configuration, a first OFDM-spreading modulated signal can be separated and demodulated from a received multiplex signal by means of despreading processing by the first demodulation section. Also, a second OFDM-spreading modulated signal can be separated by eliminating the first OFDM-spreading modulated signal component from the received multiplex signal by means of the signal elimination section. Thus, OFDM-spreading modulated signals formed using spreading codes with different spreading ratios can be separated from a received multiplex signal and demodulated.

A receiving apparatus according to the present invention has a configuration whereby a first OFDM-spreading modulated signal is an OFDM-spreading modulated signal formed using a spreading code with a larger spreading ratio than a second OFDM-spreading modulated signal, and demodulation is performed in order from the OFDM-spreading modulated signal formed using the spreading code with the larger spreading ratio.

According to this configuration, attention is paid to the fact that, when OFDM-spreading modulated signals with different spreading ratios are multiplexed, despreading precision is higher for the OFDM-spreading modulated signal with the larger spreading ratio, and separation and demodulation are performed within a received multiplex signal in order from the OFDM-spreading modulated signal with the higher spreading ratio. As a result, the precision of separation of an OFDM-spreading modulated signal next extracted by subtracting a replica signal from the multiplex signal is also improved, enabling all OFDM-spreading modulated signals to be separated and demodulated with good precision.

A transmitting apparatus according to the present invention has a configuration comprising a first modulation section that obtains a spread signal by modulating an information signal using a spread spectrum system; a second modulation section that obtains a non-spread signal by modulating an information signal not using a spread spectrum system; a modulation selection section that, based on the propagation path environment of the transmission target station, selects the first modulation section and has spreading processing performed on an information signal directed to that transmission target station when the propagation path environment is poor, and selects the second modulation section and does not have spreading processing performed on an information signal directed to that transmission target station when the propagation environment is good; a multiplexing section that multiplexes a plurality of modulated signals that have undergone modulation processing by means of the selected modulation system in the same frequency band and obtains a multiplex signal; and a transmission section that transmits the multiplex signal.

According to this configuration, spread signals with good resistance to errors are transmitted multiplexed in the same frequency band to a transmission target station when the propagation environment is poor, and non-spread signals with a large transmission capacity are transmitted multiplexed in the same frequency band to a transmission target station when the propagation environment is good, making it possible to achieve both an improvement in error rate characteristics and an increase in the amount of transmit data.

A transmitting apparatus according to the present invention has a configuration comprising an OFDM modulation section that executes orthogonal frequency division multiplexing processing on an information signal and obtains an OFDM modulated signal; an OFDM-spreading modulation section that executes spreading processing and orthogonal frequency division multiplexing processing on an information signal and obtains an OFDM-spreading modulated signal; a modulation selection section that, based on the propagation path environment of the transmission target station, selects the OFDM-spreading modulation section and has spreading processing and orthogonal frequency division multiplexing processing executed on an information signal directed to that transmission target station when the propagation path environment is poor, and selects the OFDM modulation section and has orthogonal frequency division multiplexing executed on an information signal directed to that transmission target station when the propagation environment is good; a multiplexing section that multiplexes a plurality of modulated signals that have undergone modulation processing by means of the selected modulation system in the same frequency band and obtains a multiplex signal; and a transmission section that transmits the multiplex signal.

According to this configuration, OFDM-spreading modulated signals with good resistance to errors are transmitted multiplexed in the same frequency band to a transmission target station when the propagation environment is poor, and OFDM modulated signals with a large transmission capacity are transmitted multiplexed in the same frequency band to a transmission target station when the propagation environment is good, making it possible to achieve both an improvement in error rate characteristics and an increase in the amount of transmit data.

A transmitting apparatus according to the present invention has a configuration comprising a first modulation section that obtains a spread signal by modulating an information signal using a spread spectrum system, and a second modulation section that obtains a non-spread signal by modulating an information signal not using a spread spectrum system; wherein by executing processing by the first and second modulation sections on the same information signal, a spread signal and non-spread signal are obtained for the same information signal, and that spread signal and non-spread signal are transmitted multiplexed in the same frequency band.

According to this configuration, it is possible to obtain an information signal by selecting a spread signal with good resistance to errors or a non-spread signal with a large transmission capacity on the receiving side according to the radio wave propagation environment, as a result of which a large amount of information can be obtained.

A transmitting apparatus according to the present invention has a configuration comprising an OFDM modulation section that obtains an OFDM modulated signal by executing orthogonal frequency division multiplexing processing on an information signal, and an OFDM-spreading modulation section that obtains an OFDM-spreading modulated signal by executing spreading processing and orthogonal frequency division multiplexing processing on an information signal; wherein by executing processing by the OFDM modulation section and OFDM-spreading modulation section on the same information signal, an OFDM modulated signal and OFDM-spreading modulated signal are obtained for the same information signal, and that OFDM modulated signal and OFDM-spreading modulated signal are transmitted multiplexed in the same frequency band.

According to this configuration, it is possible to obtain an information signal by selecting an OFDM-spreading modulated signal with good resistance to errors or an OFDM modulated signal with a large transmission capacity on the receiving side according to the radio wave propagation environment, as a result of which a large amount of information can be obtained.

A receiving apparatus according to the present invention has a configuration comprising a reception section that receives a multiplex signal in which a spread signal and non-spread signal for the same information signal are multiplexed in the same frequency band, a despreading and demodulation section that demodulates the spread signal in the multiplex signal by despreading the received multiplex signal, a regeneration section that regenerates a spread signal from the demodulated signal and forms a replica signal of the spread signal, a signal elimination section that extracts the non-spread signal by eliminating the replica signal from the received multiplex signal, a demodulation section that demodulates the extracted non-spread signal, a radio wave propagation environment estimation section that estimates the radio wave propagation environment between the receiving apparatus and the transmitting station, and a selection section that selects either the demodulated spread signal or the demodulated non-spread signal based on the estimated radio wave propagation environment.

According to this configuration, it is possible to select an information signal transmitted using a spread signal with good resistance to errors when the propagation environment is poor, and to select an information signal transmitted using a non-spread signal with a large transmission capacity when the propagation environment is good, as a result of which a large amount of information can be obtained.

A receiving apparatus according to the present invention has a configuration comprising a reception section that receives a multiplex signal in which an OFDM modulated signal and an OFDM-spreading modulated signal for the same information signal are multiplexed in the same frequency band, a first demodulation section that demodulates the OFDM-spreading modulated signal in the received multiplex signal, a regeneration section that regenerates an OFDM-spreading modulated signal from the demodulated OFDM-spreading modulated signal and forms a replica signal of the OFDM-spreading modulated signal, a signal elimination section that extracts the OFDM modulated signal by eliminating the replica signal from the received multiplex signal, a second demodulation section that demodulates the extracted OFDM modulated signal, a radio wave propagation environment estimation section that estimates the radio wave propagation environment between the receiving apparatus and the transmitting station, and a selection section that selects either the demodulated OFDM modulated signal or the demodulated OFDM-spreading modulated signal based on the estimated radio wave propagation environment.

According to this configuration, it is possible to select an information signal transmitted using an OFDM-spreading modulated signal with good resistance to errors when the propagation environment is poor, and to select an information signal transmitted using an OFDM modulated signal with a large transmission capacity when the propagation environment is good, as a result of which a large amount of information can be obtained.

In a radio communication method according to the present invention, a transmitting apparatus multiplexes in the same frequency band and transmits a first modulated signal obtained by digitally modulating an information signal and a second modulated signal obtained by digitally modulating a preset signal sequence, and a receiving apparatus demodulates the second modulated signal from the multiplex signal using a preset signal sequence, forms a replica signal of the second modulated signal based on the demodulated signal, extracts the first modulated signal by eliminating the replica signal of the second modulated signal from the multiplex signal, and demodulates the extracted first modulated signal.

According to this method, even when a first modulated signal in which an information signal is digitally modulated and a second modulated signal in which a preset signal sequence is digitally modulated are multiplexed in the same frequency band, the first modulated signal and second modulated signal can be separated satisfactorily.

In a radio communication method according to the present invention, a transmitting apparatus multiplexes in the same frequency band and transmits a first modulated signal obtained by digitally modulating an information signal and a second modulated signal obtained by digitally modulating an information signal by means of a spread spectrum system, and a receiving apparatus demodulates the second modulated signal by performing spread spectrum demodulation on the received multiplex signal, performs spread spectrum processing on the demodulated second modulated signal and forms a replica signal of the second modulated signal, extracts the first modulated signal by eliminating the replica signal of the second modulated signal from the received multiplex signal, and demodulates the extracted first modulated signal.

According to this method, even when a first modulated signal in which an information signal is digitally modulated and a second modulated signal in which an information signal is digitally modulated by means of a spread spectrum system are multiplexed in the same frequency band, the first modulated signal and second modulated signal can be separated satisfactorily.

In a radio communication method according to the present invention, a transmitting apparatus multiplexes in the same frequency band and transmits a modulated signal obtained by digitally modulating an information signal and a specific signal corresponding to the information signal selected from a plurality of specific signals, and a receiving apparatus identifies the specific signal contained in the received multiplex signal, and obtains the aforementioned modulated signal by eliminating the identified specific signal from the received multiplex signal.

According to this configuration, an information signal is transmitted via a specific modulated signal, enabling the information signal to be estimated from the specific modulated signal on the receiving side. As a result, it is possible to increase the amount of information that can be transmitted in the same frequency band. As the number of specific modulated signals is limited, the specific modulated signal contained in the multiplex signal can easily be detected by sequentially finding a correlation value on the receiving side between the multiplex signal and specific modulated signals whose number is limited, for example.

In a radio communication method according to the present invention, a transmitting apparatus multiplexes in the same frequency band and transmits an OFDM modulated signal obtained by performing orthogonal frequency division multiplexing processing on an information signal and an OFDM-spreading modulated signal obtained by performing spreading processing and orthogonal frequency division multiplexing processing on an information signal, and a receiving apparatus extracts the OFDM-spreading modulated signal by executing OFDM-spreading modulation processing on the received multiplex signal, forms a replica signal of the OFDM-spreading modulated signal by regenerating the extracted OFDM-spreading modulated signal, and obtains the OFDM modulated signal by eliminating the replica signal of the OFDM-spreading modulated signal from the received multiplex signal.

According to this method, an OFDM modulated signal can be separated from a multiplex signal by first separating and demodulating an OFDM-spreading modulated signal from the multiplex signal using a spreading code, and then eliminating a replica signal of the OFDM-spreading modulated signal from the multiplex signal. By this means, it is possible to separate and demodulate an OFDM modulated signal and OFDM-spreading modulated signal multiplexed in the same frequency band. As a result, it is possible to achieve effective frequency utilization and implement large-volume communication.

In a radio communication method according to the present invention, a transmitting apparatus multiplexes in the same frequency band and transmits first and second spread signals formed using first and second spreading codes with different spreading ratios, and a receiving apparatus demodulates the first spread signal from the received multiplex signal using a spreading code corresponding to the first spread signal, forms a replica signal of the first spread signal by regenerating the first spread signal from the demodulated signal, and obtains the second spread signal by eliminating the replica signal from the received multiplex signal.

According to this method, a first spread spectrum signal is first separated and demodulated from a received multiplex signal by means of despreading processing using a first spreading code, then a second spread spectrum signal is separated by eliminating the replica signal of the first spread spectrum signal from the received multiplex signal. It is thus possible to separate and demodulate spread spectrum signals with different spreading ratios from a received multiplex signal. As a result, it is possible to achieve effective frequency utilization and implement large-volume communication.

In a radio communication method according to the present invention, a transmitting apparatus multiplexes in the same frequency band and transmits first and second OFDM-spreading modulated signals formed using first and second spreading codes with different spreading ratios, and a receiving apparatus demodulates the first OFDM-spreading modulated signal from the received multiplex signal using a spreading code corresponding to the first OFDM-spreading modulated signal, generates a replica signal of the first OFDM-spreading modulated signal by regenerating the first OFDM-spreading modulated signal from the demodulated signal, and obtains the second OFDM-spreading modulated signal by eliminating the replica signal from the received multiplex signal.

According to this method, a first OFDM-spreading modulated signal is first separated and demodulated from a received multiplex signal by means of despreading processing using a first spreading code, then a second OFDM-spreading modulated signal is separated by eliminating the replica signal of the first OFDM-spreading modulated signal from the received multiplex signal. It is thus possible to separate and demodulate OFDM-spreading modulated signals with different spreading ratios from a received multiplex signal. As a result, it is possible to achieve effective frequency utilization and implement large-volume communication.

In a radio communication method according to the present invention, a receiving apparatus performs demodulation sequentially from a signal obtained using a spreading code with a large spreading ratio among signals contained in a received multiplex signal.

According to this method, attention is paid to the fact that despreading precision is higher for a spread signal with a larger spreading ratio, and separation and demodulation are performed within a received multiplex signal in order from the spread signal with the largest spreading ratio. As a result, the precision of separation of a spread signal next extracted by subtracting a replica signal from the multiplex signal is also improved, enabling all spread signals to be separated and demodulated with good precision.

In a radio communication method according to the present invention, a receiving apparatus performs demodulation sequentially from a signal with large reception power among signals contained in a received multiplex signal.

According to this method, attention is paid to the fact that precision at the time of separation from a multiplex signal is higher for a signal with larger reception power, and separation and demodulation are performed within a received multiplex signal in order from the signal with the largest reception power. As a result, the precision of separation of a signal next extracted by subtracting a replica signal from the multiplex signal is also improved, enabling all signals to be separated and demodulated with good precision.

In a radio communication method according to the present invention, a transmitting apparatus obtains a spread signal and non-spread signal from the same signal, and transmits these signals multiplexed in the same frequency band, and a receiving apparatus estimates the radio wave propagation environment between the receiving apparatus and the transmitting apparatus, and selects and demodulates either the spread signal or the non-spread signal from the received multiplex signal based on the estimated radio wave propagation environment.

According to this method, a large amount of information can be obtained if an information signal transmitted using a spread signal with good resistance to errors is selected when the propagation environment is poor, and an information signal transmitted using a non-spread signal with a large transmission capacity is selected when the propagation environment is good.

In a radio communication method according to the present invention, a transmitting apparatus obtains an OFDM signal and OFDM-spread signal from the same signal, and transmits these signals multiplexed in the same frequency band, and a receiving apparatus estimates the radio wave propagation environment between the receiving apparatus and the transmitting apparatus, and selects and demodulates either the OFDM signal or the OFDM-spread signal from the received multiplex signal based on the estimated radio wave propagation environment.

According to this method, a large amount of information can be obtained if an information signal transmitted using an OFDM-spread signal with good resistance to errors is selected when the propagation environment is poor, and an information signal transmitted using an OFDM signal with a large transmission capacity is selected when the propagation environment is good.

As described above, according to the present invention, by transmitting a plurality of digitally modulated signals multiplexed in the same frequency band, the data transmission amount per, unit time can be increased, enabling the data transmission speed to be improved.

This application is based on Japanese Patent Application No. 2001-244929 filed on Aug. 10, 2001, Japanese Patent Application No. 2001-310777 filed on Oct. 5, 2001, and Japanese Patent Application No. 2002-206150 filed on Jul. 15, 2002, entire content of which is expressly incorporated by reference herein.

INDUSTRIAL APPLICABILITY

The present invention is applicable to a transmitting apparatus, receiving apparatus, and radio communication method whereby a greater amount of data is transmitted in a limited frequency band.

The invention claimed is:

1. A transmitting apparatus comprising:
an OFDM modulator that generates
a first modulation symbol by modulating a first information signal using a first modulation scheme, a signal point of the first modulated information signal being arranged at a first position in an in-phase quadrature-phase plane,
a second modulation symbol by modulating a second information signal using the first modulation scheme, and by changing a second position at which a signal point of the modulated second information signal is arranged to a third position in the in-phase quadrature-phase plane, wherein the third position is different from the first position,
an OFDM modulation signal including the first modulation symbol and the second modulation symbol, wherein the OFDM modulation signal comprises a plurality of subcarriers; and
a transmitter that transmits the OFDM modulation signal.

2. The transmitting apparatus according to claim 1, wherein the first modulation symbol and the second modulation symbol are arranged in a same subcarrier in the OFDM modulation signal.

3. A transmission method comprising:
generating a first modulation symbol by modulating a first information signal using a first modulation scheme, a signal point of the first modulated information signal being arranged at a first position in an in-phase quadrature-phase plane;
generating a second modulation symbol by modulating a second information signal using the first modulation scheme, and by changing a second position at which a signal point of the second modulated information signal is arranged to a third position in the in-phase quadrature-phase plane, wherein the third position is different from the first position, and
generating an OFDM modulation signal including the first modulation symbol and the second modulation symbol, wherein the OFDM modulation signal comprises a plurality of subcarriers; and
transmitting the OFDM modulation signal.

4. The reception method according to claim 3, wherein the first modulation symbol and the second modulation symbol are arranged in a same subcarrier in the OFDM modulation signal.

5. A reception apparatus comprising:
a receptor that receives an OFDM modulation signal to which a first modulation symbol and a second modulation symbol are multiplexed, wherein
the OFDM modulation signal comprises a plurality of subcarriers,
the plurality of subcarriers include
the first modulation symbol arranged in a first position in an in-phase quadrature-phase plane, and
the second modulation symbol arranged in a third position in the in-phase quadrature-phase plane,
the first modulation symbol is a symbol to which a first information signal is modulated using a first modulation scheme,
the second modulation symbol is a symbol obtained by modulating a second information signal using the first modulation scheme, and by changing a second position at which a signal point of the second modulated information signal is arranged to the third position in the in-phase quadrature-phase plane; and
a demodulator that separates the first modulation symbol and the second modulation symbol included in the OFDM signal, demodulates the first information signal from the first modulation symbol, and demodulates the second information signal from the second modulation symbol.

6. The reception apparatus according to claim 5, wherein the first modulation symbol and the second modulation symbol are arranged in a same subcarrier in the received OFDM modulation signal.

7. A reception method comprising:

receiving an OFDM modulation signal to which a first modulation symbol and a second modulation symbol are multiplexed, wherein the OFDM modulation signal comprises a plurality of subcarriers, the plurality of subcarriers include the first modulation symbol arranged in a first position in an in-phase quadrature-phase plane, and the second modulation symbol arranged in a third position in the in-phase quadrature-phase plane, the first modulation symbol is a symbol to which a first information signal is modulated using a first modulation scheme, the second modulation symbol is a symbol obtained by modulating a second information signal using the first modulation scheme, and by changing a second position at which a signal point of the second modulated information signal is arranged to the third position in the in-phase quadrature-phase plane;

separating the first modulation symbol and the second modulation symbol included in the OFDM signal;

demodulating the first information signal from the first modulation symbol; and demodulating the second information signal from the second modulation symbol.

8. The reception apparatus according to claim 7, wherein the first modulation symbol and the second modulation symbol are arranged in a same subcarrier in the received OFDM modulation signal.

* * * * *